US012286301B2

(12) United States Patent
Gravelle et al.

(10) Patent No.: US 12,286,301 B2
(45) Date of Patent: Apr. 29, 2025

(54) STORAGE AND RETRIEVAL SYSTEM FOR MANAGING LOADING, ALIGNMENT, AND TRAVEL OF STORAGE UNITS AND ROBOTIC VEHICLES

(71) Applicant: ATTABOTICS INC, Calgary (CA)

(72) Inventors: Scott Gravelle, Calgary (CA); Robert Winston, Calgary (CA); Darin Rousseau, Calgary (CA)

(73) Assignee: Attabotics Inc., Calgary (CA)

( * ) Notice: Subject to any disclaimer, the term of this patent is extended or adjusted under 35 U.S.C. 154(b) by 719 days.

(21) Appl. No.: 16/973,260

(22) PCT Filed: Jun. 10, 2019

(86) PCT No.: PCT/CA2019/050815
§ 371 (c)(1),
(2) Date: Dec. 8, 2020

(87) PCT Pub. No.: WO2019/232651
PCT Pub. Date: Dec. 12, 2019

(65) Prior Publication Data
US 2021/0354922 A1    Nov. 18, 2021

Related U.S. Application Data

(60) Provisional application No. 62/770,788, filed on Nov. 22, 2018, provisional application No. 62/682,691, filed on Jun. 8, 2018.

(51) Int. Cl.
*G06F 7/00*    (2006.01)
*B65G 1/04*    (2006.01)
(Continued)

(52) U.S. Cl.
CPC ......... *B65G 1/1373* (2013.01); *B65G 1/0464* (2013.01); *B65G 1/0471* (2013.01);
(Continued)

(58) Field of Classification Search
CPC .. B65G 1/1373; B65G 1/0464; B65G 1/0471; B65G 1/0478; B65G 1/0492;
(Continued)

(56) References Cited

U.S. PATENT DOCUMENTS

| 1,465,135 A | 8/1923 | Kehr |
| 4,088,232 A | 5/1978 | Lilly |

(Continued)

FOREIGN PATENT DOCUMENTS

| AU | 2020231623 A1 | 7/2021 |
| AU | 2020234099 A1 | 7/2021 |

(Continued)

OTHER PUBLICATIONS

International Search Report and Written Opinion for PCT/CA2019/050404 issued Dec. 12, 2019.
(Continued)

*Primary Examiner* — Yolanda R Cumbess
(74) *Attorney, Agent, or Firm* — Knobbe, Martens, Olson & Bear, LLP

(57) ABSTRACT

A storage and retrieval system employing a gridded three-dimensional storage structure features workstations served by the same robotic vehicle fleet that serves the storage structure, travel-through workstations using the same robotic vehicles to carry storage units through the workstation without hand-off to any other conveyor or handler, internal sortation using orchestrated navigation of the robotic vehicles to workstation intake points, sensors on the robotic vehicles to confirm proper loading and alignment of storage units thereon, lifting mechanisms for raising the robotic vehicles into shafts of the gridded three-dimensional storage structure from a lower track thereof, use of markers and scanners to align the robotic vehicles with the grid
(Continued)

shafts, and workstation light curtains for hand safety, pick-counting and container content protrusion detection.

8 Claims, 21 Drawing Sheets

(51) Int. Cl.
*B65G 1/06* (2006.01)
*B65G 1/12* (2006.01)
*B65G 1/137* (2006.01)

(52) U.S. Cl.
CPC ......... *B65G 1/0478* (2013.01); *B65G 1/0492* (2013.01); *B65G 1/065* (2013.01); *B65G 1/12* (2013.01); *B65G 1/137* (2013.01); *B65G 2203/0283* (2013.01); *B65G 2203/041* (2013.01)

(58) Field of Classification Search
CPC .......... B65G 1/065; B65G 1/12; B65G 1/137; B65G 2203/0283; B65G 2203/041; B65G 1/1378; B65G 1/04
USPC .......................................... 700/213–214, 216
See application file for complete search history.

(56) References Cited

U.S. PATENT DOCUMENTS

| | | |
|---|---|---|
| 4,428,708 A * | 1/1984 | Burt .................... B65G 1/0421 700/214 |
| 4,750,633 A | 6/1988 | Schäfer |
| 4,815,190 A | 3/1989 | Haba et al. |
| 4,817,071 A | 3/1989 | Carlson et al. |
| 5,024,571 A | 6/1991 | Shahar et al. |
| 5,174,707 A | 12/1992 | Suekane et al. |
| 5,190,427 A | 3/1993 | Lai |
| 5,272,805 A | 12/1993 | Akeel et al. |
| 5,314,285 A | 5/1994 | Lai |
| 5,374,231 A | 12/1994 | Obrist et al. |
| 5,595,263 A | 1/1997 | Pignataro |
| 6,148,291 A | 11/2000 | Radican |
| 6,236,901 B1 | 5/2001 | Goss et al. |
| 6,665,582 B1 | 12/2003 | Moritz et al. |
| 6,711,798 B2 | 3/2004 | Sanders et al. |
| 6,853,875 B1 | 2/2005 | Moritz et al. |
| 6,974,928 B2 | 12/2005 | Bloom |
| 7,168,548 B2 | 1/2007 | Naumann et al. |
| 7,209,887 B2 | 4/2007 | Yen et al. |
| 7,267,518 B2 | 9/2007 | Kinzer |
| 7,289,969 B1 | 10/2007 | Ballenger et al. |
| 7,308,330 B2 | 12/2007 | Jones |
| 7,331,471 B1 | 2/2008 | Shakes et al. |
| 7,381,022 B1 | 6/2008 | King |
| 7,591,630 B2 | 9/2009 | Lert, Jr. |
| 7,596,508 B1 | 9/2009 | McGuffie et al. |
| 7,669,763 B2 | 3/2010 | Ernesti et al. |
| 7,686,171 B1 | 3/2010 | Shakes et al. |
| 7,711,657 B1 | 5/2010 | Huberman et al. |
| 7,770,792 B2 | 8/2010 | Bruns et al. |
| 7,861,844 B2 | 1/2011 | Hayduchok et al. |
| 7,931,431 B2 | 4/2011 | Benedict |
| 7,963,384 B2 | 6/2011 | Lafontaine |
| 8,090,626 B1 | 1/2012 | Wijaya et al. |
| 8,104,601 B2 | 1/2012 | Hayduchok et al. |
| 8,104,681 B2 | 1/2012 | Elsenson |
| 8,276,740 B2 | 10/2012 | Hayduchok et al. |
| 8,306,650 B1 | 11/2012 | Antony et al. |
| 8,527,373 B1 | 9/2013 | Ricci et al. |
| 8,533,053 B2 | 9/2013 | Brown et al. |
| 8,622,194 B2 | 1/2014 | DeWitt et al. |
| 8,628,289 B1 | 1/2014 | Benedict et al. |
| 8,682,473 B1 | 3/2014 | Ramey et al. |
| 8,731,708 B2 | 5/2014 | Shakes et al. |
| 8,896,442 B1 | 11/2014 | Khan et al. |
| 8,928,481 B2 | 1/2015 | Abe |
| 8,965,560 B2 | 2/2015 | Mathi et al. |
| 8,965,562 B1 | 2/2015 | Wurman et al. |
| 8,972,045 B1 | 3/2015 | Mountz et al. |
| 8,983,647 B1 | 3/2015 | Dwarakanath et al. |
| 8,996,157 B2 | 3/2015 | Collin |
| 9,010,517 B2 | 4/2015 | Hayduchok et al. |
| 9,020,632 B2 | 4/2015 | Naylor |
| 9,073,736 B1 * | 7/2015 | Hussain .................. B66F 9/063 |
| 9,120,621 B1 | 9/2015 | Curlander et al. |
| 9,122,566 B2 | 9/2015 | Bastian, II et al. |
| 9,122,586 B2 | 9/2015 | Bastian et al. |
| 9,139,363 B2 | 9/2015 | Lert |
| 9,187,244 B2 | 11/2015 | Toebes et al. |
| 9,202,194 B1 | 12/2015 | Mistry |
| 9,218,585 B2 | 12/2015 | Gupta et al. |
| 9,309,056 B2 | 4/2016 | Lafontaine |
| 9,315,320 B2 | 4/2016 | Kawano |
| 9,422,108 B2 | 8/2016 | Hognaland |
| 9,533,828 B1 | 1/2017 | Dwarakanath et al. |
| 9,551,987 B1 | 1/2017 | Mountz et al. |
| 9,580,248 B2 | 2/2017 | Hasman et al. |
| 9,598,239 B2 | 3/2017 | Lert, Jr. |
| 9,600,798 B2 | 3/2017 | Battle et al. |
| 9,604,781 B2 | 3/2017 | Stevens et al. |
| 9,682,822 B2 | 6/2017 | Lindbo et al. |
| 9,687,883 B2 | 6/2017 | Hayduchok et al. |
| 9,725,242 B2 | 8/2017 | Issing et al. |
| 9,733,646 B1 | 8/2017 | Nusser et al. |
| 9,796,080 B2 | 10/2017 | Lindbo et al. |
| 9,796,527 B1 | 10/2017 | Kaukl et al. |
| 9,802,759 B2 | 10/2017 | Lert, Jr. |
| 9,815,625 B2 | 11/2017 | DeWitt et al. |
| 9,821,960 B2 | 11/2017 | Issing |
| 9,845,208 B2 | 12/2017 | Lindbo |
| 9,884,721 B2 | 2/2018 | Suemitsu et al. |
| 9,932,170 B2 | 4/2018 | Munholland |
| 10,000,338 B2 | 6/2018 | Lert, Jr. |
| 10,018,397 B2 | 7/2018 | Hognaland et al. |
| 10,040,632 B2 | 8/2018 | Lert, Jr. |
| 10,051,599 B2 | 8/2018 | Lowe et al. |
| 10,062,047 B2 | 8/2018 | Kadaba et al. |
| 10,086,999 B2 | 10/2018 | Stadie |
| 10,106,323 B2 | 10/2018 | Terill |
| 10,189,641 B2 | 1/2019 | Hognaland |
| 10,202,240 B2 | 2/2019 | De Angelis |
| 10,345,818 B2 | 7/2019 | Sibley |
| 10,427,872 B2 | 10/2019 | Li |
| 10,430,756 B2 | 10/2019 | Greenberg |
| 10,549,915 B1 | 2/2020 | Theobald |
| 10,745,164 B2 | 8/2020 | Prahlad et al. |
| 2002/0121521 A1 | 9/2002 | Beal et al. |
| 2003/0208902 A1 | 11/2003 | Sanders et al. |
| 2003/0212602 A1 | 11/2003 | Schaller |
| 2003/0228196 A1 | 12/2003 | Li |
| 2004/0010337 A1 | 1/2004 | Mountz |
| 2004/0153379 A1 | 8/2004 | Joyce et al. |
| 2005/0043850 A1 | 2/2005 | Stevens et al. |
| 2005/0047895 A1 | 3/2005 | Lert, Jr. |
| 2005/0055260 A1 | 3/2005 | Yamamoto |
| 2005/0209731 A1 | 9/2005 | Penkar et al. |
| 2005/0241129 A1 | 11/2005 | Naumann et al. |
| 2006/0038010 A1 | 2/2006 | Lucas |
| 2006/0085235 A1 | 4/2006 | Nguyen et al. |
| 2006/0085296 A1 | 4/2006 | Strickland |
| 2006/0111989 A1 | 5/2006 | Church et al. |
| 2006/0158043 A1 | 7/2006 | Brouwer et al. |
| 2006/0228196 A1 | 10/2006 | Li |
| 2007/0059132 A1 | 3/2007 | Akamatsu |
| 2007/0188322 A1 | 8/2007 | English et al. |
| 2008/0131241 A1 | 6/2008 | King |
| 2008/0301068 A1 | 12/2008 | Fager et al. |
| 2008/0314981 A1 | 12/2008 | Elsenson |
| 2009/0185884 A1 | 7/2009 | Wurman et al. |
| 2010/0138037 A1 | 6/2010 | Adelberg et al. |
| 2011/0238207 A1 | 9/2011 | Bastian et al. |
| 2012/0030070 A1 | 2/2012 | Keller et al. |
| 2012/0118845 A1 | 5/2012 | Wada |
| 2012/0197431 A1 | 8/2012 | Toebes et al. |

(56) References Cited

U.S. PATENT DOCUMENTS

| | | |
|---|---|---|
| 2012/0233028 A1 | 9/2012 | Brown et al. |
| 2012/0272500 A1 | 11/2012 | Reuteler |
| 2012/0290125 A1 | 11/2012 | Perry |
| 2012/0321423 A1 | 12/2012 | Macknight et al. |
| 2013/0080454 A1 | 3/2013 | Raghunathan et al. |
| 2013/0181586 A1 | 7/2013 | Hognaland |
| 2013/0245810 A1 | 9/2013 | Sullivan et al. |
| 2013/0325159 A1 | 12/2013 | Killbarda et al. |
| 2013/0343843 A1 | 12/2013 | Venkataraman et al. |
| 2013/0343844 A1 | 12/2013 | Fosnight et al. |
| 2014/0271069 A1 | 9/2014 | Salichs et al. |
| 2014/0277693 A1 | 9/2014 | Naylor |
| 2014/0279294 A1 | 9/2014 | Field-Darragh et al. |
| 2015/0046364 A1 | 2/2015 | Kriss |
| 2015/0052019 A1 | 2/2015 | Field-Darragh et al. |
| 2015/0071743 A1 | 3/2015 | Lert, Jr. |
| 2015/0088302 A1 | 3/2015 | Mountz et al. |
| 2015/0127143 A1 | 5/2015 | Lindbo |
| 2015/0151912 A1 | 6/2015 | Mountz et al. |
| 2015/0225187 A1 | 8/2015 | Razumov |
| 2015/0291357 A1 | 10/2015 | Razumov |
| 2016/0042315 A1 | 2/2016 | Field-Darragh et al. |
| 2016/0129587 A1 | 5/2016 | Lindbo |
| 2016/0130086 A1 | 5/2016 | Yamashita |
| 2016/0137418 A1 | 5/2016 | Traversa et al. |
| 2016/0140488 A1 | 5/2016 | Lindbo |
| 2016/0167888 A1 | 6/2016 | Messina |
| 2016/0194151 A1 | 7/2016 | Lindbo et al. |
| 2016/0283898 A1 | 9/2016 | Reuther et al. |
| 2016/0347545 A1 | 12/2016 | Lindbo et al. |
| 2016/0355337 A1 | 12/2016 | Lert, Jr. et al. |
| 2016/0355339 A1 | 12/2016 | Peng |
| 2017/0086011 A1 | 3/2017 | Neves et al. |
| 2017/0129703 A1 | 5/2017 | Lindbo et al. |
| 2017/0140327 A1 | 5/2017 | Lindbo |
| 2017/0166400 A1 | 6/2017 | Hoffmann |
| 2017/0217681 A1 | 8/2017 | Tai |
| 2017/0256428 A1 | 9/2017 | Kawamura |
| 2017/0305668 A1 | 10/2017 | Bestic et al. |
| 2017/0313514 A1 | 11/2017 | Lert, Jr. et al. |
| 2017/0323250 A1 | 11/2017 | Lindbo et al. |
| 2017/0369246 A1 | 12/2017 | DeWitt et al. |
| 2018/0025460 A1 | 1/2018 | Watanabe et al. |
| 2018/0036845 A1 | 2/2018 | Thorwarth et al. |
| 2018/0037412 A1 | 2/2018 | Lynch et al. |
| 2018/0039282 A1* | 2/2018 | Gupta .................. G05D 1/0274 |
| 2018/0053148 A1 | 2/2018 | Nelson, Jr. |
| 2018/0093828 A1 | 4/2018 | Lindbo et al. |
| 2018/0128532 A1 | 5/2018 | Hognaland |
| 2018/0134492 A1 | 5/2018 | Lert, Jr. |
| 2018/0148259 A1 | 5/2018 | Gravelle et al. |
| 2018/0150793 A1 | 5/2018 | Lert, Jr. et al. |
| 2018/0162639 A1 | 6/2018 | Ingram-Tedd et al. |
| 2018/0170650 A1 | 6/2018 | Lindbo et al. |
| 2018/0194556 A1 | 7/2018 | Lert, Jr. et al. |
| 2018/0215543 A1 | 8/2018 | Lert, Jr. et al. |
| 2018/0216342 A1 | 8/2018 | Lert, Jr. |
| 2018/0218320 A1 | 8/2018 | Lee et al. |
| 2018/0218469 A1 | 8/2018 | Lert, Jr. et al. |
| 2018/0247257 A1 | 8/2018 | Lert, Jr. et al. |
| 2018/0257863 A1 | 9/2018 | Lert, Jr. |
| 2018/0290831 A1 | 10/2018 | Wolf et al. |
| 2018/0305122 A1 | 10/2018 | Moulin et al. |
| 2018/0305123 A1 | 10/2018 | Lert, Jr. et al. |
| 2018/0319590 A1 | 11/2018 | Lindbo et al. |
| 2018/0322444 A1 | 11/2018 | Todeschini |
| 2018/0335502 A1 | 11/2018 | Lowe et al. |
| 2018/0341908 A1 | 11/2018 | Lert et al. |
| 2018/0346243 A1 | 12/2018 | Lindbo et al. |
| 2019/0168964 A1 | 6/2019 | Lert |
| 2019/0176323 A1 | 6/2019 | Coady et al. |
| 2019/0194971 A1 | 6/2019 | Shinnaka et al. |
| 2019/0198370 A1 | 6/2019 | Abe et al. |
| 2019/0233213 A1 | 8/2019 | Phan-Quiroga et al. |
| 2020/0024114 A1 | 1/2020 | Uchimura et al. |
| 2020/0031576 A1 | 1/2020 | Lert et al. |
| 2020/0071076 A1 | 3/2020 | Fosnight et al. |
| 2020/0302391 A1 | 9/2020 | Li et al. |
| 2021/0253348 A1 | 8/2021 | Austrhelm et al. |

FOREIGN PATENT DOCUMENTS

| | | | | |
|---|---|---|---|---|
| CA | 2077165 C | 4/1993 | | |
| CA | 2673932 A1 | 7/2008 | | |
| CA | 2795022 A1 | 9/2012 | | |
| CA | 2872496 A1 | 10/2013 | | |
| CA | 2885984 A1 | 5/2014 | | |
| CA | 2890843 A1 | 6/2014 | | |
| CA | 2846273 A1 | 9/2014 | | |
| CA | 2920361 A1 | 12/2014 | | |
| CA | 2942445 A1 | 9/2015 | | |
| CA | 2944332 A1 | 10/2015 | | |
| CA | 2953028 A1 | 12/2015 | | |
| CN | 1452105 A | 10/2003 | | |
| CN | 204612307 U | 9/2015 | | |
| CN | 106185152 A | 12/2016 | | |
| CN | 107000943 B | * | 8/2018 | ............. B25J 5/007 |
| CN | 108502431 A | 9/2018 | | |
| CN | 111661538 A | 9/2020 | | |
| DE | 10011205 A1 | 9/2001 | | |
| DE | 102009017241 A1 | 10/2010 | | |
| DE | 102017222801 A1 | 6/2019 | | |
| EP | 0071883 B1 | 12/1986 | | |
| EP | 0599032 A1 | 1/1994 | | |
| EP | 1452462 A2 | 9/2004 | | |
| EP | 2121204 A2 | 11/2009 | | |
| EP | 3056453 A1 | 8/2016 | | |
| EP | 3385893 A1 | 10/2018 | | |
| EP | 3166876 B1 | 11/2018 | | |
| FR | 2614609 A1 | 11/1988 | | |
| GB | 1432224 A | 4/1973 | | |
| GB | 2419977 A | 10/2006 | | |
| GB | 2461722 A | 1/2010 | | |
| GB | 2542651 A | 3/2017 | | |
| GB | 2544348 A | 5/2017 | | |
| GB | 2544649 A | 5/2017 | | |
| GB | 2544650 A | 5/2017 | | |
| GB | 2565883 A | 2/2019 | | |
| JP | S56155362 A | 12/1981 | | |
| JP | S61-256799 A | 11/1986 | | |
| JP | S62222901 A | 9/1987 | | |
| JP | H1133802 A | 5/1989 | | |
| JP | H03143802 A | 6/1991 | | |
| JP | H0620930 B2 | 3/1994 | | |
| JP | H06305353 A | 11/1994 | | |
| JP | 2000327111 A | 11/2000 | | |
| JP | 2002032449 A | 1/2002 | | |
| JP | 2002056308 A | 2/2002 | | |
| JP | 3271509 B2 | 4/2002 | | |
| JP | 2002269417 A | 9/2002 | | |
| JP | 2003341810 A1 | 12/2003 | | |
| JP | 2004323169 A | 11/2004 | | |
| JP | 2005-177905 A | 7/2005 | | |
| JP | 2006176304 A | 7/2006 | | |
| JP | 2007246226 A | 9/2007 | | |
| JP | 2010-235212 A | 10/2010 | | |
| JP | 2013-256371 A | 12/2013 | | |
| JP | 5562646 B2 | 7/2014 | | |
| JP | 2015-087964 A | 5/2015 | | |
| JP | 2015-157687 A | 9/2015 | | |
| JP | 2015-199563 A | 11/2015 | | |
| JP | 2016-505053 A | 2/2016 | | |
| JP | 2016-055963 A | 4/2016 | | |
| JP | 2017206352 A | 11/2017 | | |
| JP | 2018-526701 A | 9/2018 | | |
| JP | 2019008678 A | 1/2019 | | |
| KR | 101289249 B1 | 1/2013 | | |
| KR | 101489337 B1 | 2/2015 | | |
| NO | 20181005 A1 | 12/2019 | | |
| WO | WO 2000/068859 A2 | 5/2000 | | |
| WO | WO 2003/060752 A1 | 1/2003 | | |
| WO | WO 2003/079153 A2 | 9/2003 | | |
| WO | WO 2007/011814 A2 | 1/2007 | | |
| WO | WO 2007/068406 A1 | 6/2007 | | |

(56) References Cited

FOREIGN PATENT DOCUMENTS

| | | |
|---|---|---|
| WO | WO 2011/150131 A1 | 12/2011 |
| WO | WO 2012/083060 A1 | 6/2012 |
| WO | WO 2012/122090 A1 | 9/2012 |
| WO | WO 2013/142106 A1 | 9/2013 |
| WO | WO 2013/155107 A1 | 10/2013 |
| WO | WO 2014/022791 A1 | 2/2014 |
| WO | WO 2014/055716 A1 | 4/2014 |
| WO | WO 2014/090684 A1 | 6/2014 |
| WO | WO 2014/203126 A1 | 12/2014 |
| WO | WO 2015/019055 A1 | 2/2015 |
| WO | WO 2015/042587 A2 | 3/2015 |
| WO | WO 2015/124610 A1 | 8/2015 |
| WO | WO 2015/134529 A1 | 9/2015 |
| WO | WO 2015/185628 A2 | 12/2015 |
| WO | WO 2015/197696 A1 | 12/2015 |
| WO | WO 2016/100045 A1 | 6/2016 |
| WO | WO 2016/112037 A1 | 7/2016 |
| WO | WO 2016/130222 A1 | 8/2016 |
| WO | WO 2016/166323 A1 | 10/2016 |
| WO | WO 2016/166353 A1 | 10/2016 |
| WO | WO 2016/172253 A1 | 10/2016 |
| WO | WO 2016/173445 A1 | 11/2016 |
| WO | WO 2016/196815 A1 | 12/2016 |
| WO | WO 2017/097724 A1 | 6/2017 |
| WO | WO 2017/108383 A1 | 6/2017 |
| WO | WO 2017/121512 A1 | 7/2017 |
| WO | WO 2017/197121 A1 | 11/2017 |
| WO | WO 2017/211596 A1 | 12/2017 |
| WO | WO 2017/211640 A1 | 12/2017 |
| WO | WO 2018/069282 A1 | 1/2018 |
| WO | WO 2017/097724 A | 2/2018 |
| WO | WO 2018/072924 A1 | 4/2018 |
| WO | WO 2018/94286 A1 | 5/2018 |
| WO | WO 2018/102444 A1 | 6/2018 |
| WO | WO 2018/132500 A1 | 7/2018 |
| WO | WO 2018/144622 A1 | 8/2018 |
| WO | WO 2018/144625 A1 | 8/2018 |
| WO | WO 2018/144626 A1 | 8/2018 |
| WO | WO 2018/156966 A1 | 8/2018 |
| WO | WO 2018/162757 A1 | 9/2018 |
| WO | WO 2018/187308 A1 | 10/2018 |
| WO | WO 2018/195200 A1 | 10/2018 |
| WO | WO 2016/172793 A1 | 11/2018 |
| WO | WO 2019/000106 A1 | 1/2019 |
| WO | WO 2019/001816 A1 | 1/2019 |
| WO | WO 2019/094511 A1 | 5/2019 |
| WO | WO 2019/141877 A1 | 7/2019 |
| WO | WO 2019/145237 A2 | 8/2019 |
| WO | WO 2019/197497 A1 | 10/2019 |
| WO | WO 2019/232613 A1 | 12/2019 |
| WO | WO 2019/232651 A1 | 12/2019 |
| WO | WO 2019/232652 A1 | 12/2019 |
| WO | WO 2019/238641 A1 | 12/2019 |
| WO | WO 2019/238645 A2 | 12/2019 |
| WO | WO 2019/238664 A1 | 12/2019 |
| WO | WO 2019/238698 A1 | 12/2019 |
| WO | WO 2019/243549 A1 | 12/2019 |
| WO | WO 2020/006010 A1 | 1/2020 |
| WO | WO 2020/178692 A1 | 9/2020 |
| WO | WO 2020/183427 A1 | 9/2020 |
| WO | WO 2020/229973 A1 | 11/2020 |
| WO | WO 2020/250166 A1 | 12/2020 |
| WO | WO 2021/038437 A1 | 3/2021 |
| WO | WO 2021/108899 A1 | 6/2021 |

OTHER PUBLICATIONS

International Search Report and Written Opinion for PCT/CA2019/050815 issued Dec. 12, 2019.
Aized, T. "Materials handling in flexible manufacturing systems," Future Manufacturing Systems, Sciyo (Aug. 17, 2010) pp. 121-136, Sciyo Publishing.
Alicke et al., "Supply Chain 4.0—the next-generation digital supply chain," Supply Chain Management (Jun. 1, 2016) Mckinsey & Company, in 16 pages.
Dematic Group S.A.R.L., "Dematic RapidStore ASRS," Apr. 2016.
Dittmer et al. "The Intelligent Container as a Part of the Internet of Things", Proceedings of the 2012 IEEE International Conference on Cyber Technology in Automation, Control and Intelligent Systems, (May 27-31, 2012) Bankok, Thailand, p. 209-214.
Exotec "Exotec | Our Projects—Site Specificity | Cdiscount" Document D3 in in Pre-Grant Opposition by Third Party filed on Jun. 8, 2023 in respect of Indian Patent Application No. IN202147055222, in 5 pages.
Ferguson, M. "What We Like This Week: Bricks, Bots, and Better Architecture", Autodesk, (Jul. 27, 2018) https/ reek-9727186, in 2 pages.
Penske, "Manage the Returnable Container Process - Penske Logistics," accessed Dec. 4, 2024, ht , in 6 pages.
Robinson, A., "How Supply Chain Systems Integration is a Game Changer," Industry Week, (Jul. 3, 2018) L in 9 pages.
Sap, "Consolidation to Free up Storage Bins / Bulk Bin Consolidation," Extended Warehouse Management, Feb. 2020, https:help.sap.com/docs/SAP S4HANA ON PREMISE/9832125c23154a179bfa1784cdc9577a/8e272d06364eaeb9.html?&version=1909.001, in 3 pages.
Schrauf & Berttram, "How Digitization Makes the Supply Chain More Efficient, Agile, and Customer-focused", Strategy&—Industry 4.0, (2016) in 32 Pages.
Twede et al., "Cartons, Crates and Corrugated Board", Handbook of Paper and Wood Packaging Technology, 2nd edition, DEStech Publications, Inc., 2015.
Vogt et al. "Explorative investigation of application scenarios for smart bin systems", International Conference on Competitive Manufacturing Proceedings (Jan. 30, 2019) Stellenbosch, South Africa, p. 124-130.
Witron Logistik + Informatic Gmbh, "All-in-One: Order Fulfillment at a new level" archived May 18, 2022, accessed Dec. 4, 2024, https://web.archive.org/web/20220518154647/https://www.witron.de/en/aio-all-in-one.html, in 6 pages.
Yornew Automation Equipment col. Ltd., "Cim and FMS Systems," accessed Dec. 4, 2024, http://www.yornew.com/en/cim.aso, in 5 pages.

* cited by examiner

FIG. 3

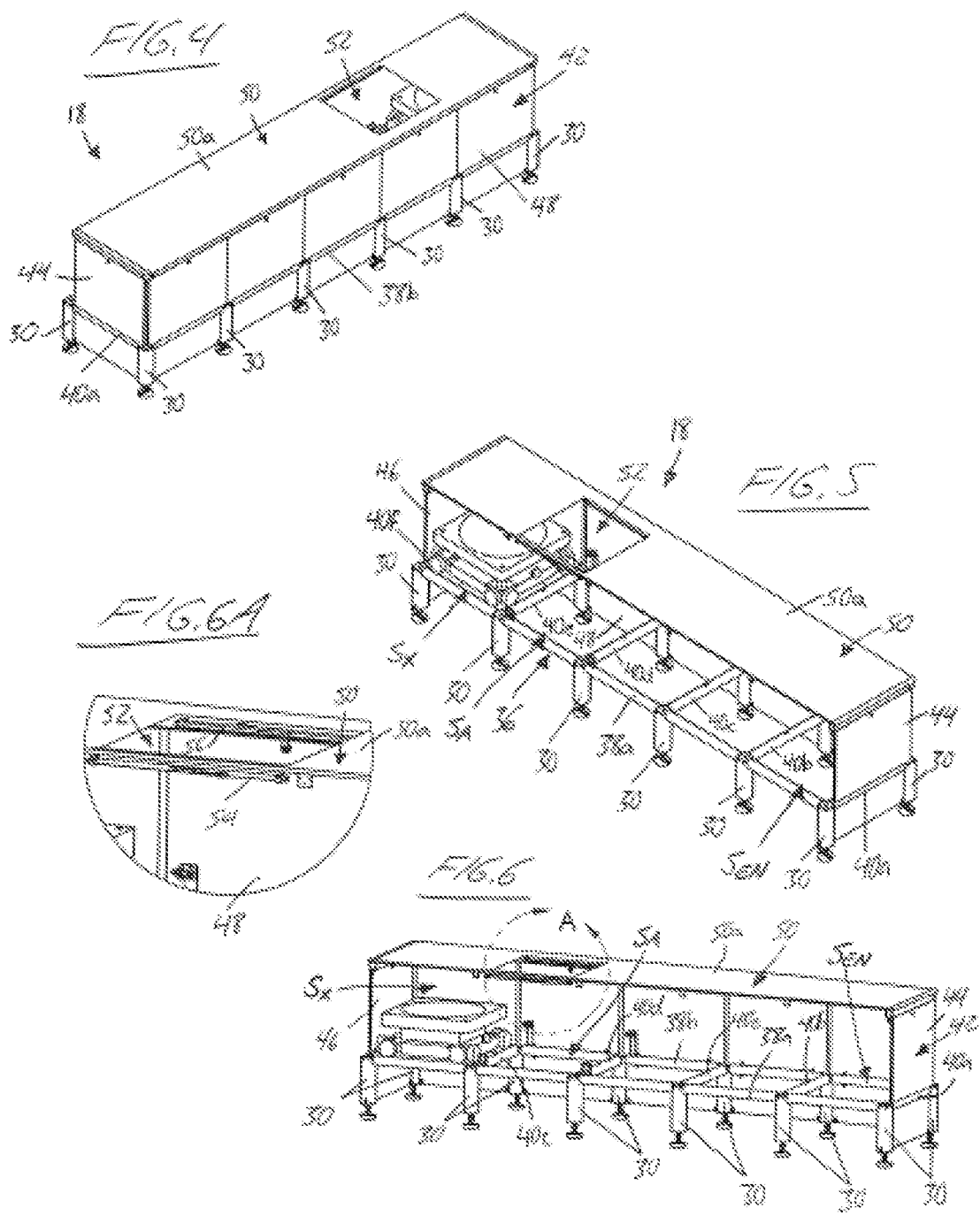

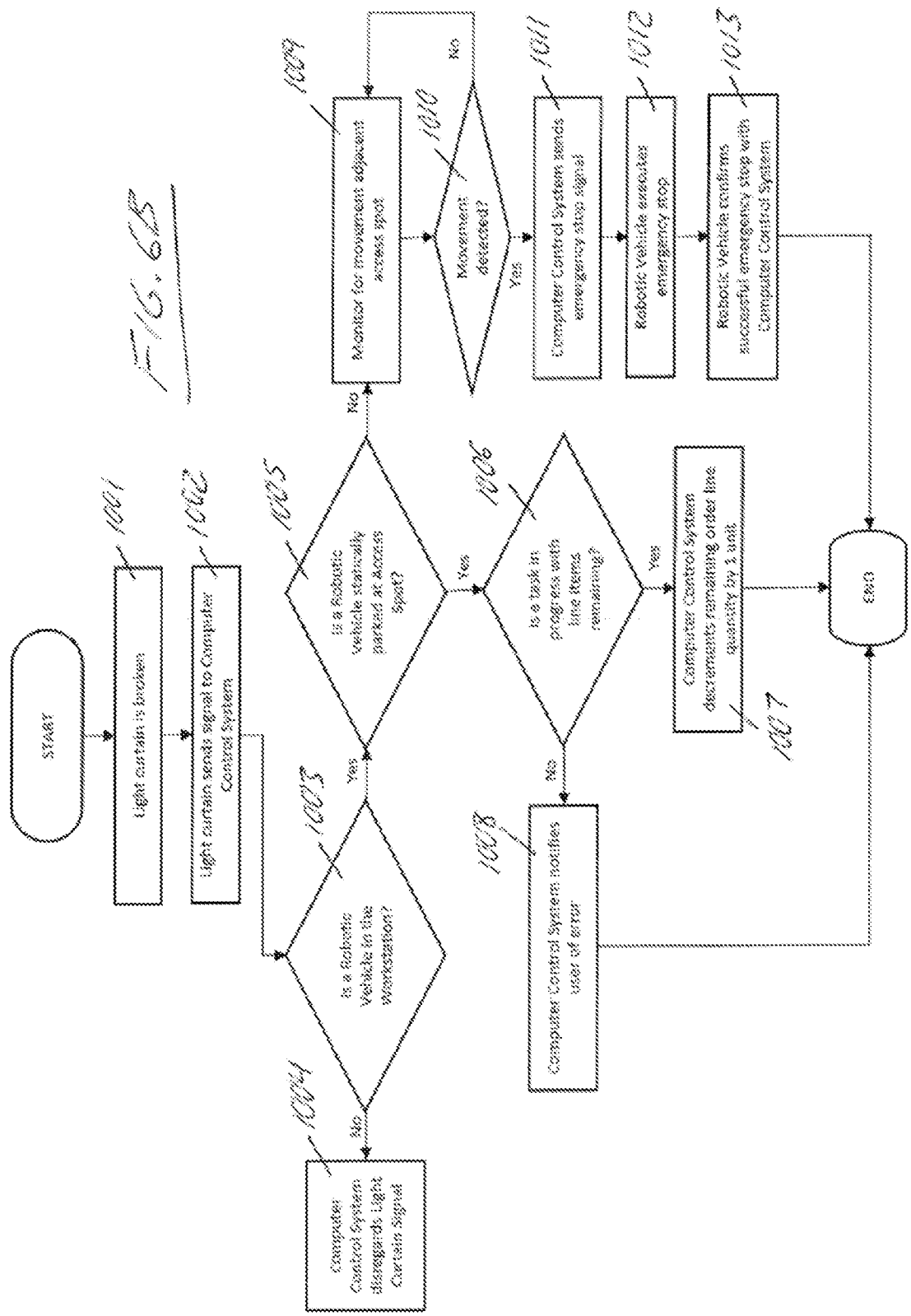

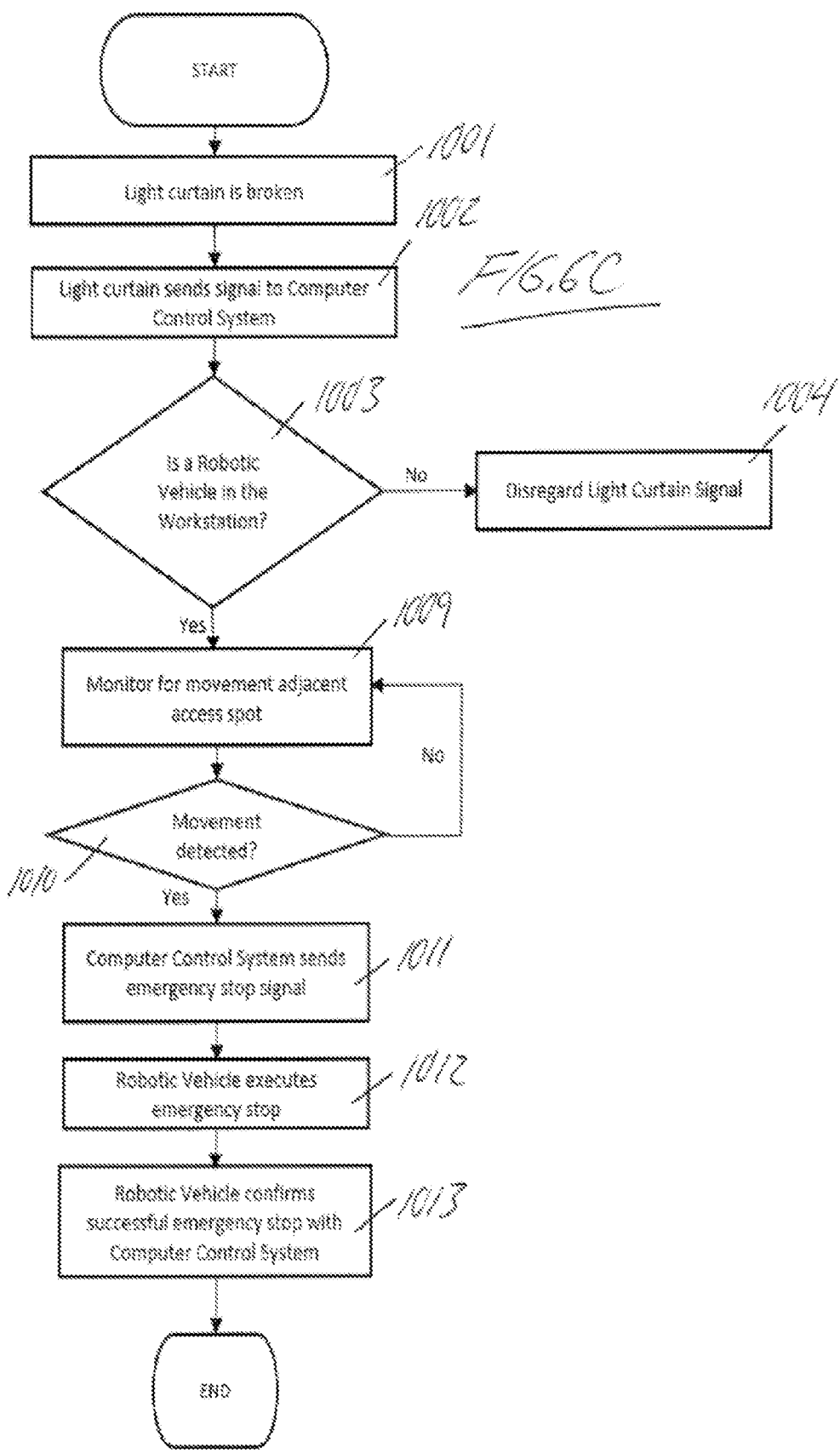

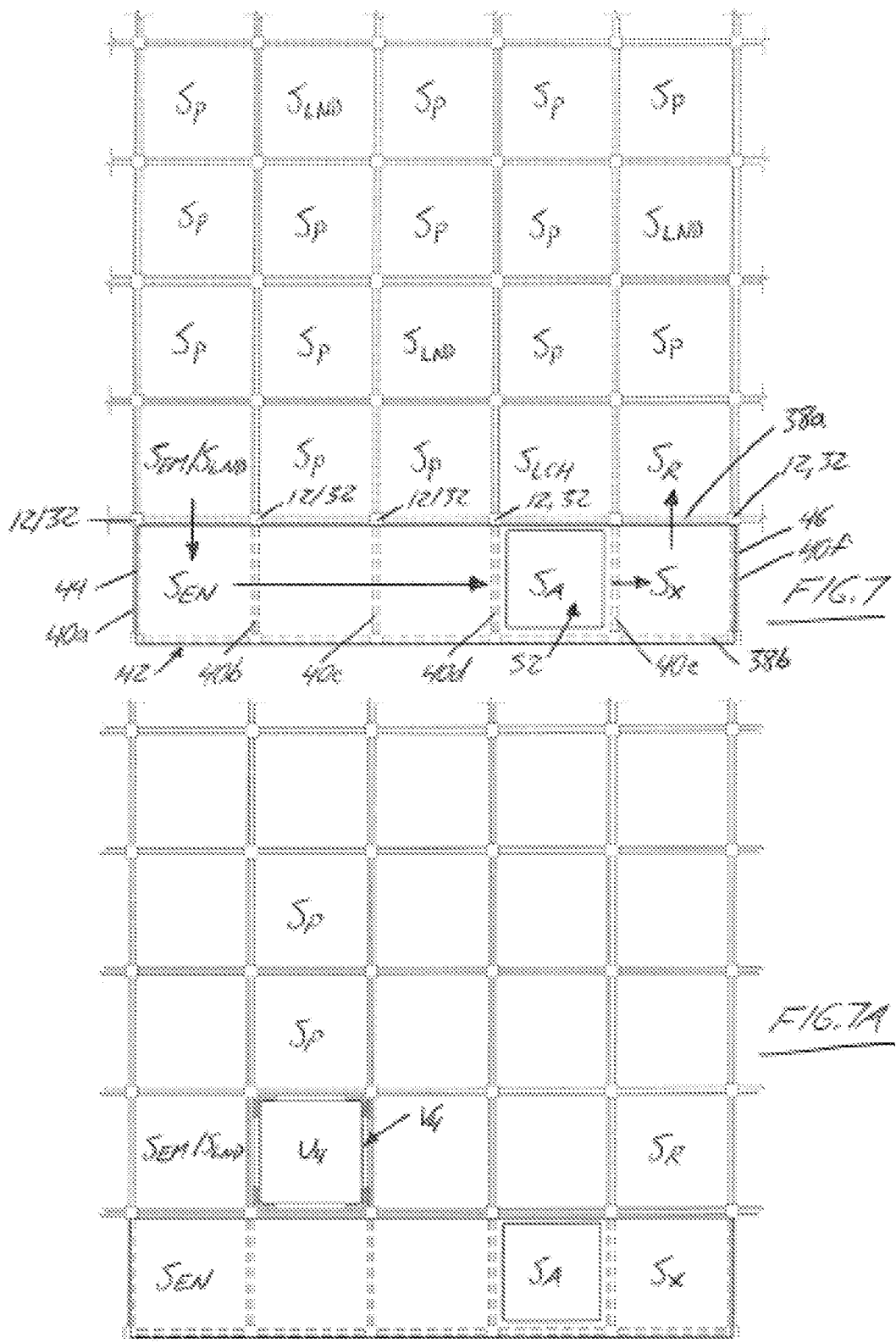

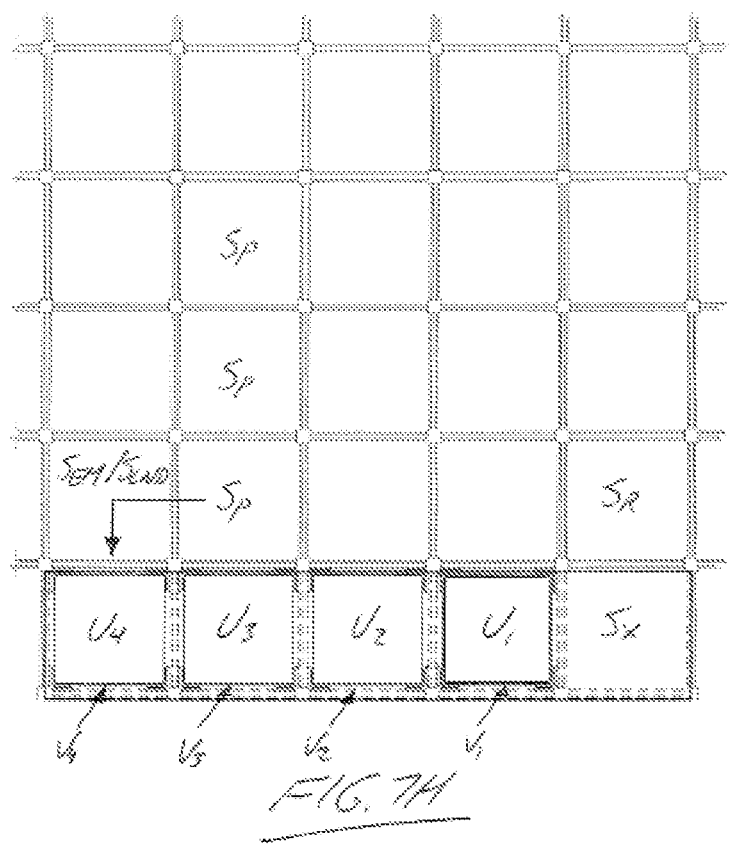

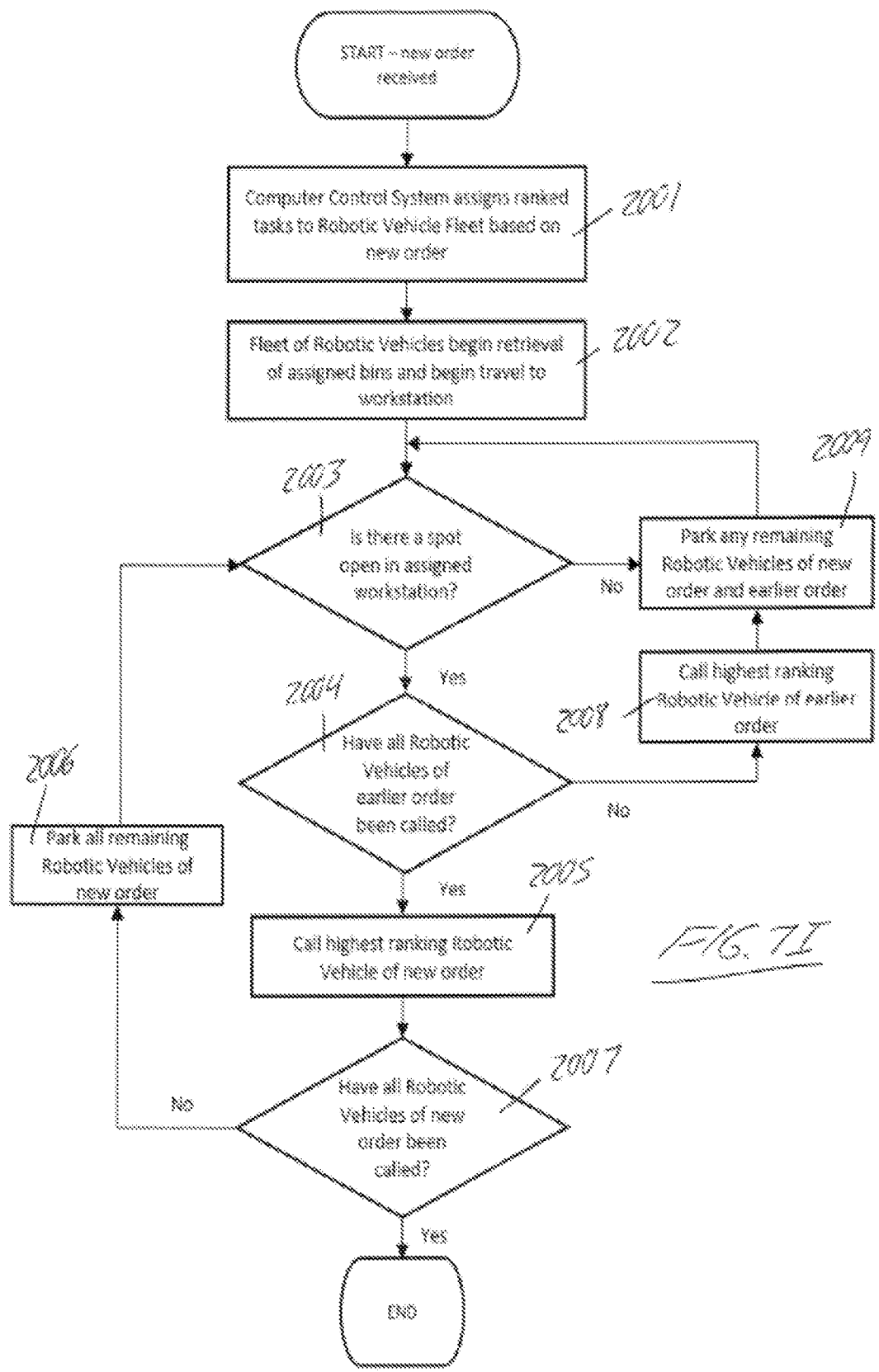

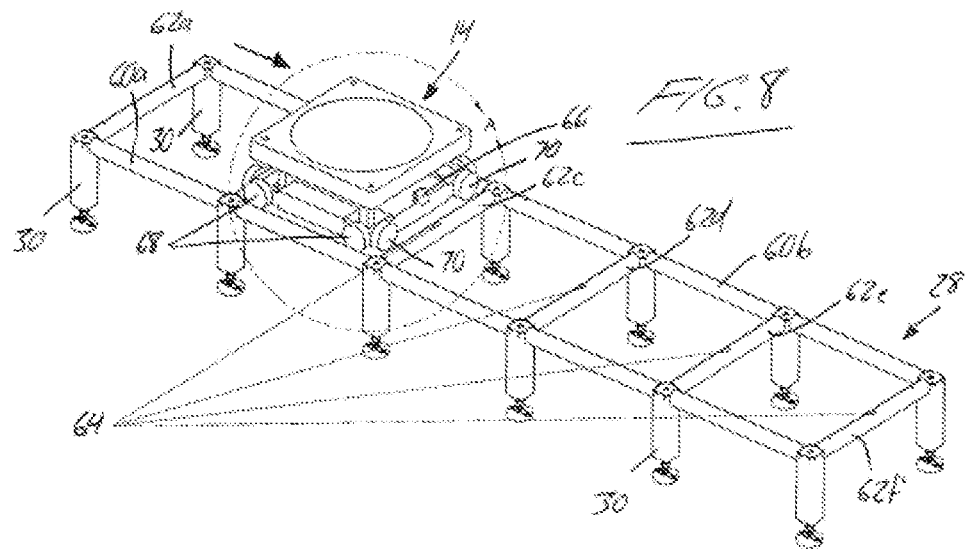

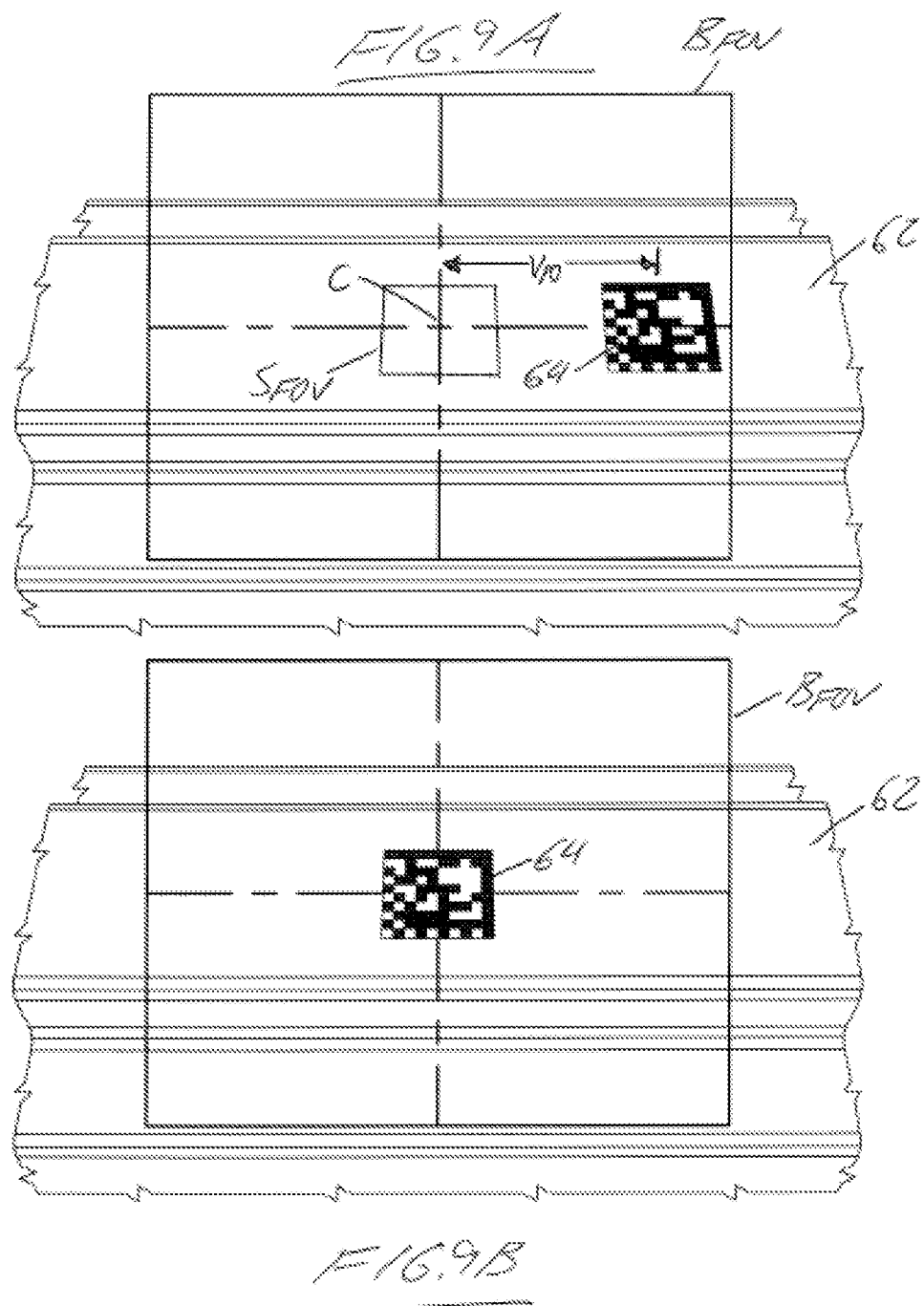

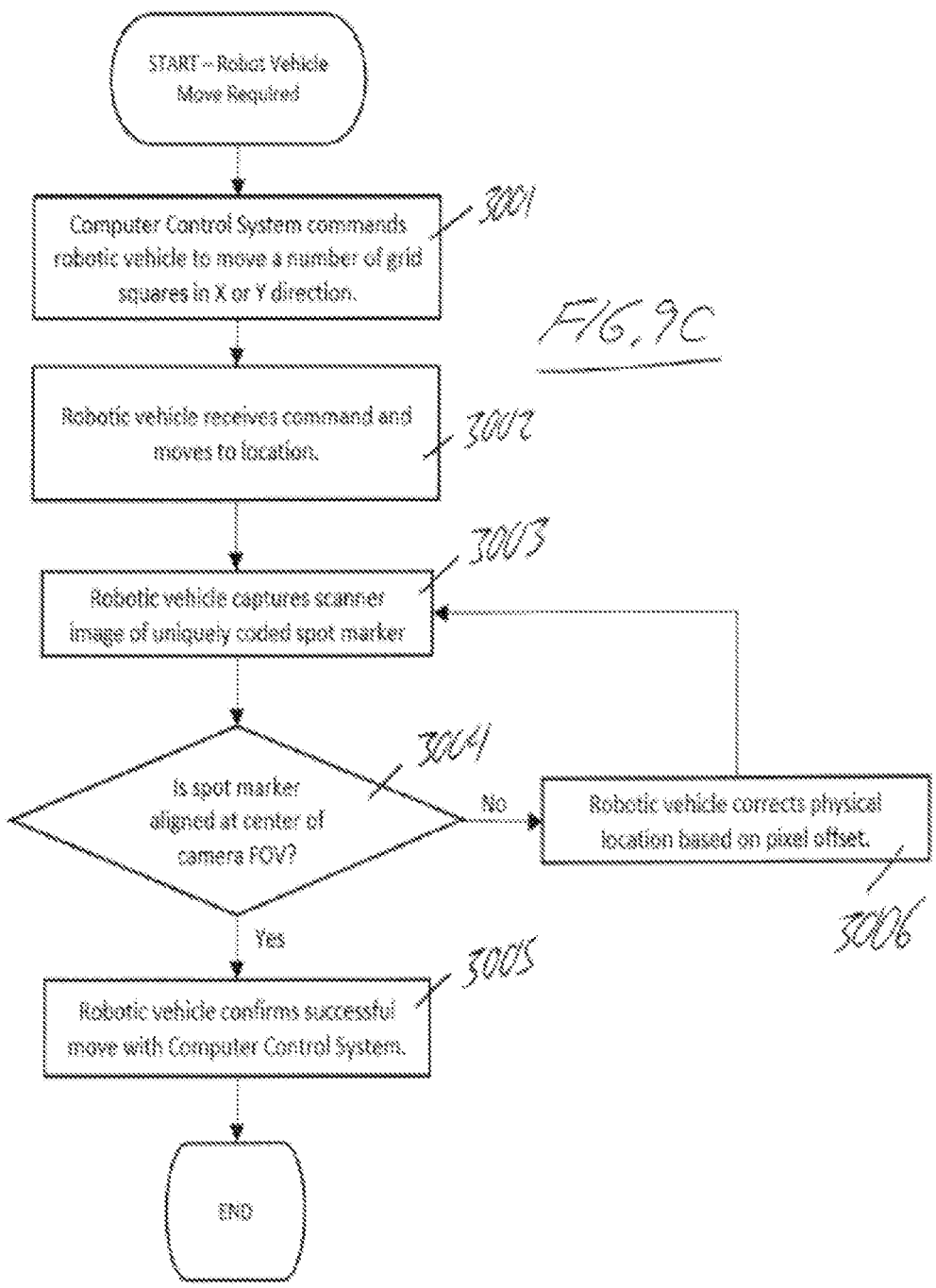

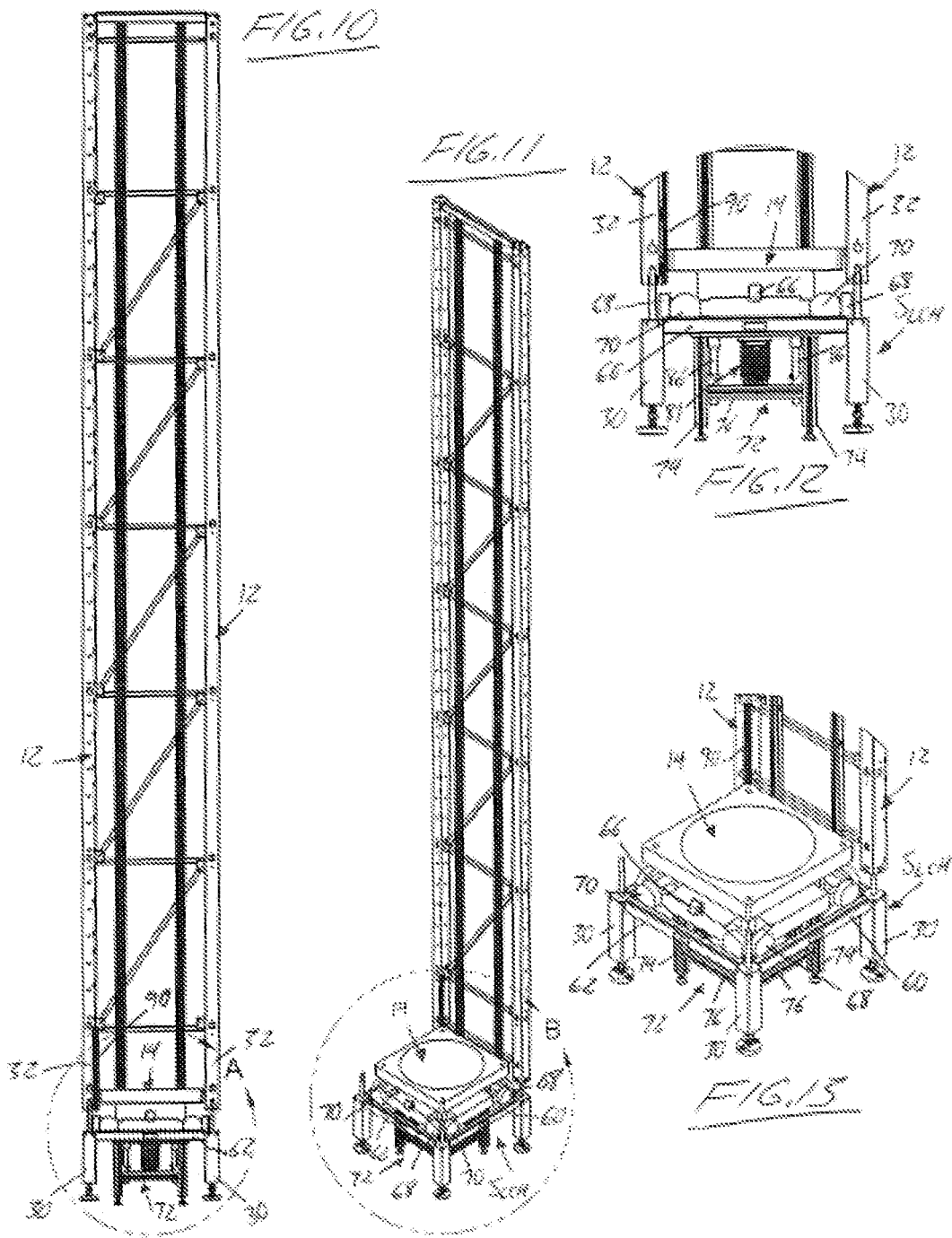

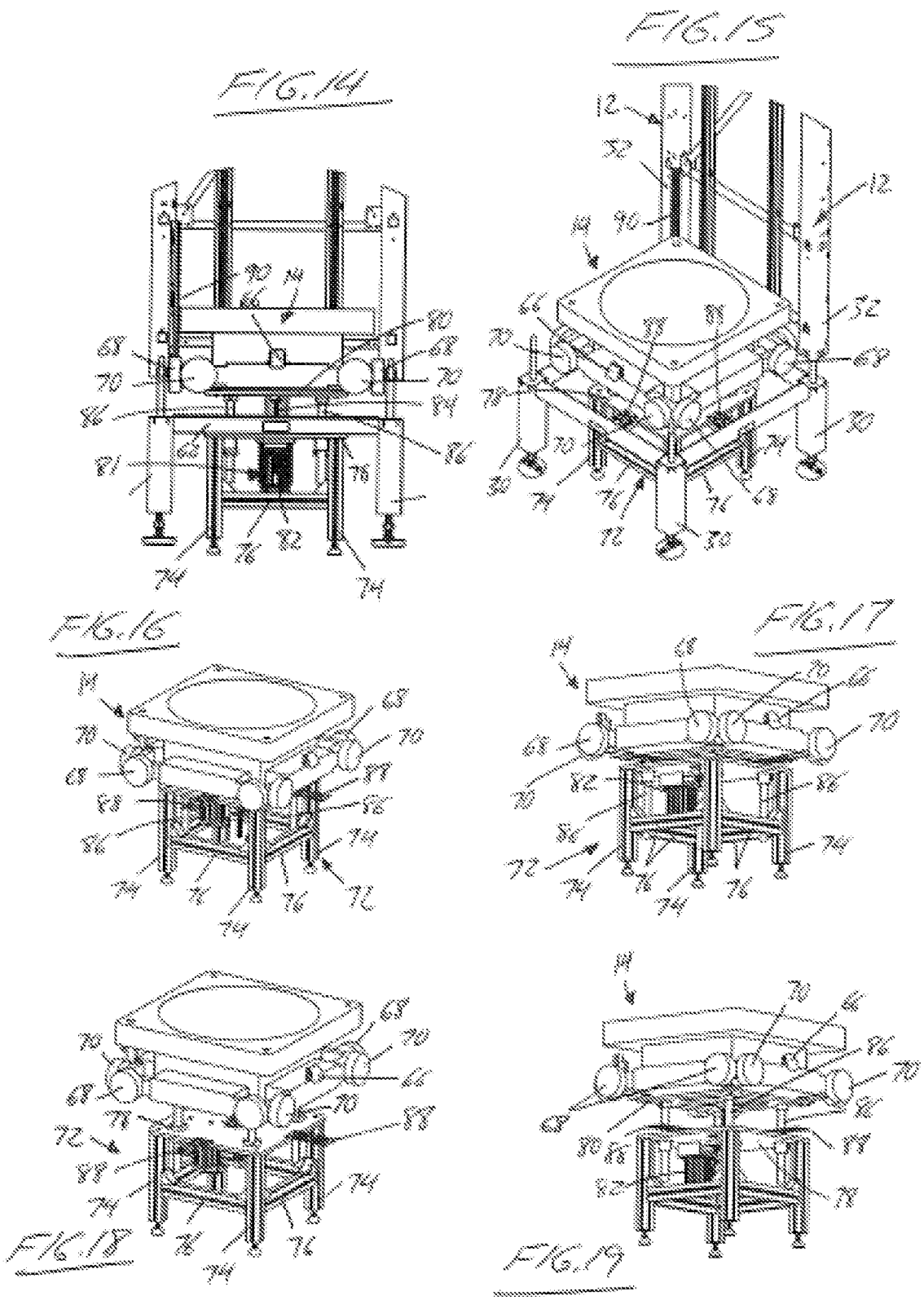

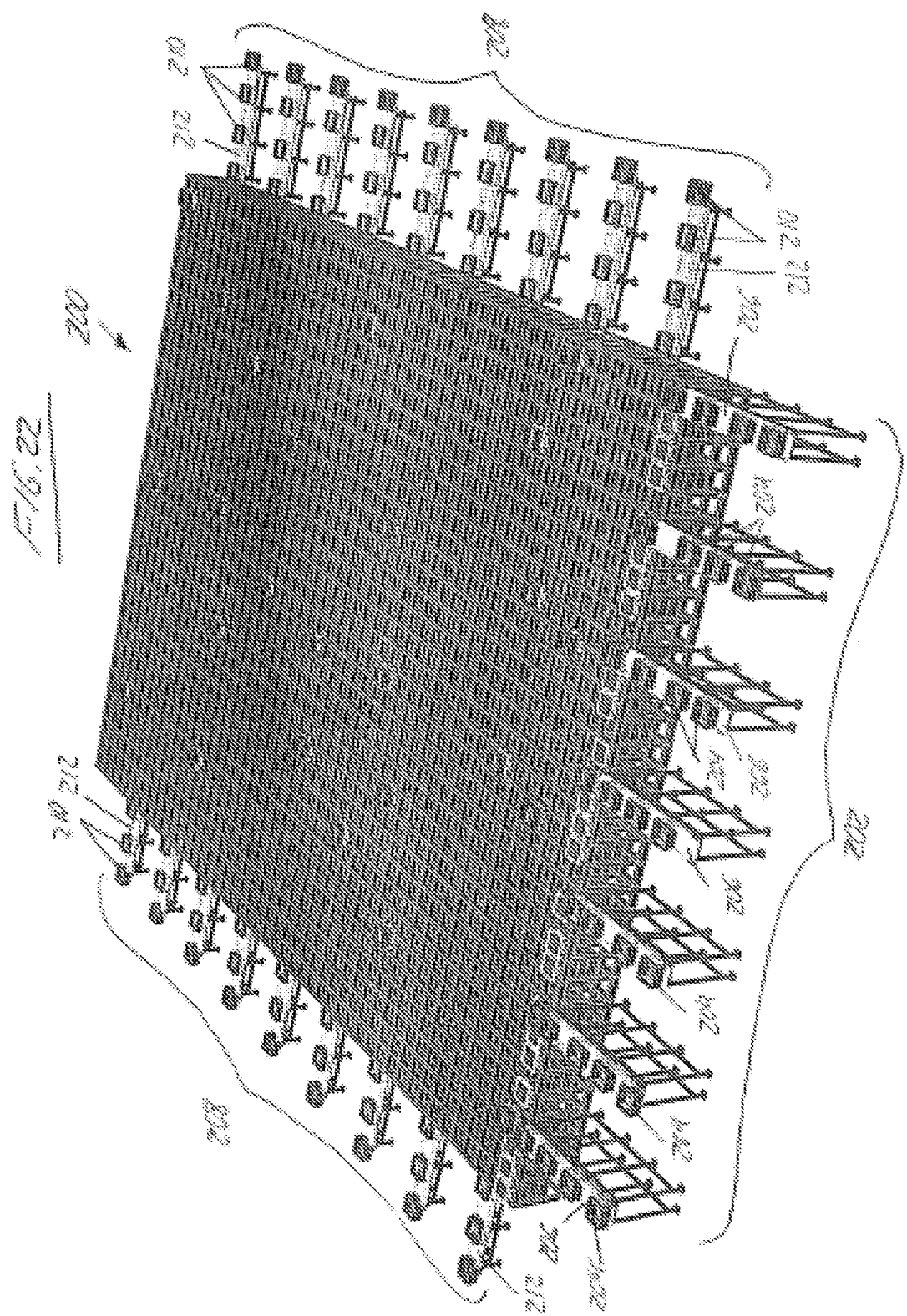

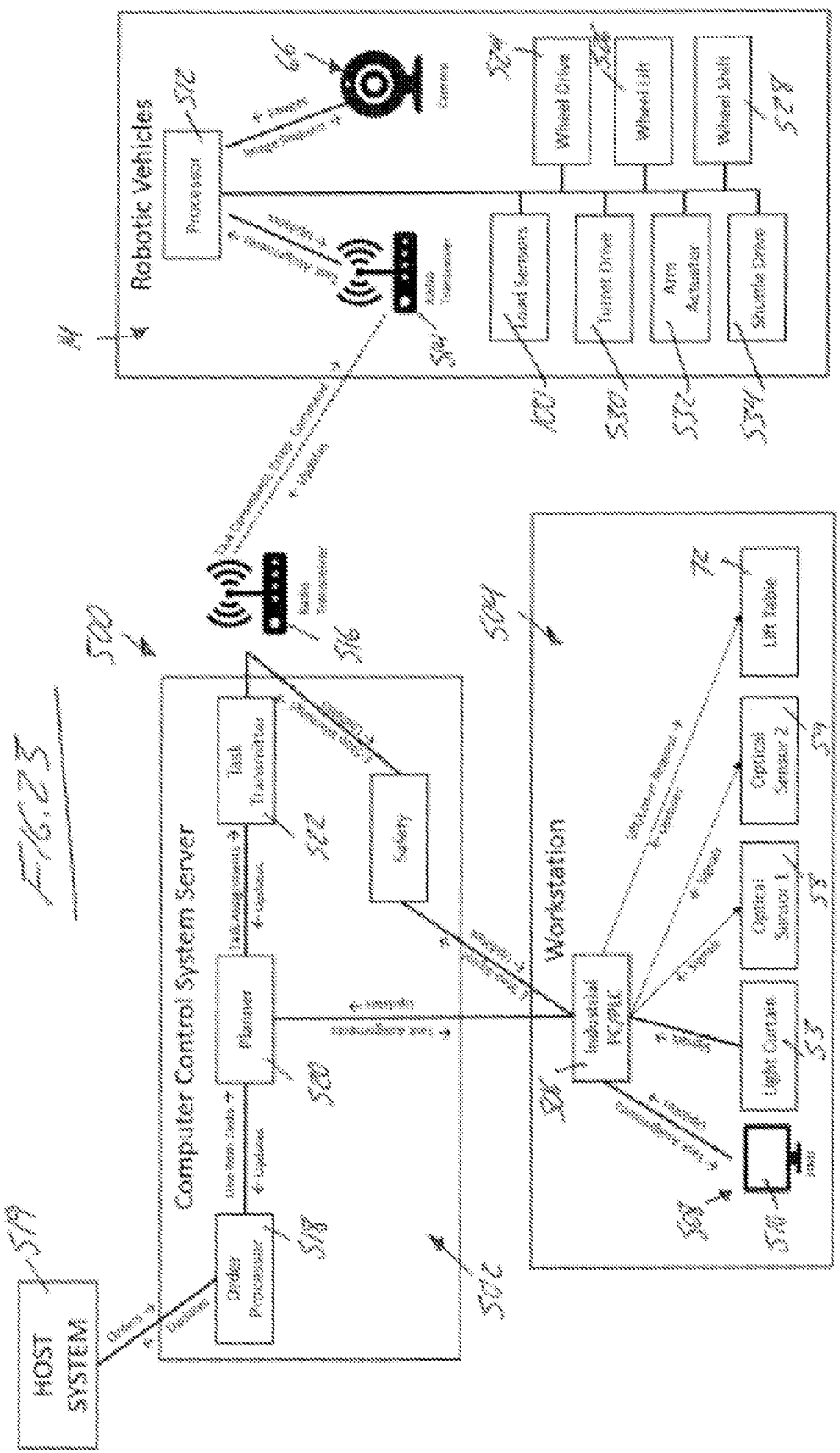

STORAGE AND RETRIEVAL SYSTEM FOR MANAGING LOADING, ALIGNMENT, AND TRAVEL OF STORAGE UNITS AND ROBOTIC VEHICLES

CROSS-REFERENCE TO RELATED APPLICATIONS

This application is a national stage application of the Patent Cooperation Treaty (PCT) international application titled "Improved Storage and Retrieval Systems", international application number PCT/CA2019/050815, filed in the Canadian Intellectual Property Office on Jun. 10, 2019, which claims priority to and the benefit of the provisional patent application titled "Improved Storage and Retrieval System", application No. 62/682,691, filed in the United States Patent and Trademark Office (USPTO) on Jun. 8, 2018 and the provisional patent application titled "Improved Storage and Retrieval Systems", application No. 62/770,788, filed in the USPTO on Nov. 22, 2018, each of which is incorporated herein by reference in its entirety.

BACKGROUND

Technical Field

The present invention relates generally to automated storage and retrieval systems useful in order fulfillment environments.

Description of the Related Art

Applicant's prior PCT application published as WO2016/172793 disclosed a goods-to-man storage and retrieval system employing a three-dimensional storage grid structure in which a fleet of robotic storage/retrieval vehicles navigate a three-dimensional array of storage locations in which respective bins or other storage units are held. The storage/retrieval vehicles travel horizontally in two dimensions on both a gridded upper track layout disposed above the three-dimensional array of storage locations, and a gridded lower track layout disposed at ground level below the array of storage locations. The same storage/retrieval vehicles also traverse the structure in the third vertical dimension through vertically upright shafts that join together the upper and lower track layouts. Each column of storage locations is neighboured by one of these upright shafts, whereby each and every storage location in the grid is directly accessible by the storage/retrieval vehicles.

Continued development has led to numerous improvements in the system design, and novel applications for same, the details of which will become more apparent from the following disclosure.

SUMMARY OF THE INVENTION

According to a first aspect of the invention, there is provided a working station for a goods-to-person fulfillment system, said working station comprising:
  a defined pathway through which a retrieved storage unit is conveyed during use of said working station;
  an enclosure spanning at least partially around said defined pathway;
  an access opening through said enclosure by which a given storage unit conveyed along the defined pathway is accessible upon arrival at said access opening; and
  a sensing mechanism operable to detect insertion of worker hands at said access opening.

According to a second aspect of the invention, there is provided a storage system comprising:
  one or more storage/retrieval vehicles;
  a gridded three-dimensional structure comprising:
    a gridded track layout that occupies a two-dimensional area and on which the one or more storage/retrieval vehicles are conveyable in two directions over said two-dimensional area;
    a plurality of storage columns residing above or below the gridded track layout and distributed within the two-dimensional area of said gridded track layout, each storage column comprising a plurality of storage locations arranged one over another and sized to accommodate placement and storage of storage units therein; and
    a plurality of upright shafts residing above or below the gridded track layout and distributed within the two-dimensional area of said gridded track layout, each storage column being neighboured by a respective one of the upright shafts through which the storage locations of said storage column are accessible by the one or more storage/retrieval vehicles to place or remove the storage units to or from said storage locations of said storage column; and
    a set of detectable markers and a set of sensors operable to detect said detectable markers, wherein a first of either said detectable markers or said sensors are supported within the gridded three-dimensional structure at or near spots in the gridded track layout that overlie or underlie the upright shafts, and a second of either said detectable markers or said sensors are carried on said one or more storage retrieval vehicles;
  wherein, during arrival of any one of said one or more storage/retrieval vehicles at a respective spot overlying or underlying a targeted shaft for which said one of the one or more storage/retrieval vehicles is destined, detection of a respective detectable marker by one of the sensors is used to check, and adjust if necessary, alignment of said storage/retrieval vehicle with the targeted shaft before attempting transition of said storage/retrieval vehicle from said gridded track layout into the targeted shaft.

According to a third aspect of the invention, there is provided a method of controlling positioning of one or more storage/retrieval vehicles in a gridded three-dimensional structure in which said one or more storage/retrieval vehicles are conveyable in two dimensions on a gridded track layout and in a third dimension through upright shafts whose upright axes intersect said gridded track layout, said method comprising:
  (a) having a first of either a set of detectable markers or a set of sensors supported on the gridded three-dimensional structure at or near spots of the gridded track layout that overlie or underlie the upright shafts, and having a second of either said set of detectable markers or said set of sensors carried on said one or more storage/retrieval vehicles, wherein said sensors are operable to detect said detectable markers;
  (b) during arrival of any one of the storage/retrieval vehicles at a respective spot overlying or underlying a targeted shaft for which said any one of the storage/retrieval vehicles is destined, using one of the sensors to detect one of the detectable markers; and (c) using detection of the detectable marker by said one of the sensors to check, and adjust if necessary, alignment of said storage/retrieval vehicle with the targeted shaft before attempting transition of said any one of the storage/retrieval vehicles from said gridded track layout into the targeted shaft.

According to a fourth aspect of the invention, there is provided a storage system comprising:
one or more storage/retrieval vehicles
a three-dimensional structure comprising:
   a lower track layout on which said one or more storage/retrieval vehicles are conveyable; and
   a plurality of storage columns residing above the lower track layout, each storage column comprising a plurality of storage locations that are arranged one over another, are each sized to accommodate placement and storage of storage units therein, and are each accessible by the one or more storage/retrieval vehicles to place or remove the storage units to or from said storage locations of said storage column; and
   at launching spots of the lower track layout from which the storage/retrieval vehicles are to travel upwardly from the lower track layout, respective lifting mechanisms operable to lift any one of the storage/retrieval vehicles upwardly from the lower track layout.

According to a fifth aspect of the invention, there is provided a storage/retrieval vehicle for carrying storage units in an automated storage system, said storage/retrieval vehicle comprising an upper platform having a landing area of similar size and shape to an underside of one of said storage units, and a set of load status sensors at positions closely adjacent an outer perimeter of said landing area, whereby detection of the underside of said one of the storage units by all of said load status sensors confirms a fully loaded and properly aligned status of said one of the storage units on a platform of the storage/retrieval vehicle, while detection of the underside of the one of the storage units by only a subset of said load status sensors indicates a partially loaded or improperly aligned status of said one of the storage units on said platform.

According to a sixth aspect of the invention, there is provided a method of preparing and buffering order shipments, said method comprising:
(a) having a gridded three-dimensional storage system comprising:
   a plurality of storage/retrieval vehicles;
   a three-dimensional structure comprising:
      a gridded track layout that occupies a two-dimensional area and on which the storage/retrieval vehicles are conveyable in two directions over said two-dimensional area; and
      a plurality of storage columns residing above or below the gridded track layout and distributed within the two-dimensional area of said gridded track layout, each storage column comprising a plurality of storage locations that are arranged one over another, are sized to accommodate placement and storage of one or more items therein, and are each accessible by the storage/retrieval vehicles to place or remove the items to or from said storage locations of said storage column; and
   at least one working station to which items removed from the storage locations and conveyed to the gridded track layout are deliverable by travel of the storage/retrieval vehicles along said gridded track layout to an entrance of said working station;

(b) having a group of the storage/retrieval vehicles retrieve a particular collection of items required to fulfill an order and carry the retrieved items to the gridded track layout and onward to the entrance of the working station; and
(c) at the working station, amalgamating the particular collection of items to form a fully or partially fulfilled order, and placing said fully or partially fulfilled order into a container; and
(d) with said container loaded onto one of the storage/retrieval vehicles at the working station, having said one of the storage/retrieval vehicles travel to one of the storage locations and deposit said container at said one of the storage locations, thereby storing said fully or partially fulfilled order for further completion or shipment at a later time.

According to a seventh aspect of the invention, there is provided a sortation/buffering system for shipping containers, said sortation/buffering system comprising:
one or more storage/retrieval vehicles having each having a loading area at which said storage/retrieval vehicle is arranged to selectively carry a shipping container;
a gridded three-dimensional structure comprising:
   a gridded track layout that occupies a two-dimensional footprint and on which the one or more storage/retrieval vehicles are conveyable in two directions over said two-dimensional area;
   a plurality of storage columns residing above or below the gridded track layout in spaced distribution within the two-dimensional footprint of said gridded track layout, each storage column comprising a plurality of storage locations arranged one over another and sized to accommodate placement and storage of shipping containers therein; and
   a plurality of upright shafts residing above or below the gridded track layout in spaced distribution within the two-dimensional footprint of said gridded track layout and through which the one or more storage/retrieval vehicles are configured to travel to and from said gridded track layout in a third dimension, each storage column being neighboured by a respective one of the upright shafts through which the storage locations of said storage column are accessible by the one or more storage/retrieval vehicles to place or remove the shipping containers to or from said storage locations of said storage column.

According to an eighth aspect of the invention, there is provided a method of checking positional accuracy in movement of a vehicle along a path, said method comprising, with a series of detectable markers each situated at a targetable destination along said path, and with an image capture device carried on said vehicle, using said image capture device to capture a digital image from a field of view containing a respective detectable marker upon arrival at one of said targetable destinations, and checking for agreement between a position of said respective detectable marker within the field of view and a predetermined sub-region of the field of view in which the respective marker is expected, whereby said agreement indicates proper alignment of the vehicle relative to the targeted destination.

According to a ninth aspect of the invention, there is provided a track-based conveyance apparatus with positional accuracy monitoring, said apparatus comprising:
a track having a series of detectable markers each situated statically thereon or there adjacent at or adjacent a respective targetable destination along said track;
a vehicle configured for conveyance along said track; and an image capture device carried on said vehicle and configured to capture a digital image from a field of view containing a respective detectable marker upon arrival at one of said targetable destinations, and checking for agreement between a position of said respective detectable marker within the field of view and a predetermined sub-region of the field of view in which the respective detectable marker is expected, whereby said agreement indicates proper alignment of the vehicle relative to the targeted destination.

According to a tenth aspect of the invention, there is provided a method of confirming proper loading of a storage unit onto a robotic storage/retrieval vehicle in an automated storage and retrieval system, said method comprising, as part of a loading routine pulling a storage unit onto the robotic storage/retrieval vehicle, using a local processor of said robotic storage/retrieval vehicle to perform a status check of each of a plurality of load status sensors situated at positions closely adjacent an outer perimeter of a landing area of said robotic storage/retrieval vehicle that is of similar size and shape to an underside of said storage unit, and from said status check, determine whether all of said load status sensors, or only a partial subset thereof, have a positive detection signal, whereby a full set of positive detection signals from all of said load status sensors confirms a fully loaded and properly aligned status of said storage unit, and a partial subset of positive detection signals from only said partial subset of the load status signals identifies a partially loaded or improperly aligned status of the storage unit.

According to an eleventh aspect of the invention, there is provided a method of orchestrating presentation of retrieved storage units from a storage system to an entrance or intake point of a working station in a sequenced manner, said method comprising execution of the following automated steps by one of more processors of a computerized control system of said storage system:
  (a) generating a task assignment for each line item of one or more received orders to be fulfilled at the working station, each task assignment including, at least, specification of a respective storage unit to retrieve from a current storage location thereof in the storage system for delivery to the working station, and identification of a respective storage/retrieval vehicle to retrieve said respective storage unit; and
  (b) transmitting command signals to the respective storage/retrieval vehicles of said task assignments to initiate retrieval and delivery of said respective storage unit from the current storage location thereof to the working station; and
  (c) determining whether there is an available occupancy at said working station;
  (d) in response to confirmation of said available occupancy, identifying from among storage/retrieval vehicles situated outside the working station and assigned to deliver to said working station, a next highest-priority storage/retrieval vehicle to call into the working station; and
  (e) commanding said next highest-priority storage/retrieval vehicle to travel into the working station.

BRIEF DESCRIPTION OF THE DRAWINGS

Preferred embodiments of the invention will now be described in conjunction with the accompanying drawings in which:

FIG. 3 is a simplified partial perspective view of the three-dimensional grid structure of FIG. 2 showing a pair of intersecting outer walls of the grid structure at a corner thereof from which two working stations have been removed to reveal details of said outer walls.

FIG. 4 is an isolated perspective view of one of the working stations from the three-dimensional grid of FIG. 2 from an outer side thereof that faces outwardly from the grid.

FIG. 5 is an isolated perspective view of the working station of FIG. 4 from an inner side thereof that inwardly into the grid.

FIG. 6 is another isolated perspective view of the inner side of the working station of FIG. 5.

FIG. 6A is a partial closeup view of the portion of FIG. 6 marked by detail circle A thereof.

FIG. 6B illustrates a control logic routine executed by a computerized control system for combined safety and quantity count purposes at the working station.

FIG. 6C illustrated a simplified control logic routine omitting the quantity count functionality of that shown in FIG. 6B.

FIG. 7 is a schematic overhead plan view of the working station of FIGS. 4 to 6 and a neighbouring area of a lower track layout of the three-dimensional grid structure at which the working station is installed.

FIGS. 7A through 7H illustrate orchestration of sequenced arrival of storage/retrieval vehicles at the workstation of FIG. 7 by selective parking and advancing of the vehicles on the lower track layout according to priority rankings assigned to storage units carried on said vehicles.

FIG. 7I illustrates a control logic routine executed by the computerized control system to perform the sequenced arrival of the storage/retrieval vehicles at the workstation.

FIG. 8 shows a segment of a lower track of the three-dimensional grid of FIG. 2, along which one of the robotic storage/retrieval vehicles is travelling.

FIG. 8A is a partial closeup view of the portion of FIG. 8 marked by detail circle A thereof.

FIG. 9A schematically illustrates scanning of a uniquely coded marker on a track rail in either the grid structure or the working station by a storage/retrieval vehicle travelling therealong in order to assess misalignment between the vehicle and an intended destination thereof.

FIG. 9B shows use of the same uniquely coded marker to confirm successful alignment of the storage/retrieval vehicle on the targeted destination spot after correcting the misalignment detected in FIG. 9A.

FIG. 9C illustrates a control logic routine executed by a local processor of the storage/retrieval vehicle to detect the misalignment of FIG. 9A, and perform appropriate correction to achieve the proper alignment of FIG. 9B.

FIG. 10 is an elevational view showing one of the robotic storage/retrieval vehicles on the lower track of the three-dimensional grid at launching spot below a vertical shaft of the three-dimensional grid through which the robotic storage/retrieval vehicle is intended to travel upwardly.

FIG. 11 is a perspective view of the robot of FIG. 10 at the launching spot of the lower track.

FIG. 12 is a partial closeup view of the portion of FIG. 10 marked by detail circle A thereof.

FIG. 13 is a partial closeup view of the portion of FIG. 11 marked by detail circle B thereof.

FIG. 14 is another closeup of the same robotic storage/retrieval vehicle and lower track intersection point as FIG. 12, but with the robotic storage/retrieval vehicle raised up to engage with rack teeth on upright frame members of the shaft by a lifting mechanism mounted beneath the lower track.

FIG. 15 another closeup of the same robotic storage/retrieval vehicle and lower track intersection point as FIG. 13, but with the robotic storage/retrieval vehicle in the raised position of FIG. 14.

FIGS. 16 and 17 are top and bottom perspective views of the robotic storage/retrieval vehicle and lifting mechanism of FIGS. 10 to 13, but shown in isolation from the lower track and upright shaft members.

FIGS. 18 and 19 are top and bottom perspective views of the robotic storage/retrieval vehicle and lifting mechanism of FIGS. 14 and 15, but shown in isolation from the lower track and upright shaft members.

FIG. 22 illustrates a sortation/buffering grid employing the same three-dimensional grid structure and robotic storage/retrieval vehicles as the storage systems of FIGS. 1 and 2, but with a different layout of stations serving the grid for use in management of pre-packed shipping containers.

FIG. 23 is a schematic block diagram illustrating the architecture of a computerized control system responsible for assigning tasks to the storage/retrieval vehicles and working stations, and commanding operation of the storage/retrieval vehicles and lifting mechanisms to manage vehicle navigation throughout the system.

DETAILED DESCRIPTION

Figure 1:
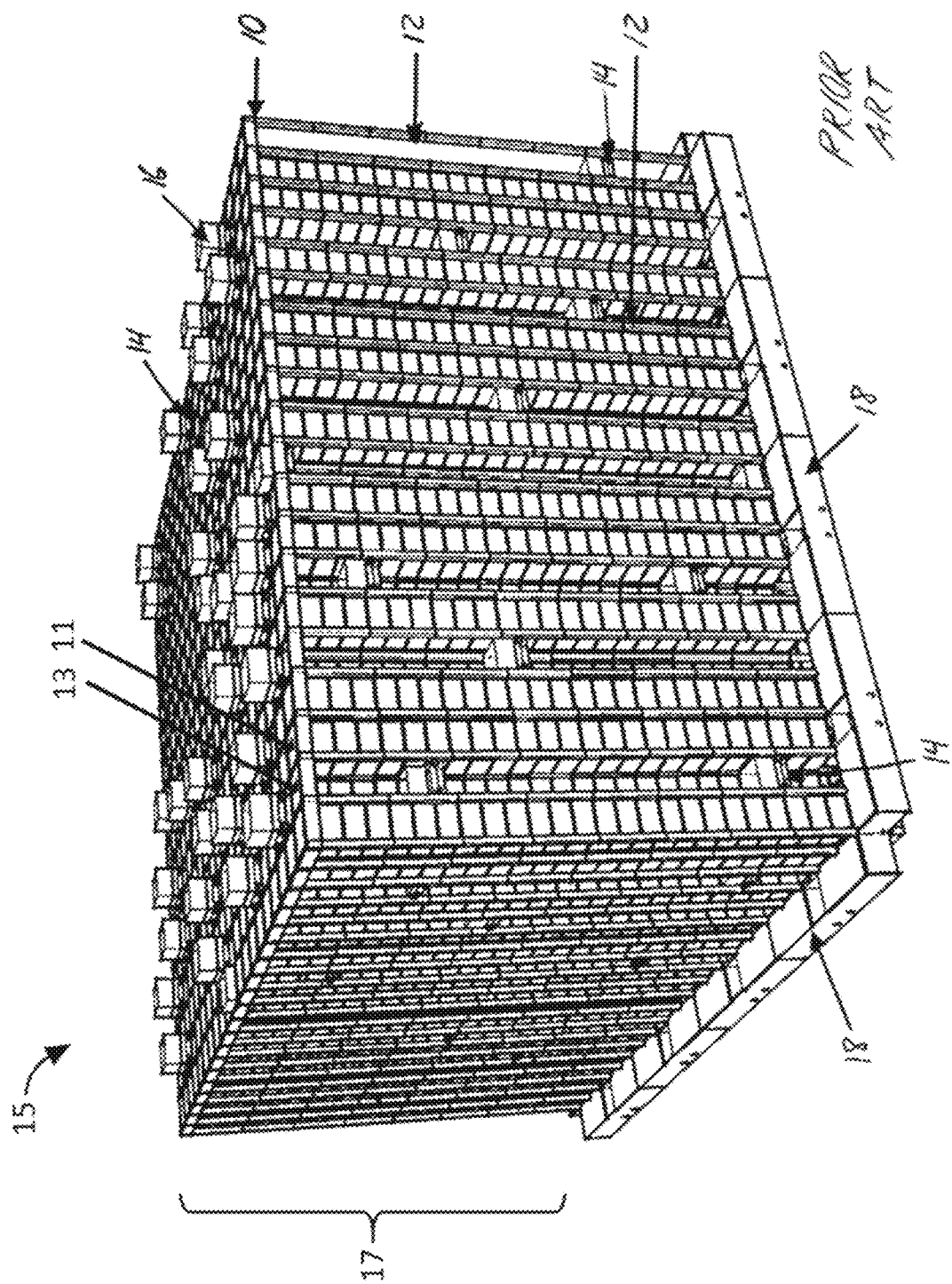
FIG. 1 is a perspective view of a three-dimensional grid structure from Applicant's aforementioned prior PCT application, in which a three-dimensional array of storage units are contained and through which a fleet of robotic storage/retrieval vehicles can travel in three dimensions to access each said storage units.

FIG. 1 illustrates the three-dimensional grid structure 17 from Applicant's aforementioned prior PCT application. A gridded upper track layout 10 resides in an elevated horizontal plane well above a matching gridded lower track layout situated in a lower horizontal plane close to ground level. Between these upper and lower track layouts is a three-dimensional array of storage locations, each holding a respective storage unit therein, for example in the form of open-top or openable/closeable storage tray, bin or tote capable of holding any variety of goods therein. The storage locations are arranged in vertical storage columns 11, in which storage locations of equal footprint are aligned over one another. Each such storage column 11 is neighboured by a vertical shaft 13 through which its storage locations are accessible.

Each track layout features a set of X-direction rails lying in the X-direction of a horizontal plane and a set of Y-direction rails perpendicularly crossing the X-direction rails in the Y-direction of the horizontal plane. The crossing rails define a horizontal reference grid of the storage system 15, where each horizontal grid row is delimited between an adjacent pair of the X-direction rails and each horizontal grid column is delimited between an adjacent pair of the Y-direction rails. Each intersection point between one of the horizontal grid columns and one of the horizontal grid rows denotes the position of a respective storage column 11 or a respective upright shaft 13. In other words, each storage column 11 and each shaft 13 reside at a respective Cartesian coordinate point of the reference grid at a respective area bound between two of the X-direction rails and two of the Y-direction rails. Each such area bound between four rails in either track layout is also referred to herein as a respective "spot" of said track layout. The three-dimensional addressing of each storage location and associated storage unit in the system is completed by the given vertical level at which the given storage location resides within the respective storage column 11. That is, a three-dimensional address of each storage location is dictated by the horizontal grid row, horizontal grid column and vertical column level of the storage location in the three-dimensional grid structure 17.

A respective upright frame member 12 spans vertically between the upper and lower track layouts at each intersection point between the X-direction and Y-direction rails, thereby cooperating with the track rails to define a framework of the three-dimensional grid structure 17 for containing and organizing the three-dimensional array of storage units within this framework. As a result, each upright shaft 13 of the three-dimensional storage array has four vertical frame members spanning the full height of the shaft 13 at the four corners thereof. Each frame member has respective sets of rack teeth 90 arranged in series in the vertical Z-direction of the three-dimensional grid structure 17 on two sides of the frame member 12. Each shaft 13 thus has eight sets of rack teeth 90 in total, with two sets at each corner of the shaft 13, which cooperate with eight pinion wheels on the robotic storage/retrieval vehicles 14 to enable traversal of same between the upper and lower track layouts through the shafts 13 of the three-dimensional grid structure 17. Each robotic storage/retrieval vehicle 14 has a wheeled frame or chassis featuring both round conveyance wheels for conveyance of the robotic storage/retrieval vehicle 14 over the upper and lower track layouts in a track-riding mode, and toothed pinion wheels for traversal of the robotic storage/retrieval vehicle 14 through the rack-equipped shafts 13 in a shaft-traversing mode. The footprint of frame or chassis is less than the horizontal area of each shaft 13 to allow travel of the vehicle 14 through each shaft 13. Each pinion wheel and a respective conveyance wheel are part of a combined singular wheel unit 68, 70, of which at least the conveyance wheel is extendable in an outboard direction from the vehicle for use of the conveyance wheels in a track-riding mode on either track layout, and retractable in an inboard direction of the vehicle for use of the pinion wheels in a shaft-traversing mode engaging the pinion wheels with the rack teeth 90 of the upright frame members 12 of a shaft 13 (for example, see FIGS. 14 and 15 and accompanying description below). Transition of the vehicle 14 from the track-riding mode to the shaft-traversing mode thus converts the vehicle to a smaller overall outer footprint of lesser size than the shaft area to enable the entirety of the vehicle 14 to travel through the shaft 13.

The framework of the three-dimensional grid structure 17 includes a respective shelf at each storage location to support the respective storage unit, whereby any given storage unit 16 can be removed from its storage location by one of the robotic retrieval vehicles 14 without disrupting the storage units 16 above and below it in the same storage column. Likewise, this allows a storage unit 16 to be returned to a prescribed location at any level in the array. The lower gridded track layout at the bottom of the three-dimensional grid structure 17 has a number of working stations 18 distributed around its perimeter to which the robotic retrieval vehicles 14 deliver the storage units 16 pulled from the storage columns 11. Except for differences explicitly described herein, the framework of the three-dimensional grid structure 17, the robotic storage/retrieval vehicles 14, their travel over the upper and lower track layouts and through the shafts 13, and their transition between the track-riding and shaft-traversing modes are the same as described in Applicant's aforementioned prior PCT application.

Figure 2:
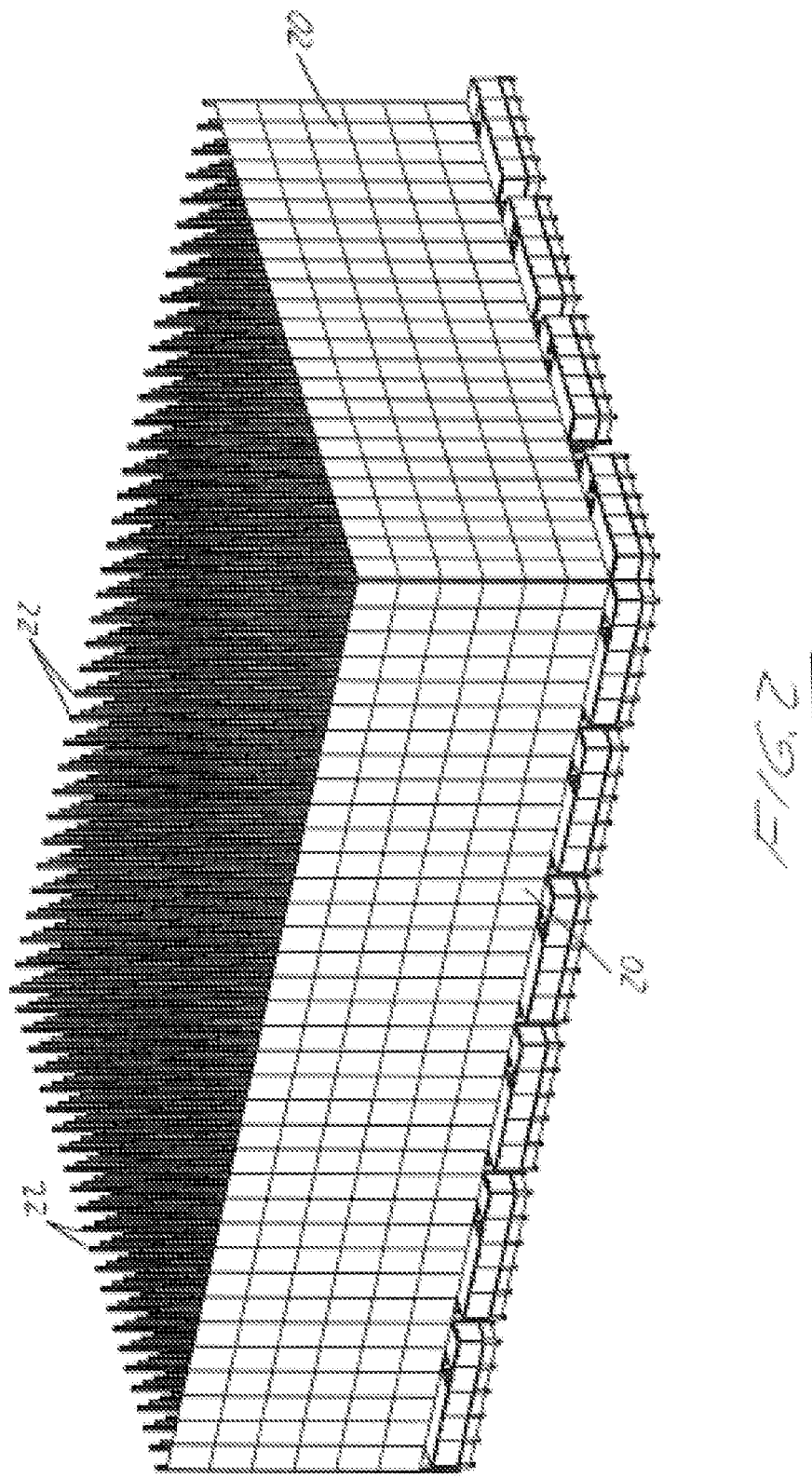
FIG. 2 is a perspective view of a modified three-dimensional grid structure according to the present invention.

FIG. 2 shows a modified form the prior three-dimensional grid structure 17, which once again features the upper and lower track layouts and the upright frame members 12 that span therebetween to carry shelving at the storage locations for support of the storage units 16 therein, and also carry the rack teeth 90 engageable by the pinion wheels of the robotic storage/retrieval vehicles 14 to enable vertical travel of an entirety of each robotic storage/retrieval vehicle 14 through any of the shafts 13. The shelving may be in the form of flanged panels or rails at the three sides of the storage column 11 other than the fourth shaft-adjacent side that opens into the neighbouring access shaft from which the robotic storage/retrieval vehicles 14 access the storage units 16 of that column 11, whereby this fourth open side enables insertion and withdrawal of an extendable/retractable turret arm of each vehicle 14 into the storage column 11 at to pull and push storage units 16 into and out of the storage column 11 through engagement with the undersides of the storage units 16.

As outlined in in Applicant's aforementioned prior PCT application, a subset of the vertical shafts 13 located at the outer perimeter may be "up-shafts" that are dedicated for upward travel of the robotic storage vehicles 14 therethrough from the lower track layout to the upper track layout 10 after having delivered a storage unit 16 to one of the working stations 18, while other vertical shafts 13 are "down-shafts" that are dedicated for downward travel of the robotic storage vehicles 14 therethrough from the upper track layout 10 during either retrieval of a storage unit 16 from the three dimensional storage array, or return of a storage unit 16 back into the three dimensional array after having previously delivered the storage unit 16 to one of the working stations 18 for a picking, re-stocking or other operation.

The three-dimensional grid structure 17 of FIG. 2 differs from that of FIG. 1 in that cladding panels 20 have been added to the upright frame members 12 at the outer perimeter of the three-dimensional grid structure 17 to create outer side walls that substantially close off all four sides of the three-dimensional grid structure 17, thus visually concealing the interior thereof, and in that the upright frame members 12 include top segments 22 thereof that stand upright frame the rails of the upper track members at the intersection points thereof, and that obscure the upper track layout 10 from sight in the particular wide-view of the three-dimensional grid structure 17 shown in FIG. 2. These top segments 22 of the shaft 13 may be used for mounting of charging station hardware by which the robotic storage/retrieval vehicles 14 can be recharged when necessary. However, the structure and purpose of the upper track layout 10 and the form of shafts 13 and storage columns 11 inside the three-dimensional grid structure 17 by the upright frame members 12 are well documented in Applicant's prior PCT application, and thus require no detailed illustration or explanation herein. There may be plurality of working stations 18 on each of one or more perimeter sides of the three-dimensional grid structure 17, and may be working stations one, two, three or all four sides of the three-dimensional grid structure 17. FIG. 2 shows distribution of working stations on at least two non-opposing sides of the three-dimensional grid structure 17. There may also be one or more working stations 18 on each of the two other sides not visible from the vantage point of the figure.

Turning now to FIGS. 3 to 6, attention is given to the novel structure of the working stations 18 and the novel interaction therewith by the robotic storage/retrieval vehicles 14. In the interest of illustrative simplification, FIG. 3 omits much of the three-dimensional grid structure 17. Shown however are one X-direction rail 24 and one Y-direction rail 26 of the lower track layout 28 that form two outer sides of the lower track layout and intersect at a respective outer corner of the three-dimensional grid structure 17. Of the remainder of the lower track layout 28, only the support legs 30 elevating these two particular rails off the ground are shown. Among the upright frame members 12 of the three-dimensional grid structure 17, only those that stand upright from two illustrated rails 24, 26 at these two outer sides of the three-dimensional grid structure 17 are shown, and the top segments 22 of these upright frame members 12 are omitted. Around the full perimeter of the three-dimensional grid structure 17, the cladding panels 20 do not extend fully down to the lower track 28, but instead terminate in a slightly elevated relation thereover so that bottom segments 32 of the upright frame members 12 that attach to and stand upright from the rails of the lower track layout 28 are left uncladded. This leaves an open space 34 between the bottom segments 32 of every adjacent pair of upright frame members 12. These open spaces 34 allow the robotic storage/retrieval vehicles 14 to enter and exit the three-dimensional grid structure 17 at the lower track 28 thereof, and thus transition between the three-dimensional grid structure 17 and the working stations 18.

As outlined in more detail below, this enables a novel solution for goods-to-man order fulfilment, where a robotic storage/retrieval vehicle capable of travel in three dimensions provides the sole means of storage unit conveyance throughout an entire order picking operation, from the initial retrieval of the storage unit from anywhere in the three dimensional space of the three-dimensional grid structure 17, through delivery of the storage unit 16 to the working station 18, including presentation of the storage unit 16 to a human or robot picker at the working station 18, and subsequent return of the storage unit 16 back into any three dimensional location in the three-dimensional grid structure 17, without the storage unit 16 ever being offloaded from the robotic storage/retrieval vehicle 14 and conveyed by a separate conveyor, turntable or other transitional mechanism.

FIGS. 4 through 6 illustrate one of the working stations 18 in isolation from the three-dimensional storage grid 17. Each working station 18 features a gridded lower track 36 featuring a pair of longitudinal rails 38a, 38b running a length of the working station 18. The gridded lower track 36 also features a set of cross rails 40a-40f perpendicularly interconnecting the longitudinal rails 38 with one another at regularly spaced intervals therealong. These rails are of the same type used in the gridded upper and lower track layouts of the three-dimensional grid structure 17, and the spacing between the longitudinal rails matches the spacing between the cross rails and is equal to the inter-rail spacing employed between the rails of the upper and lower track layouts of the grid structure 17 in both the X and Y directions thereof. Accordingly, the lower track of the working station 18 can be traversed by the robotic storage/retrieval vehicles 14 in the same manner as the upper and lower track layouts of the three-dimensional grid 17. The gridded lower track 36 of the working station 18 is supported in slightly elevated relation above ground level by supports leg 30 depending downward from the gridded lower track 36 at the intersection points of the longitudinal rails 38 and cross rails 40. These support legs 30 are of the same type and height as those that support the lower track layout of the three-dimensional grid 17, whereby the gridded lower track 36 of the working station 18 resides at the same elevation as the lower track layout 28 of three-dimensional grid structure 17 to form a coplanar extension track extending therefrom.

The working station 18 features a chute 42 mounted to the gridded lower track 36 and spanning longitudinally end-to-end thereof from a first one of the cross-rails 40a at a first end of the longitudinal rails 38 to a last one of the cross-rails 40f at a second opposing end of the longitudinal rails 38. The chute 42 features a first end wall 44 standing upright from the first cross-rail 40a, a second end wall 46 standing upright from the last cross-rail 40f in opposing and parallel relation to the first end wall 44, a longer outer side wall 48 spanning longitudinally between the end walls 44, 46 in perpendicular relation thereto at an outer one 38b of the longitudinal rails, and a top cover panel 50 spanning longitudinally between the end walls and along the top edge of the outer side wall. An underside of the top cover panel 50 defines an interior ceiling of the chute 42, while an opposing topside of the top cover panel 50 defines an external countertop 50a for exploit by human or robotic workers during picking, restocking or other work functions that may be performed at the working station 18.

Each square area delimited between the two longitudinal rails 38a, 38b and any adjacent pair of the cross rails 40a-40f is referred to as a respective "spot" along the lower track of the working station. The spot located immediately adjacent the first end wall 44 of the chute 42 and bound between the first and second cross rails 40a, 40b at the first end of the chute is referred to as an entrance spot $S_{EN}$ of the working station 18, as it is here that a robotic storage/retrieval vehicle 14 enters the chute by riding onto these first and second cross rails 40a, 40b from a respective pair of rails aligned therewith in the lower track layout 28 of the grid structure 17. At the opposing second end of the chute 42, the spot located immediately adjacent the second end wall 46 between the second-last and last cross rails 40e, 40f is referred to as an exit spot $S_X$, as it is here that the robotic storage/retrieval vehicle 14 exits the chute 42 and re-enters the three-dimensional grid 17 by riding off these last and second-last cross-rails onto another respective pair of rails aligned therewith in the lower track layout 28 of the grid structure 17.

Figure 3:
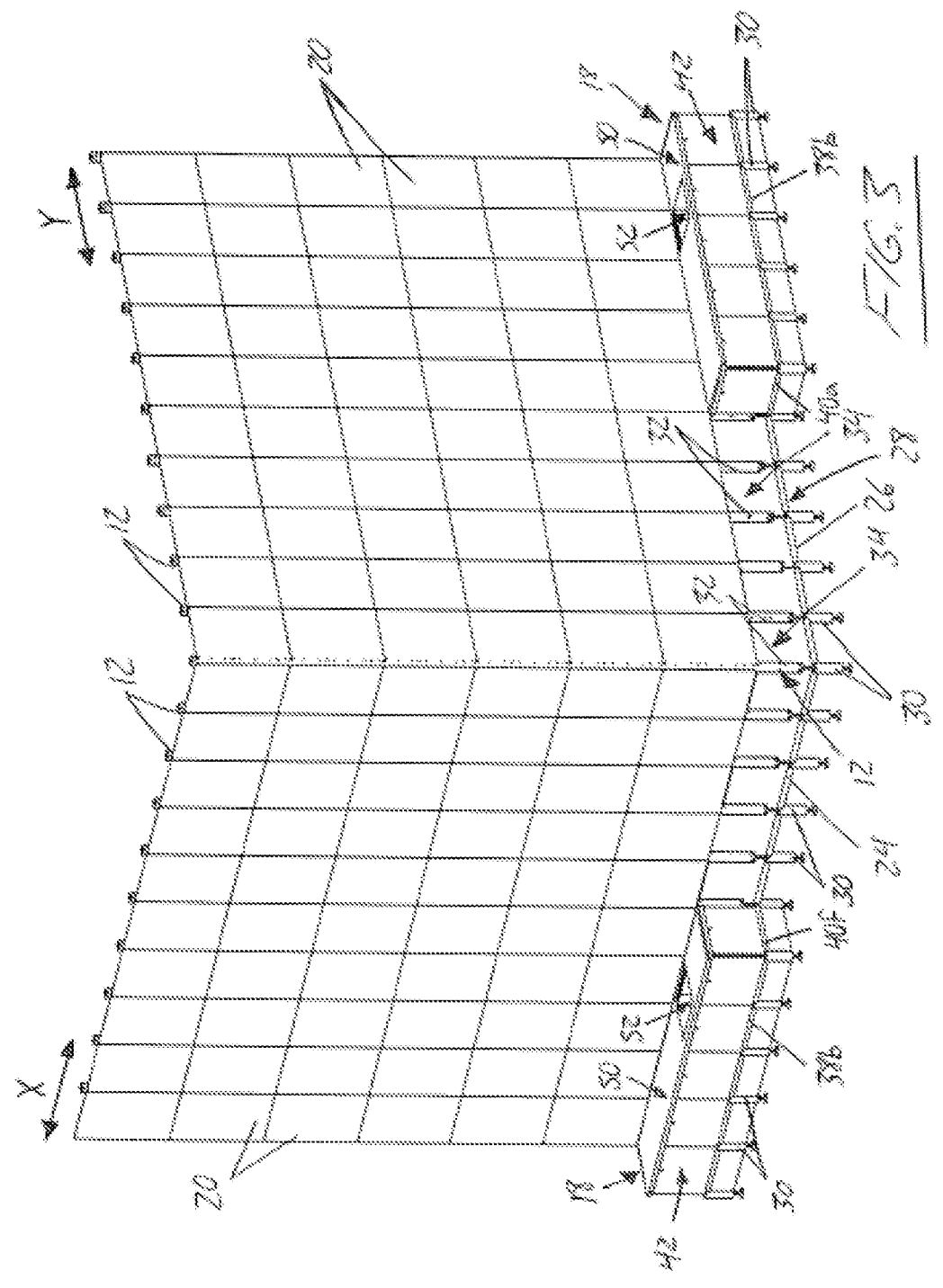

Referring to FIG. 3, the working station 18 on the right side of the figure has its longitudinal direction running in the Y-direction of the grid structure's lower track layout 28, such that this working station 18 has its longitudinal rails 38a, 38b of lying in the Y-direction and its cross rails 40a-40f lying the X-direction. The first and second cross-rails 40a, 40b of the working station's gridded lower track 36 form parallel, in-line extensions of a first pair of X-direction rails of the grid structure's lower track layout 28, and the last and second last 40e, 40f cross rails likewise form parallel, in-line extensions of a second pair of X-direction rails of the grid structure' lower track layout 28. Accordingly, a robotic storage/retrieval vehicle 14 can ride along a pair of X-direction rails of the lower track layout 28 through the uncladded open space 34 between the two upright frame members 12 at the ends of these rails at the outer side of the grid structure 17 at which the working station 18 resides, and onto the first and second cross rails 40a, 40b at the entrance spot $S_{EN}$ of the working station 18. At this entrance spot $S_{EN}$, the robotic storage/retrieval vehicle 14 transitions from an X-direction travel mode into a Y-direction travel mode, and can then travel along the working station's longitudinal rails 38a, 38b in the Y-direction to the exit spot $S_X$ of the working station 18. Here, the robotic storage/retrieval vehicle 14 then transitions back into its X-direction travel mode to ride atop the last and second last cross rails of the working station 18 back onto the second pair of X-direction rails of the lower track layout 28 of the grid structure 17 through the uncladded open space 34 between the upright frame members 12 at the ends of these rails.

The working station 18 on the left side of FIG. 3 has its longitudinal direction running in the X-direction of the grid structure's lower track layout 28, such that this working station 18 has its longitudinal rails 38a, 38b lying in the X-direction and its cross rails 40a-40f lying the Y-direction. The first and second cross-rails 40a, 40b of the working station's gridded lower track 36 form parallel, in-line extensions of a first pair of Y-direction rails of the grid structure's lower track layout 28, and the last and second last 40e, 40f cross rails likewise form parallel, in-line extensions of a second pair of Y-direction rails of the grid structure's lower track layout 28. Accordingly, a robotic storage/retrieval vehicle 14 can ride along a pair of Y-direction rails of the lower track layout 28 through the uncladded open space 34 between the two upright frame members 12 standing upright from the ends of these rails at the outer side of the grid structure 17 at which the working station 18 resides, and onto the first and second cross rails 40a, 40b at the entrance spot $S_{EN}$ of the working station 18. At this entrance spot $S_{EN}$, the robotic storage/retrieval vehicle 14 transitions from the Y-direction travel mode into the X-direction travel mode, and can then travel along the working station's longitudinal rails 38a, 38b in the X-direction to the exit spot $S_X$ of the working station 18. Here, the robotic storage/retrieval vehicle 14 then transitions back into its Y-direction travel mode to ride atop the last and second last cross rails of the working station 18 back onto the lower track layout 28 of the grid structure 17 on the second pair of X-direction rails through the uncladded open space 34 between the upright frame members 12 at the ends of these rails.

Between the second cross rail 40b and second last cross rail 40e of each working station are a plurality of intermediate spots between the entrance $S_{EN}$ and exit $S_X$ spots. The illustrated example features three intermediate spots, but this number may vary. One of these intermediate spots, particularly the second last spot immediately neighbouring the exit spot $S_X$ in the illustrated example, is designated as an "access spot" $S_A$ at which the robotic storage/retrieval vehicle 14 is accessible by the human or robotic worker via an access opening 52 penetrating through the top panel 50 of the chute 42 from the countertop surface 50a thereof into the interior space of the chute 42. Accordingly, when the storage/retrieval vehicle 14 travelling longitudinally through the chute 42 arrives and stops at the access spot $S_A$, the worker can interact with a storage unit 16 carried atop said storage/retrieval vehicle 14, for example to pick one or more individual items from the storage unit 16 as part of an order fulfilment process withdrawing such items from the grid structure 17, to instead remove the entire storage unit 16 from the storage/retrieval vehicle 14 as part of such an order fulfillment process, or to instead place one or more individual items into the storage unit 16 as part of a restocking process replenishing the grid structure 17. Alternatively, a restocking process may involve directing an empty one of the robotic storage/retrieval vehicles 14 (i.e. a vehicle currently unoccupied by a storage unit) to the access spot $S_A$ of the working station 18 to pick up a storage unit 16 from the worker through the access opening 52.

The working station 18 is equipped with a hand-sensing mechanism 53 to protect human workers from potential injury as they interact with the storage/retrieval vehicle 14 through the access opening 52. With reference to FIG. 6A, first and second sensor bars 54, 56 are affixed to the underside of top cover panel 50 of the working station 18 in positions lying along opposing perimeter edges of the access opening 52. The sensor bars 54, 56 carry optical beam emitters and receivers in opposing relation to one another on the two bars 54, 56 so that beams emitted by the emitters are received by the opposing receivers unless the beam is interrupted, for example by insertion of a worker's hand(s) into the access opening 52, or the presence of any other object in the access opening 52. As opposed to emitters and receivers on opposing sides of the access opening 52, the sensor configuration may employ emitters and receivers on the same side of the access opening 52, and reflectors on the opposing side thereof. The sensor bars 54, 56 communicate, through wired or wireless connection, with a computerized control system that wirelessly communicates with the fleet of robotic storage/retrieval vehicles 14 to control conveyance thereof throughout the grid structure 17 to perform various tasks (picking, restocking, etc.). Continuity of the hand sensor beams, also collectively referred to as a light curtain, generates a "safe" signal, whereas interruption of the sensor beams generates a "stop" signal. Transmission by the computerized control system to a storage/retrieval vehicle 14 of any movement instruction that commands said storage/retrieval vehicle 14 to move into or out of the access spot $S_A$ of a working station 18 is conditional on detection of a "safe" signal from the hand sensing mechanism 53 of that working station 18. This way, safety procedures can be implemented under which no robotic storage/retrieval vehicle 14 is ever driven along the gridded lower track 36 of the working station 18 while a worker's hand is inside the chute 42.

In addition to serving a safety purpose, the hand/object sensing mechanism 53 may also be operable for quality assurance purposes helping ensure human working accuracy in their picking tasks. For a given order for which a predetermined quantity of items is known to be required from a given storage unit 16, the computerized control system can count the number of times the optical beams are broken while that storage unit 16 is present at the access spot $S_A$, thus representing a count of how many times the workers hands were inserted through the access opening 52 to access the storage unit 16 and pull a respective item therefrom. The system compares the hand-insertion count against the predetermined quantity of items known to be required from that storage unit 16 (aka, a "line item quantity" from the order being filled), and only permits the storage/retrieval vehicle 14 on which that storage unit 16 is carried to depart the access spot $S_A$ of the working station 18 once the hand-insertion count has reached the predetermined item quantity associated with that storage unit.

Similar count checks can be performed on other tasks that may be performed at the access opening 52 of the working station 18, for example during restocking or kitting operations, where instead of picking items from the storage unit 16 parked under the access opening 52, items are placed or dropped into the parked storage unit 16 through the access opening 52. Accordingly, each break of the light curtain beams by either a user's hand reaching down to place an item into the storage unit 16, or by an item dropped into the storage unit 16 from above the light curtain, can likewise be used to count the quantity of items deposited into the storage unit 16. Accordingly, since the sensing mechanism 53 is operable to detect not only hands, but any objects, the computerized control system can count the number of positive "detections" at the access opening 52, whether each detection is detected insertion of a user's inserted hand, or detection of another object passing through the opening 52 during placement or retrieval of that object into or from the storage unit 16 parked under the access opening 52. Either way, the counting of positive detections by the hand/object sensing mechanism 53 is useful to monitor progress and completion of assigned tasks at the working station 18.

The hand/object sensing mechanism 53 also serves as a height-check on the storage unit 16 to ensure that no items therein are protruding notably upward from the top of the storage unit 16, as such protruding items will break the light curtain formed by the optical beams, and such detection of protruding items can thus be used to prevent departure of the storage/retrieval vehicle 14 and the storage unit 16 thereon from the access spot $S_A$ until the protrusion is rectified. This helps ensure that the storage unit 16 will not attempt to re-enter the storage grid 17 with one or more items protruding therefrom and interfering with the available travel spaces between the framework components of the grid structure 17, thus potential causing damage to the protruding item(s) and/or the storage unit 16, vehicle 14, or grid structure 17.

In addition to the hand/object sensing mechanism 53, two movement sensors 58, 59, visible in FIG. 6, are each installed within the workstation 18 for the purpose of detecting movement of a storage retrieval vehicle 14 at or adjacent the access spot $S_A$. One movement sensor 58 resides just outside the access spot $S_A$ in close adjacency thereto at a side thereof closest to the entrance spot $S_{EN}$, and thus resides at a neighbouring lead-in spot $S_L$ from which storage/retrieval vehicles 14 enter the access spot $S_A$ during their travel through the working station 18. This first movement sensor 58 therefore serves as a lead-in movement sensor operable to detect movement of a storage/retrieval vehicle 14 into the access spot $S_A$. The other movement sensor 59 resides at or closely adjacent the opposing side of the access spot $S_A$ nearest the exit spot $S_X$, and therefore serves as a departure movement sensor operable to detect departure of a storage/retrieval vehicle 14 from the access spot $S_A$ into the exit spot $S_X$, from which it then exits the working station 18 and re-enters the three-dimensional storage grid 17. Each movement sensor 58, 59 may be a reflective optical sensor, having an emitter/receiver combination at one side of the working station's gridded lower track 36 so as to be able to detect reflected light off a passing storage/retrieval vehicle 14. Time of flight calculation (i.e. difference in time between emission of an optical pulse and detection of the reflected optical pulse) may be used to differentiate between reflection off a storage/retrieval vehicle 14 passing by the sensor on the working station's gridded lower track 36, versus reflection off another object further away. A reflection detected by the receiver within a timed threshold would thus generate a positive "movement detected" output signal from the sensor, whereas a lack of detected reflection within the timed threshold would generate a negative output signal denoting an absence of detected movement. Alternatively, an optical beam sensor may be used to direct a beam across the gridded lower track 36 of the workstation 18 between an emitter at one side and cooperating receiver at the other, or with an emitter/receiver at one side and cooperating reflector at the other. In such instance, an intact status of the beam would denote a negative output signal (absence of movement), and an interrupted status of the beam would denote a positive output signal (detected movement).

The sensors 58, 59 are positioned so that a vehicle statically occupying the access spot $S_A$, lead-in spot $S_L$, or exit spot $S_X$ will not reflect an optical pulse or break an optical beam, i.e. that pulse reflection or beam interruption at the lead-in sensor 58 will only occur if a vehicle 14 starts transitioning from the lead-in spot $S_L$ to the access spot $S_A$, and pulse reflection or beam interruption at the departure sensor 59 will only occur if a vehicle 14 starts transitioning from the access spot $S_A$ to the exit spot $S_X$. This can be seen in FIG. 6, where each movement sensor 58, 59 is supported above the gridded lower track 36 at an elevation between the top of the vehicle's wheels, and the underside of an overhanging perimeter portion of the vehicle's upper platform that overhangs the underlying frame or chassis of the vehicle 14. When a vehicle 14 is parked statically on the lead-in spot $S_L$ or the access spot $S_A$, the respective lead-in sensor 58 or departure sensor 59 is aimed at an open vertical space between the vehicle wheels and overhanging perimeter portion of the vehicle platform at a respective side of the vehicle chassis, whereby neither movement sensor 58, 59 is triggered by a statically parked vehicle position. As outlined below, these movement sensors 58, 59 are useful for the purpose of distinguishing between situations where a positive detection signal from the hand/object sensing mechanism 53 is not problematic due to an absent of vehicle movement under the access opening 52, versus potentially hazardous situations posing potential injury to a worker or damage to items or equipment by a moving vehicle 14.

FIG. 23 shows a block diagram of the computerized control system 500 and cooperating computerized componentry of each robotic storage/retrieval vehicle 14. The computerized control system comprises a computer network that includes a master control system 502 comprising one or more computers with one or more processors, and non-transitory computer readable memory coupled thereto and on which are stored statements and instructions executable by said one or more processors to logically control various associated tasks described herein, including generation of command signals for the fleet of robotic storage/retrieval vehicles 14, and for receiving and interpreting feedback communications therefrom. The computer network further includes a plurality of workstation control systems 504, each installed at a respective one of the working stations 18. For illustrative convenience, the block diagram shows only a singular workstation control system 504 and singular robotic storage/retrieval vehicle 14.

Each workstation control system 504 features a local computer 506, which may be embodied, for example, in a programmable logic controller (PLC), with an I/O interface by which the local computer 506 can communicate with the hand/object sensing mechanism 53 of the working station 18, the lead-in and departure movement sensors 58, 59 of the working station 18, a respective lifting mechanism 72 described herein further below. The local computer 506 of the working station 18 also has a human-machine interface (HMI) 508 coupled thereto, preferably including at least a display monitor 510, which optionally may be a touch screen monitor, thus serving as both a display and input device of the HMI 508, though other input devices such as a computer keyboard, mouse, trackball, dedicated control buttons, etc. may additionally or alternative be employed. In addition or alternative to a display monitor 510 presenting a graphical user interface (GUI) for the purpose of displaying directive instructions to a human worker of the workstation 18 according to the given task assigned thereto, other worker guidance equipment may be employed, for example a pick-to-light system guiding picking of items from different compartments of compartmentalized storage units 16 having different item types therein during execution of a picking task, a put-to-light system guiding placement of items into different compartments of compartmentalized storage units 16 during execution of an inventory restocking or kitting task, simplified non-GUI displays (e.g. numeric LCD display) for display line item quantities, etc. The local computer 506 of the working station 18 comprises one or more computer processors, non-transitory computer readable memory coupled thereto and on which are stored statements and instructions executable by said one or more processors to perform the various associated tasks described herein in relation to the HMI 508, hand sensing mechanism 53, movements sensors 58, 59, and a respective one of the lifting mechanisms 72 that neighbours that working station 18. The local computer 506 of each working station 18 is also communicable with the master control system 502 by way of a wired or wireless connection, to receive details of the tasks to be guided and performed at the working station 18, and to report back to the master control system 502 on the status of such tasks, and with safety warnings warranting action by the master control system 502.

Each robotic storage/retrieval vehicle 14 has a local computer processor 512 carried onboard thereof, connected to a local onboard transceiver 514 of the vehicle that is wirelessly communicable with a main transceiver 516 of the master control system 502 to enable receipt of command signals therefrom and transmission of feedback communications back thereto. A non-transitory computer readable memory on each robotic storage/retrieval vehicle 14 is connected the onboard local processor 512 thereof for execution of statements and instructions stored in said memory, particularly to execute local functions for the purpose of navigating the storage system 15 and interacting with the storage units 16 thereof, based on commands received from the master control system 502, and for the purpose of reporting back to the master control system 502 with feedback on the completion of the commanded tasks. To enable the performance of the commanded tasks, the local processor 512 of the vehicle 14 is connected to an onboard I/O interface by which the processor 512 can execute control over various electronic componentry of the vehicle 14 (motors, actuators, sensors, etc.) responsible for travelling movement of the vehicle 14 in the storage grid 17 and working stations 18, and interactions of the vehicle 14 with the storage units 16. In the illustrated embodiment, such componentry includes wheel drive motors 524 for driving rotation of the vehicle's wheel units, wheel lifting/lowering motor(s) 526 for controlled raising and lowering of the vehicle's height adjustable wheel set, wheel shifting motors or actuators 528 for controlling inboard/outboard shifting of the wheel units, a turret motor 530 to controlling rotation of the vehicle's turret, an arm actuator 532 for controlling extension/retraction of the extendable/retractable turret arm, a shuttle motor 534 for controlling linear movement of a movable shuttle back and forth along the turret arm, and a set of load status sensors 100 described further below. The local processor 512 is also connected to an onboard scanner 66 of the vehicle 14 for the functions and purpose described in greater detail below.

FIG. 6B illustrates cooperative execution of both safety and task monitoring control logic by the processors of the computerized control system 500 and storage/retrieval vehicles 14 in connection with the hand/object sensing mechanism 53. The local computer 506 (workstation controller 506, for short) of each working station control system 504 continuously monitors the condition of the hand/object sensing mechanism 53 for a detection signal. A positive detection by the sensing mechanism 53 at Step 1001 generates an input signal to the workstation controller 506 at Step 1002, in response to which the computerized control system 500, at Step 1003, checks for the presence of any storage/retrieval vehicle 14 in the working station 18 at which the detection occurred.

This check for vehicle presence may be executed by the master control system 502, which preferably stores dynamically updated location records for all vehicles of the fleet, with the local processor 512 of each vehicle 14 being configured to automatically report back to the master control system 502 successful completion of a vehicle travel task commanded thereby, so that the master control system 502 knows the vehicle reached 14 its targeted destination spot for that travel task, and records this confirmed location in the vehicle's dynamic location record. Travel tasks are commanded in straight line segments (i.e. any required travel from a starting spot to a final destination that requires movement in two or more dimensions is broken down into linear unidirectional travel segments). So, anytime the master control system 502 commands a storage/retrieval vehicle 14 to a working station 18, this will involve, at some point, a command of a straight-line travel segment whose targeted destination spot is the entrance spot of that workstation 18, followed by one or more straight-line travel segments then commanded to advance the vehicle along the lower track of the workstation 18 toward, or fully to, the access spot $S_A$ depending on the occupied or unoccupied state of the access spot $S_A$ and intermediate spots. Once presence of the vehicle 14 is no longer needed at the access spot $S_A$, the master control system 502 commands another straight-line travel segment to move the vehicle 14 one spot over to the working station's exit spot $S_X$, followed by another straight-line travel segment in the other direction to move the vehicle 14 from the working's station's 18 exit spot $S_X$ back into the storage grid 17. Accordingly, to check whether any vehicle 14 is in a workstation 18, the master control system 502 can search the dynamic location records of all vehicles for a vehicle whose last recorded location was any of the entrance, intermediate, access $S_A$, or exit spots $S_X$ of the working station 18. This is only one example however, and other techniques for confirming the presence or absence of a vehicle 14 in the working station 18 may be employed, for example using occupancy sensors in the working station 18, in which case, checking for the presence of any vehicle 14 in the working station 18 at step 1003 may be performed locally by the workstation control system 504.

If it is determined that no vehicle 14 is present in the subject working station 18, then the positive detection by the hand/object sensing mechanism 53 is ignored at step 1004, as the lack of vehicle 14 at the working station 18 means that a user's hand inserted in the access opening 52 is not at risk for collision by a vehicle 18, nor is there a storage unit 16 present at the access opening 52 for which it would be useful to count detections by the hand/object sensing system to track line item quantities being picked or placed in the storage unit 16. However, if it is determined that one or more vehicles 16 are present in the working station 18, then at step 1005, a check is made for static occupation of the access spot $S_A$ of the working station 18 by a vehicle 14, for example by checking the status of the movement sensors 58, 59 installed in the working station 18 adjacent the access spot $S_A$ thereof, and checking the dynamic vehicle location records of the vehicles 14 in the workstation 18. If those dynamic vehicle location records include one whose currently stored value is a unique identifier of that working station's 18 access spot $S_A$, and there is no detected movement from the movement sensors 58, 59, then a positive determination is made that a vehicle 14 is statically parked at the access spot $S_A$.

In response, at step 1006, the computer control system 500 checks for whether the workstation control system 504 has an open task (whether a picking, replenishment, or kitting task) for which a remaining quantity of items to be picked from or placed in the parked storage unit 16 (a remaining "line item quantity" of the picking, kitting or restocking order) is greater than zero. If yes, then at step 1007 the computer control system 500 decrements the remaining line quantity by one, based on which a dynamically displayed line quantity shown on the HMI 508 to the human worker is likewise decremented by one in synchronous fashion, so that the worker is visually informed of how many additional items are to be picked from or placed in the parked storage unit 16. If the line item quantity was already zero, then at step 1008, the computer control systems 500 displays an error message on the HMI 508, thereby notifying the worker that they may have made an error by exceeding the prescribed line item quantity to be picked from, or placed in, the storage unit 16 parked at the access spot $S_A$. The worker can thus double check the actual item quantity they picked or placed, and make appropriate correction to match the assigned line quantity of the order.

If the determination at Step 1005 is that there is no vehicle 14 parked statically at the access spot $S_A$, then at Step 1009, the movement sensors 58, 59 of the working station 18 are monitored for detected vehicle movement. Absent any movement, operation of the system continues in normal fashion. However, once the movement sensors 58, 59 detect movement near the access spot $S_A$ at Step 1010, thus representing a risk of injury to a workers hand by a storage bin entering or departing the access spot $S_A$, or risk of damage to items or equipment by due to an item protruding upward from a storage bin trying to depart the access spot $S_A$, an emergency stop signal is instantly transmitted from the workstation control system 504 to the master control system 502, which in turn transmits an emergency stop command to the vehicle(s) 14 in the working station 18 at Step 1011. Accordingly, any vehicle 14 about to move into the access spot $S_A$, if previously unoccupied, or any vehicle 14 attempting to depart the access spot $S_A$ from its previously static position parked thereat, is immediately stopped at Step 1012 to prevent injury or damage. The vehicle 14 reports its successful emergency stop back to the master control system 502, in response to which the master control system 502 may halt all vehicle travel commands to the vehicle(s) 14 at the subject working station 18 until such time as the workstation control system 504 reports that light curtain is re-established to an unbroken state, and an appropriate worker-performed reset action is undertaken and confirmed, for example requiring a two-handed input at the HMI 508 of the working station 18 to ensure that neither hand of the worker is in peril once vehicle travel is reinitiated. After this reset, normal operation is reinitiated, and the FIG. 6B procedure can be repeated. At any time when a positive detection signal from the hand/object sensing mechanism is present, the master control system 502 will not command or allow any storage retrieval vehicle 14 travel into, or out of, the access spot $S_A$ of the working station 18.

While FIG. 6B illustrates a procedure combining both safety check and quantity count functionality, it will be appreciated that other embodiments need not necessarily use the hand/object sensing mechanism 53 for quantity counting, as illustrated by the simplified safety procedure in FIG. 6C, which simply omits steps 1005-1008 of FIG. 6B. As an extra precaution, the movement detection actions of steps 1009 and 1010 may also be performed between steps 1002 and 1003, with a negative "no movement detected" determination leading onward to step 1003, and with a positive "movement detected" determination leading to the emergency stop steps 1011-1013. This way, the combination of a positive hand or object detection at the access opening 52 together with movement detection inside the workstation 18 at or adjacent the access spot $S_A$ will always result in an emergency stop, even if the control system 500 doesn't currently indicate the presence of a vehicle 14 in the workstation 18. It will be appreciated that the same safety functionality and/or quantity counting functionality using a light curtain or other hand/object sensing mechanism 53 in an access opening 52 of a working station 18 through which storage units 16 are travelling could similarly be employed in working stations 18 in which the travel of the storage units 16 through the working station 18 is not necessarily effected by robotic storage/retrieval vehicles 14 from the storage grid 17, and for example could be employed in workstations 18 using conveyor-based through-routing of the storage units 16 past an access spot $S_A$ underlying a similarly equipped access opening 52.

While FIGS. 4 through 6 show the inner longitudinal rail 38a as part of the isolated working station 18, it will be appreciated that this rail is shared with the lower track layout 28 of the grid structure 17 when the working station 18 is installed at the grid structure 17. With reference to FIG. 3, the inner longitudinal rail 38a of the working station 18 on the right side of the figure is an in-line section of the Y-direction perimeter rail 26 at the respective side of the grid structure's lower track layout 28. The outer rail of that working station 18 lies parallel to the Y-direction perimeter rail of the grid structure's lower track layout 28, and the cross-rails of the working station 18 connect the Y-direction perimeter rail 26 of the lower track layout 28 to the outer longitudinal rail 38b of the working station 18 at positions in-line with and joined to the X-direction rails of the lower track layout 28. Likewise, the inner longitudinal rail 38a of the working station 18 on the left side of the figure is an in-line section of the X-direction perimeter rail 24 at the respective side of the grid structure's lower track layout 28. The outer rail 38b of that working station 18 lies parallel to the X-direction perimeter rail of the grid structure's lower track layout 28, and the cross-rails of the working station 18 connect the X-direction perimeter rail of the lower track layout 28 to the outer longitudinal rail 38b of the working station 18 at positions in-line with and joined to the Y-direction rails of the lower track layout 28.

The gridded lower track 36 of each working station 18 is thus an extension track connected to the lower track layout 28 of the three-dimensional grid structure 17 in a position running alongside the lower track layout 28 to allow seamless transition of the robotic storage/retrieval vehicles 14 between the three-dimensional grid 17 and the working station 18 situated outside the two-dimensional footprint occupied by the upper and lower track layouts and the columns 11 and shafts 13 spanning therebetween. The transition of the vehicles 14 between the lower track layout 28 of the three-dimensional grid 17 and the working station 18 takes place through the working station 18 entrance spot $S_{EN}$ situated at one end of the working station's 18 gridded lower track 36 and the working station 18 exit spot $S_X$ situated at an opposing second end of the working station's 18 gridded lower track 36. By way of the computerized control system 500, the robotic storage/retrieval vehicles 14 are driven through the working stations 18 in a unidirectional manner from the dedicated entrance to the dedicated exit, which allows multiple vehicles 14 to be queued inside the working station 18, thus reducing traffic obstruction on the lower track layout 28 of the three-dimensional grid 17. In the illustrated example, the use of separate entrance spots $S_{EN}$ and exit spots $S_X$ and inclusion of one or more intermediate spots in each working station between the entrance spots $S_{EN}$ and exit spots $S_X$ thereof increases this internal queueing capacity of each working station 18.

However, the use of separate entrance spots $S_{EN}$ and exit spots $S_X$, inclusion of one or more intermediate spots between the entrance spots $S_{EN}$ and exit spots $S_X$, and placement of the access opening 52 at a dedicated spot other than the entrance spots $S_{EN}$ or exit spots $S_X$ are optional features, and may be omitted altogether or in various combinations. For example, in one alternative embodiment, the gridded lower track 36 of the working station 18 may be as simple as two cross-rails extending from the lower track layout 28 to define a single spot over which the access opening 52 resides, thus serving as an entrance spot $S_{EN}$, exit spot $S_X$, and access spot $S_A$ of the working station 18 all at one singular spot on the track layout. The robotic storage/retrieval vehicle 14 would ride forwardly onto this single-spot extension track in the X or Y direction perpendicular to the perimeter rail at the side of the lower track layout 28, receive interaction with the worker through the access opening 52, and then exit the working station 18 in a reverse direction back onto the lower track layout 28 of the three-dimensional grid 17. Accordingly, the extension track need not necessarily be elongated along the perimeter of the lower track layout 28 of the grid structure 17 like in the illustrated embodiment, and the enclosure need not necessarily be an elongated chute having spaced apart entrance and exit points at longitudinally spaced locations of the working station's lower track. In another example, an elongated extension track like that of the illustrated embodiment may be used together with a chute 42 that is open along the entire inner side thereof, as shown in in the drawings, thus allowing any of the multiple spots along the extension track to serve as an entrance spot $S_{EN}$ and/or exit spot $S_X$.

FIG. 7 schematically shows an overhead plan view of one of the working stations 18, and a neighbouring area of the lower track layout 28 of the three-dimensional grid 17. As with the working station 18 gridded lower track 36, the square area denoted between two adjacent X-direction rails and two adjacent Y-direction rails of the lower track layout 28 is referred to as a respective "spot" therein. Each spot underlying a respective down-shaft (a type of shaft 13) of the three-dimensional grid 17 is designated as a landing spot $S_{LND}$ at which the robotic storage/retrieval vehicles 14 land on the lower track layout 28 after having travelled vertically downward through the down-shaft. Each spot underlying a respective up-shaft (also a type of shaft 13) at the outer perimeter the three-dimensional grid 17 is designated as a launching spot $S_{LCH}$ from which the robotic storage/retrieval vehicles 14 travel upwardly through the up-shaft to the upper track layout 10. The spot in the lower track layout 28 of grid structure 17 that neighbours the entrance spot $S_{EN}$ of the working station 18 is referred to as an emergence spot $S_{EM}$ from which the robotic travel vehicle 14 exits the lower track layout 28 of the three-dimensional grid 17 and enters the working station 18 at the entrance spot $S_{EN}$ thereof. The spot in the lower track layout 28 of grid structure 17 that neighbours the exit spot $S_X$ of the working station 18 is referred to as a re-entry spot $S_R$ from which the robotic travel vehicle 14 re-enters the three-dimensional grid 17 from the exit spot $S_X$ of the working station 18. Arrows in the figure show the travel path followed by a robotic storage/retrieval vehicle 14, first travelling outward from the emergence spot $S_{EM}$ of the lower track layout 28 into the entrance spot $S_{EN}$ of the working station 18, then travelling longitudinally through the access spot $S_A$ for interaction with the worker, before moving longitudinally into the exit spot $S_X$ and then transitioning back into the lower track layout 28 at the re-entry spot $S_R$ thereof.

One or both of the emergence spot $S_{EM}$ and re-entry spot $S_R$ may be a multi-purpose spot, for example also serving as a landing spot $S_{LND}$ or launching spot $S_{LCH}$ under a respective down-shaft or up-shaft, as shown in the illustrated example where the re-entry spot $S_R$ is also a landing spot $S_{LND}$. All other spots in the area of the lower track layout 28 neighbouring the working station 18 underlie respective storage columns 11 of the three-dimensional grid structure 17 in which the storage units 16 are shelved. These spot serve as available parking spots $S_P$ in which a robotic storage/retrieval vehicle 14 carrying a respective storage unit 16 can be selectively parked after landing on the lower track layout 28 at the landing spot $S_{LND}$ at the bottom of the down-shaft from which the robotic storage/retrieval vehicle 14 retrieved said storage unit 16 in the event that there is another robotic storage/retrieval vehicle 14 that is destined for the same working station 18 and whose travel to said working station 18 has been assigned, by the computerized control system 500, a greater priority ranking than the robotic storage/retrieval vehicle 14 being parked. Selection by the computerized control system 500 of a particular spot at which to park one of the storage/retrieval vehicles 14 may be based on an available least-distance travel path to the working station entrance from a particular one of the designated landing spots $S_{LND}$ at which the parking storage/retrieval vehicle 14 arrived at the lower track layout 28.

Accordingly, the computerized control system 50 responsible for assigning tasks to the robotic storage/retrieval vehicles 14 and controlling navigation thereof through the three-dimensional grid 17 and working stations 18 can orchestrate arrival of a group of occupied vehicles (i.e. vehicles 14 carrying respective storage units 16 thereon) to the assigned working station 18 for which those storage units 16 are destined in a sequence that doesn't necessarily match the sequence in which the task were assigned (i.e. the assignment sequence), the sequence in which those storage units 16 were retrieved (i.e. the retrieval sequence) from their respective storage locations, the sequence in which the occupied vehicles landed at the lower track layout 28 (i.e. the landing sequence), and/or the sequence in which the occupied vehicles initially arrived into a vicinity of the emergence spot $S_{EM}$ adjacent the assigned working station 18 (i.e. the arrival or approach sequence)

In one illustrative example, a picking operation is executed by the computerized control system 500, and involves assigning a first group of one or more vehicles 14 to retrieve one or more respective storage units 16 each containing a different item for a first customer order and deliver said storage units 16 to a particular working station 18, and a second group of one or more vehicles 14 assigned to retrieve one or more storage units 16 each containing a different item for a second customer order for delivery to the same working station 18. Due to differences in travel distance from the initial location of each vehicle 14 to the assigned working station 18 via an available retrieval location at which a storage unit 16 containing the appropriate item is stored (of which there may be multiple options, in which case priority may be given based on shortest overall travel path from the robotic storage/retrieval vehicle's current location to the assigned working destination via the different retrieval location options), vehicles 14 from the two groups may arrive at the lower track layout 28 with their retrieved storage units 16 and approach the assigned working station 18 in a mixed order. Here, the computerized control system 500 can assign priority rankings on which to sequence the entry of the two groups of vehicles 14 into the working station 18, and instruct lower priority vehicles 14 to park themselves at currently unoccupied parking spots $S_P$ of the lower track layout 28.

The assigned priority ranking may be based at least partly on a "grouped delivery" basis so that all items for one order are delivered prior to any item for the other order. Further weighting may be based on a "first landing" or "first arrival" basis, where the first vehicle 14 landing at the lower track layout 28 or approaching the assigned working station 18 dictates which of the two vehicle groups is prioritized over the other in the "grouped delivery" sequence, or on an "order priority" basis where the orders are ranked by priority due to size (i.e. picking larger orders before smaller ones), shipment destination (picking orders destined for more remote destination before more local destinations), delivery deadlines, customer types, shipment vehicle availability, etc. So, depending on the ranking criteria selected, all items of the first order may be delivered to the access spot $S_A$ of the working station 18 before any item of the second order, or vice versa, regardless of the particular sequence in which the two orders were received by the system. Alternatively, a large order requiring a high number of storage units 16 for complete fulfillment may have its queue of robotic storage/vehicles 14 interrupted by one or more robotic storage/retrieval vehicles 14 assigned to a small order in order to pick the entire small order at the working station 18 before returning to continued picking of the larger order.

Referring again to FIG. 23, the executable statements and instructions of the software at the master control system 502 includes an order processing module 518, which receives the details of orders to be fulfilled, for example from a warehouse management system (WMS) or other host system 519. The received orders may have pre-assigned priority rankings already applied thereto by the WMS or other host system 519, for example based on customer type, delivery deadlines, order size, distance to shipping destination, scheduled or estimated availably of transport vehicle, etc. One by one in sequential order from highest to lowest priority ranking of the orders, the order processing module 518 breaks each order down into line item tasks that each containing identification (UPC, SKU or other unique identifier) of a particular line item from the order, and the quantity of that item to be picked (i.e. line item quantity). These line item tasks of each order are communicated to a planning module 520. The planning module 520 compares the unique identifier from each line item task against dynamically updated inventory records of the master control system 502 which contain the currently stored location of each storage unit 16 and the quantity and type of items stored therein. Based on this comparison, the planning module identifies the location in the storage grid 17 at which a storage unit 16 containing that line item is currently stored. The planning module also selects which working station 18 to assign to the current order to, and identifies available storage/retrieval vehicles 14 to which the line item tasks can be assigned, and compiles this information, together with the line item quantities, into a respective a task assignment for each line item task. These task assignments are shared with a task transmission module 522, which converts the task assignments of the processed order into recognizable commands wirelessly transmitted to vehicles 14 for execution thereby to carry out the assigned tasks. The task assignments are also shared with the workstation control system 506 of the working station 18 to which the processed order was assigned. In addition to the line item quantity, each task assignment may also include identification of the particular item(s) to pick from the storage unit, for example as required in instances where the storage unit is one that contains multiple item types therein.

On top of the order-based priority ranking, further item-based priority ranking may be applied to the different line items of an individual order, in which case each task assignment also contains an item priority ranking for the line item thereof. Such item-based priority ranking may be based on any of a variety of different item attributes, including style, size, weight, color, ingredients, liquids vs. dry goods, allergens, contaminants, etc. For example, fulfillment of a retail order may require style, color, size runs, etc. that are to be packaged together for sorting convenience at the recipient retailer. Heavier items or liquid goods can be given higher priority so that their earlier delivery to the working station enables packing of the heavier/liquid items into the bottom of a shipping container, followed by placement of subsequently delivered lightweight/dry-good items on top to prevent crushing or liquid contamination of the bottom packed goods. Likewise, allergenic foods can be presented first and packed before non-allergenic foods ever reach the working station 18 to avoid cross-contamination.

Figure 7B:
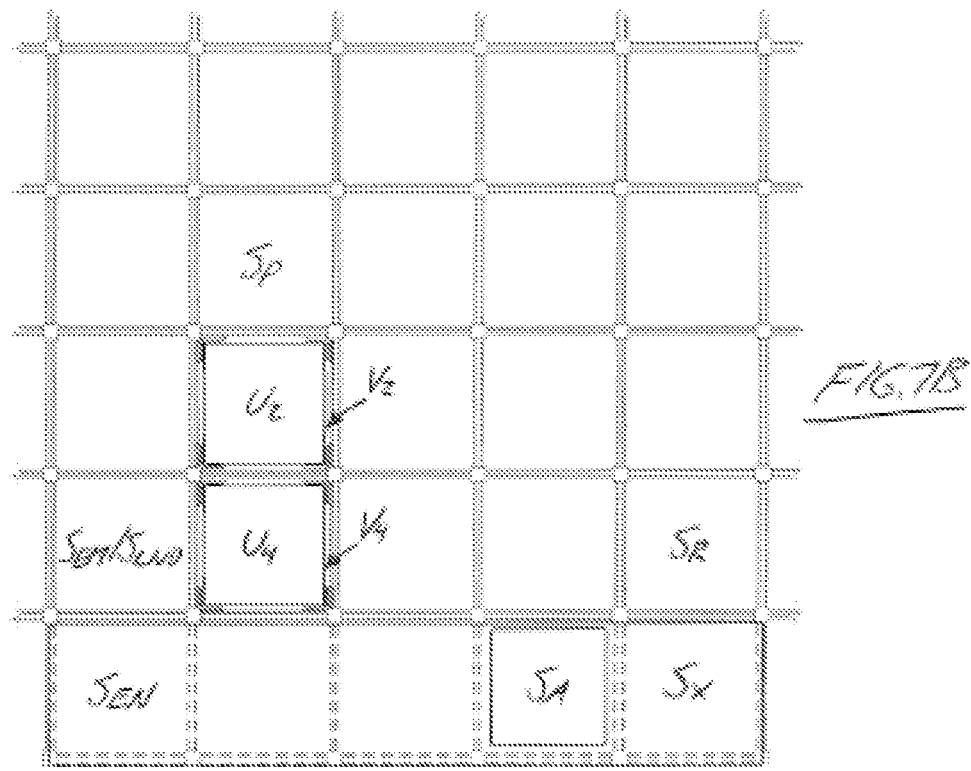
Figure 7C:
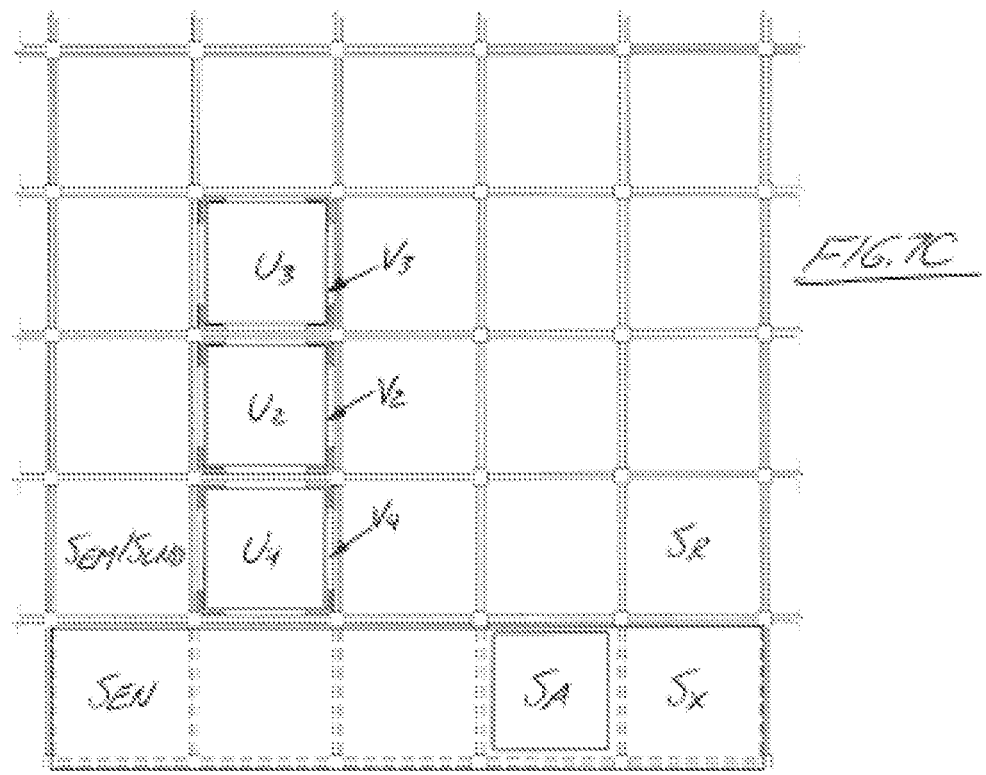
Figure 7D:
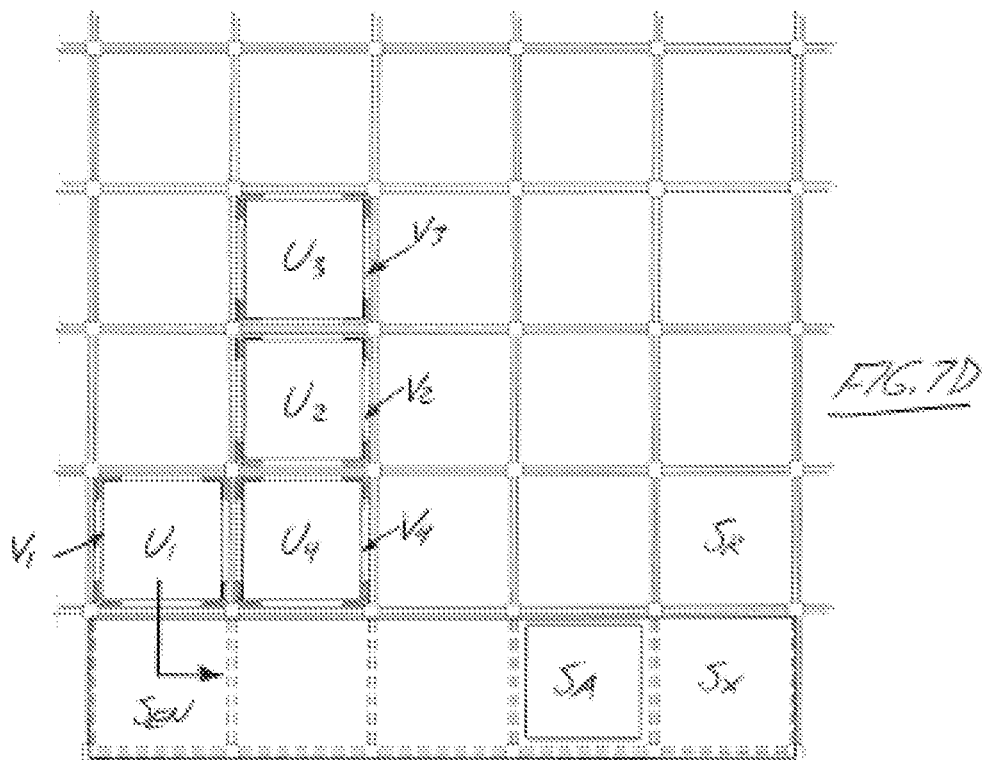
Figure 7E:
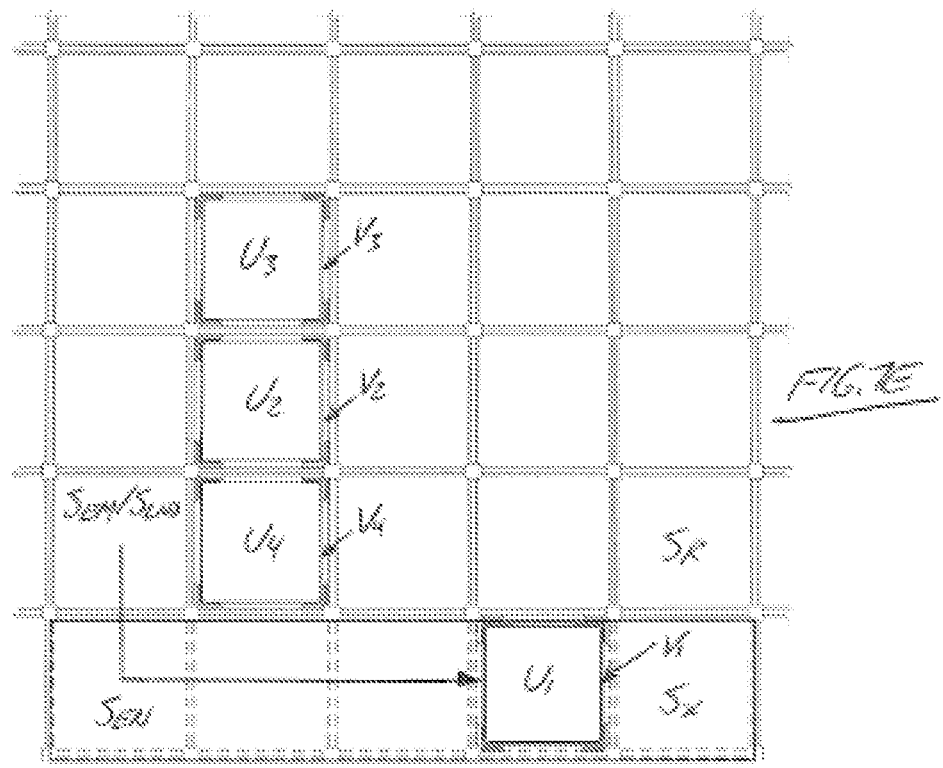
Figure 7C:
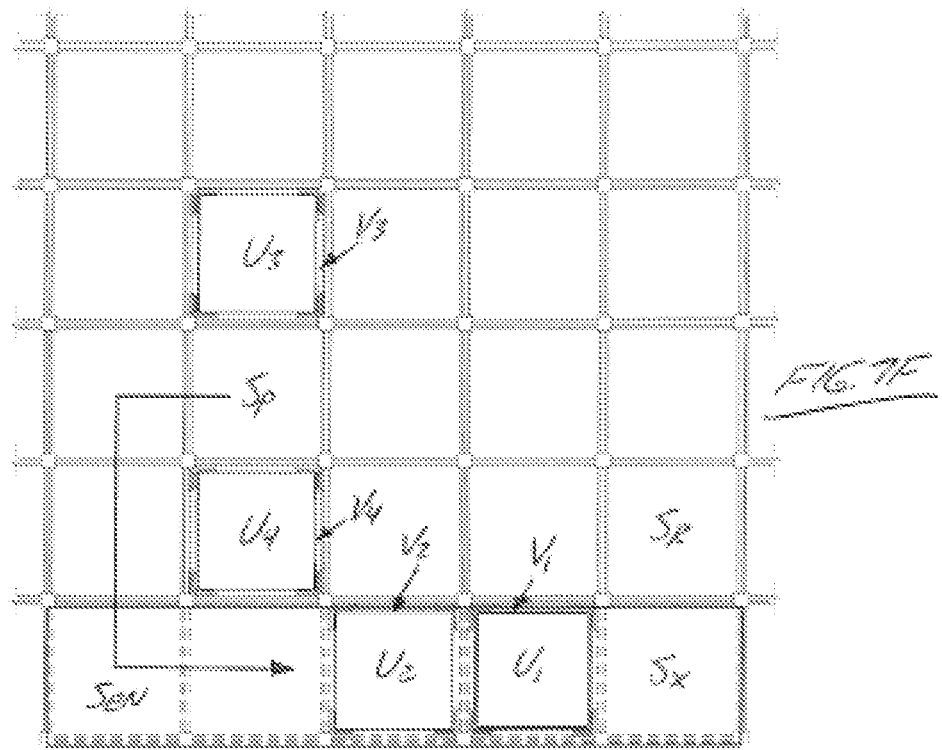
Figure 7D:
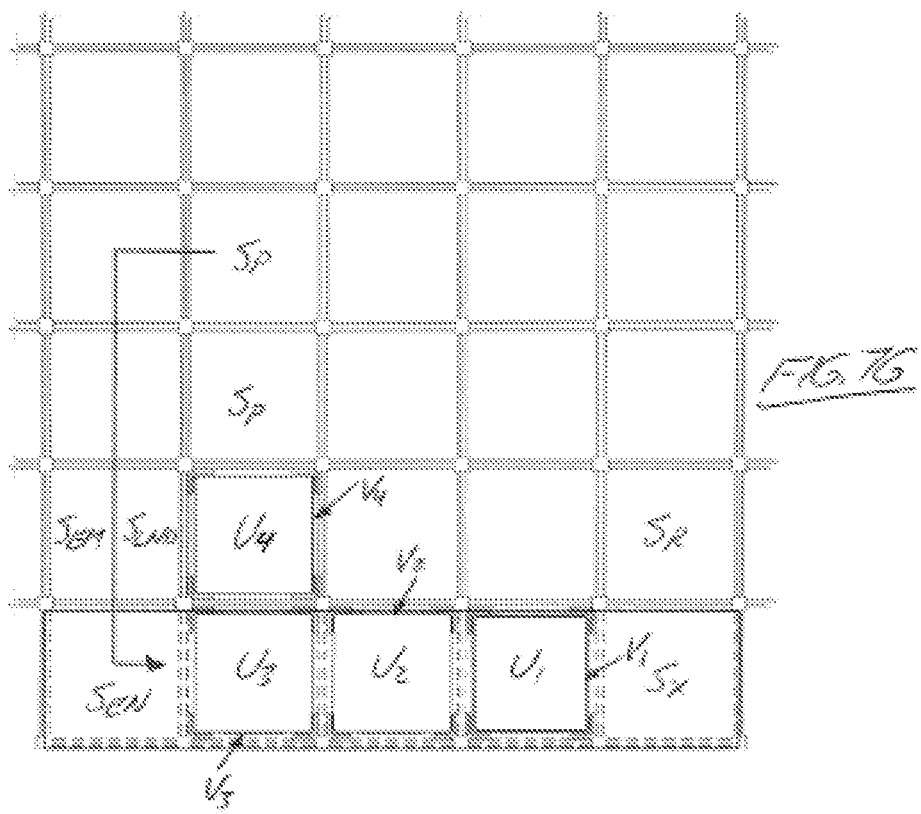

One particular example of orchestrating sequenced delivery of storage units 16 by priority ranking, whether order-based among storage units 16 of different orders or item-based among storage units 16 of a same order, is illustrated in FIGS. 7A through 7H, where four storage/retrieval vehicles $V_1, V_2, V_3, V_4$ are carrying respective storage units, $U_1, U_2, U_3, U_4$ whose priorities have been ranked by the computerized control system 500 in sequentially decreasing order, such that storage unit $U_1$ on vehicle $V_1$ is of greatest priority, and storage unit $U_4$ on vehicle $V_4$ is of lowest priority, but whose arrival into proximity with the working station 18 has occurred non-matching sequence to this priority ranking. Referring to FIG. 7A, vehicle $V_4$ is the first to land on the lower track layout 28 and approach the emergence spot $S_{EM}$ thereof. Due to its lowest priority ranking, vehicle $V_4$ is parked close to the working station 18 entrance spot $S_{EN}$, for example at a parking spot $S_P$ adjacent the emergence spot $S_{EM}$ of the lower track layout 28. Turning to FIG. 7B, vehicle $V_2$ is the next to land on the lower track layout 28 and approach the emergence spot $S_{EM}$, and due to its non-highest priority ranking, is also parked at an open parking spot $S_P$ close to the working station 18 entrance spot $S_{EN}$, for example adjacent to previously parked vehicle $V_4$. Turning to FIG. 7C, vehicle $V_3$ is the next to land on the lower track layout 28 and approach the emergence spot $S_{EM}$, and due to its non-highest priority ranking, is also parked at an open parking spot $S_P$ close to the working station 18 entrance spot $S_{EN}$, for example adjacent to previously parked vehicle $V_2$. Turning to FIG. 7D, vehicle $V_1$ is the next to land on the lower track layout 28 and approach the emergence spot $S_{EM}$, and due to its highest priority ranking, travels straight into the entrance spot $S_{EN}$ of the working station 18, as enabled by the non-obstructive relationship of the parked vehicles $V_2, V_3, V_4$ to the working station 18 entrance spot $S_{EN}$. Turning to FIG. 7E, vehicle $V_1$ travels onwardly through the working station chute 42 atop the extension track, and parks at the access spot $S_A$ thereon, thereby delivering the highest ranked storage unit $U_1$ to the access spot $S_A$ for interaction therewith by a human or robotic worker.

Turning to FIG. 7F, having delivered the highest-ranking storage unit $U_1$ to the access spot $S_A$ of the working station 18, vehicle $V_2$ carrying the next-highest ranking storage unit $U_2$ is then commanded out of its parking spot $S_P$ to the emergence spot $S_{EM}$ of the lower track layout 28, onward therefrom to the working station 18 entrance spot $S_{EN}$, and onward therefrom toward the working station access spot $S_A$ where vehicle $V_1$ is current parked. Vehicle $V_2$ is parked adjacent to the access spot $S_A$ currently occupied by vehicle $V_1$. Turning to FIG. 7G, vehicle $V_3$ carrying the next-highest ranking storage unit $U_3$ is then commanded out of its parking spot $S_P$ to the emergence spot $S_{EM}$ of the lower track layout 28, onward therefrom to the working station 18 entrance spot $S_{EN}$, and onward therefrom toward the working station 18 access spot $S_A$ where vehicle $V_1$ is current parked, and beside which vehicle $V_2$ is already queued. Vehicle $V_3$ is parked adjacent the intermediate spot currently occupied by vehicle $V_2$. Turning to FIG. 7H, final vehicle $V_4$ carrying the lowest-ranking storage unit $U_4$ is then commanded out of its parking spot $S_P$ to the emergence spot $S_{EM}$ of the lower track layout 28, and onward therefrom into the working station 18 entrance spot $S_{EN}$, next to which vehicles $V_2$ and $V_3$ are already queued behind vehicle $V_1$. Vehicle $V_4$ is parked at the entrance spot $S_{EN}$ of the workstation so as to reside adjacent the intermediate spot currently occupied by vehicle $V_3$. Through the forgoing orchestration of vehicles 14 and their carried storage units 16 by selective parking and advancement of vehicles 14 on the lower track layout 28 according to their priority rank, the four storage units are now queued inside the working station 18 for properly sequenced advancement to the access spot $S_A$ of the working station 18.

FIG. 7I illustrates cooperative execution of control logic by the processors of the computerized control system 500 and storage/retrieval vehicles 14 to perform such orchestration of the vehicles 14 and their carried storage units 16 within the three-dimensional storage grid 17 to achieve the sequenced arrival thereof at the working station 18. At step 2001, the master control system 502 generates the task assignments from the line items of a new order of highest priority ranking among those in queue to be processed, then forwards the task assignments to the workstation controller 506, and transmits the task commands to the storage/retrieval vehicles 14. At step 2002, upon receipt of said commands, the vehicles 14 begin their task-prescribed travel paths through the storage grid 17 to retrieve the respective storage units 16 from their storage locations, and carry the retrieved storage bins down to the lower track layout 28 of the three-dimensional storage grid 17, upon which they subsequently approach the assigned working station 18. Meanwhile, the workstation controller 506 has stored thereat the task assignments of the new order, together with any remaining as-yet incomplete task assignments of an earlier order, collectively referred to as pending tasks. With such tasks pending, at step 2003, the computerized control system 500 checks if there is any open spot in the workstation 18 among the entrance spot $S_{EN}$, intermediate spots, and access spot $S_A$ thereof. To do this, the workstation controller 506 may query the dynamic vehicle location records of the master control system 502 for the vehicles 14 assigned to the pending tasks, and search these for records for vehicles 14 whose last confirmed location is one of these spots in the workstation 18. If the query turns up no vehicle match for one or more of these spots, then the workstation 18 knows there is an available spot to fill. Accordingly, this initiates a procedure for the workstation controller 506 to "call" for a next vehicle 14 to enter the workstation 18 in view of the available occupancy therein. Identification of which vehicle 14 to call is performed by the workstation controller 506 based on the order and item priority rankings of the pending tasks.

The instant example contemplates a scenario where fulfillment of the earlier order is already underway at the working station 18, and the order priority of the new order is not one that outranks the earlier order. The same approach would also apply where the system is set to follow a "no interruption" workflow, where an order fulfillment already underway is not to be interrupted by another order, even if of greater priority ranking. At step 2004, the workstation controller 506 determines whether or not all vehicles 14 of the earlier order have already entered the workstation 18. To do this, the workstation controller 506 may check the pending tasks of the earlier order to identify any vehicles 14 among those assigned to these tasks that have not yet been confirmed to have entered the workstation 18, for example by querying the master control system's 502 dynamic location records of these vehicles 14 for any whose last confirmed location doesn't match the unique identifier of any of the entrance spot $S_{EN}$, intermediate spots, and access spot $S_A$ on the working station's 18 gridded lower track 36. If the master control system 502 reports back to the workstation controller 506 that the last confirmed locations of all the queried pending-task vehicles 14 of the earlier order are spots in the working station 18, then the working station controller 506 has confirmed at Step 2004 that all vehicles 14 of the earlier order have already entered the workstation 18. Having made this positive determination at Step 2004, Step 2005 is to then call on the vehicle 14 of the highest priority ranked task assignment in the new order. To do so, the workstation controller 506 identifies the pending task assignment of highest priority among the new order's task assignments, and submits a "call request" to the master controls system 502 that identifies the vehicle 14 specified in this identified task assignment. In response, the master control system 502 flags this vehicle 14 as having been summoned or called by the working station 18.

As mentioned previously, vehicle travel is commanded in segmented fashion, meaning the overall travel plan used by a vehicle 14 to pick a storage unit 16 and deliver it to the working station 18 is broken down into linear segments. Accordingly, the task commands sent to the vehicles 14 are not one-time commands containing a full set of travel instructions to complete the entire task of retrieval and delivery of a storage unit 16 to a workstation 18. Instead, the travel instructions are commanded in piecemeal, segment by segment, and the next segment to be commanded can be dynamically selected or reconfigured by the planning module before transmission to the vehicle 14. Each time a vehicle 14 reaches the end of a commanded segment, it returns a confirmation signal to the master control system 502 that it has completed the last commanded travel segment, in response to which a further command with the instructions for the next linear travel segment are transmitted to the vehicle 14. The flagging of a vehicle 14 as having been called by the workstation 18 means that when the vehicle 14 sends confirmation of a completed travel segment sometime after having already retrieved the assigned storage unit 16 and landed at the lower track layout 28, the master control system 502 recognizes that the vehicle 14 should be commanded with a travel route of one or more linear segments leading into the entrance spot $S_{EN}$ of the workstation 18 that called for this vehicle 14, and so the planning module 520 calculates such a workstation-destined route, the commands for which are then transmitted to the vehicle 14. These commands are again transmitted in piecemeal fashion segment-by-segment if the route involves more than one linear segment from the vehicle's 14 last confirmed position on the lower track layout 28 to the entrance spot $S_{EN}$ of the working station 18. For example, upon receiving a confirmation signal that a robotic storage/retrieval vehicle 14 has arrived at a landing spot $S_{LND}$ on the lower track layout 28, the master control system 502 may use this at the check-point to see whether the vehicle 14 has been flagged/called, and accordingly decide whether to calculate and command a workstation-destined travel route for that vehicle 14. However, spots on the lower track layout 28 other than the landing spots $S_{LND}$ may alternatively serve as the check point where this routing decision is made to dynamically update the vehicle's 14 overall travel path to the workstation 18 depending on whether is has yet been called, or should be temporarily parked.

Once having called the highest-ranking vehicle 14 of the new order, any other vehicle 14 assigned to that same order, but not yet flagged by a call request from the working station 18, must be parked at Step 2006 to await entry to the working station 18 once another spot opens up. Any such uncalled vehicle 14, instead of a workstation-destined travel route, is commanded with a holding-pattern travel route dynamically generated by the planning module to instead terminate at an available parking spot $S_P$ outside the working station 18, but preferably nearby the entrance thereof, where it awaits assignment of called-for status before being re-routed into the workstation 18. For a parked vehicle 14, awaiting its turn to enter the workstation 18, later receipt of the call request for that vehicle 14 by the master control system 502 will trigger immediate calculation and command of its workstation-destined travel route from the parking spot $S_P$. Steps 2003 to 2005 are then repeated, followed by a check at step 2007 with each repetition on whether all vehicles 14 of the new order have yet been called, for example in the same fashion described above for the earlier order at Step 2004. Once all vehicles 14 have been called, the process terminates until a subsequent order is tasked to that working station 18. If determination at Step 2004 was that all vehicles 14 from the earlier order were not yet in the working station 18, then calling of the highest ranked vehicle 14 of that earlier order and parking of any other landed vehicles 14 in that order, along with parking of all landed vehicles 14 in the new order, are performed at Steps 2008 and 2009 in the same manner described for Steps 2005 and 2006 for the new order, followed by repetition of steps 2003 and 2004. By using the very same grid structure 17 in which the storage units 16 are arrayed and by which the robotic vehicles 14 navigate the storage array, this internally performed sequence orchestration enables complex sequencing or sortation during order picking operations while avoiding the space and material inefficiencies associated with prior art techniques, such as space intensive sortation conveyors, where the retrieval step is performed by one fleet of machines, and then sortation is performed downstream at a second stage of different machinery or equipment type, before delivering sorted items to assigned working stations 18 situated remotely of the storage structure.

While the forgoing example specifically uses dedicated up-shafts, dedicated down-shafts, and designated parking spots $S_P$ specifically on the lower track layout 28 for the purpose of selectively parking vehicles 14 after storage unit 16 retrieval on their way to assigned lower level working stations 18 without interfering with flow of other unparked vehicles 14 moving through the three dimensional grid 17, it will be appreciated that other locales in the three dimensional grid 17 may be used to temporarily park retrieved storage units 16 during the orchestration of sequenced delivery to the working stations 18. Accordingly, any of the square spots between the X and Y direction rails 24, 26 of the upper track layout 10 may likewise be used as a temporary parking spot $S_P$ for occupied vehicles 14 during delivery sequence orchestration, just as they may be used to park inactive vehicles 14 awaiting activation by way of operational assignment and instruction from the computerized control system 500. In such instance, the spots overlying the up-shafts and down-shafts are preferably reserved as drop-down spots for entry to the down-shafts and climb-out spots for exit from the up-shafts, and thus not employed for temporary parking purposes so as not to hinder traffic flow of unparked vehicles 14 through the three-dimensional grid 17. Likewise, the sequenced delivery orchestration may employ parking of vehicles 14 at any level in the down-shafts and/or up-shafts for the purpose of delaying the arrival of such parked vehicles 14 to the working stations 18 in view of higher priority rankings assigned to the other occupied vehicles 14, though again, it may be preferable to avoid such obstruction to shaft travel by other vehicles 14. While select embodiments have specific up-shafts dedicated to only upward traffic flow of the robotic storage/retrieval vehicles 14 and separate down-shafts dedicated to only downward traffic flow, it will be appreciated that other embodiments need not restrict each shaft 13 to a particular direction of traffic flow. Accordingly, the spot on the lower track layout 28 beneath such a two-way shaft would serve as both a launching spot $S_{LCH}$ and landing spot $S_{LND}$, and the spot on the upper track layout 10 above the two-way shaft would serve as both a drop-down and climb-out spot for that shaft 13. Also, while the illustrated example has working stations 18 at the lower level for service from the lower track layout 28, the same concepts concerning working stations 18 served by extension tracks, and in-grid orchestration of sequenced delivery of storage units 16 to the working stations 18, may similarly be employed in instances where working stations 18 are instead served from the upper track layout 10.

The same inventive in-grid orchestration of sequenced delivery of storage units 16 to the working stations 18 entirely within the two-dimensional footprint of the track layouts, can also be employed regardless of whether the working stations 18 are the inventive "travel-through" workstations disclosed herein, where the same robotic storage/retrieval vehicles 14 responsible for retrieving and returning storage units 16 to the three-dimensional storage grid 17 also carry the storage units 16 through the working stations 18, or are "drop off" workstations where the robotic storage/retrieval vehicles 14 drop off the storage units 16 at an intake point of the working station 18, which may for example be a turntable, elevator, conveyor or other handling equipment responsible for transitioning the dropped off storage unit 16 to an access point of the working station 18 where a human or robotic worker then interacts with the storage unit 16 outside the three-dimensional grid 17. The intake point at which the storage units 16 are dropped off may reside within, or just outside, the two-dimensional footprint of the track layouts, while the access point (e.g. access opening 52 over an access spot $S_A$) resides outside the two-dimensional footprint of the track layouts, i.e. outside the storage grid structure 17.

While many of the forgoing examples focus on picking operations used to fulfill an order by delivering storage units 16 containing items for that order to a working station 18 where a human or robotic worker can remove such items from the storage units 16 and compile them into a shipping container for delivery to a customer, the working stations 18 can also be used for re-stocking or order buffering operations, where items are placed into the storage unit 16 presented by the robotic storage/retrieval vehicle 14 at the access spot $S_A$ of the working station 18, from which the robotic storage/retrieval vehicle 14 then re-enters the three-dimensional grid 17 to place that storage unit 16 in an available storage location in the three-dimensional grid 17. In the re-stocking operation, the items placed in the robotic storage/retrieval vehicle-carried storage unit are new inventory items of a type not previously stored in the structure, or inventory replenishment items replacing previously picked items. Accordingly, it will be appreciated reference herein to performance of tasks at the working station 18 to fulfill an order is not necessarily limited specifically to fulfillment of customer orders, where customer-ordered items are picked from storage units 16 for shipment to the customer, and that an order being fulfilled may be any variety of work order similarly requiring interaction with a storage unit 16 at the access opening 52 of the workstation 18, whether for picking of items therefrom or placement of items therein, for example for re-stocking or kitting purposes (the latter referring to placement of mixed items of different types into a singular storage unit from bulk inventory storage units 16 each containing only a singular item type).

An order buffering operation first involves a picking operation, in which the computerized control system 500 assigns and instructs a group of storage/retrieval vehicles 14 to different retrieve storage units 16 containing a particular collection of items required to fulfill an order, and to carry the retrieved items in their respective storage units 16 down to the lower track layout 28 and onward to the entrance spot $S_{EN}$ of the working station 18 assigned to this buffering operation. As the assigned group of vehicles 14 move through the working station 18, the worker extracts one or more items of the order from the storage unit 16 on each vehicle 14 when said vehicle 14 arrives at the access spot $S_A$ of the working station 18, and these extracted items are amalgamated together in order to form a full or partial fulfillment of the order.

This fully or partially fulfilled order is placed into a container of compatible size with the storage spaces in the three-dimensional grid structure 17. This container may be the same as the rest of the storage units 16, for example an openable/closeable storage bin, or may be a shipment container of different type from the storage units 16 (e.g. cardboard shipping box, optionally sealed closed and having a shipping label already placed thereon, for example if the amalgamated order contents fulfill the entire order). The computerized control system 500 sends an unloaded vehicle 14 to the same working station 18, where the container with the amalgamated order contents is placed atop this vehicle 14 at the access spot $S_A$ of the working station 18. The computerized control system 500 then sends this order-carrying vehicle 14 back into the three-dimensional grid structure 17 with instructions to store the fully or partially fulfilled order in an available storage location in the three-dimensional grid structure 17. The same three-dimensional storage grid 17 used to store inventory items can therefore also be used to buffer partially prepared or fully-ready shipments until a later date or time, for example a future pickup time at which a shipping vehicle is expected to arrive to pick up a fully completed order for delivery, or in the case of a partially fulfilled order requiring additional items currently not in stock, an future time at which the out of stock inventory will be replenished to enable completion of the order.

When it comes time for the pickup or inventory replenishment, a buffered-order retrieval operation is performed by the computerized control system 500, sending a robotic storage/retrieval vehicle 14 to retrieve the order container from its storage location, and deliver the order container to one of the working stations 18, for retrieval of the container, or the individual items contained therein, through the access opening 52 of the working station 18. If the buffered order was only a partial order, then the previously missing items are then amalgamated with the retrieved items, either by addition to the same container if useable as a shipment container, or by amalgamation into a new shipping container.

Having summarized the novel working stations 18 of the present invention, novel uses thereof, and novel use of the three-dimensional grid structure 17 itself for workstation delivery sequencing and order buffering, attention is now turned to other points of novelty in the three-dimensional grid structure 17, robotic vehicle fleet and cooperative operation therebetween.

FIG. 8 illustrates an isolated section of the lower track layout 28 of the three-dimensional grid structure 17, with parallel first and second longitudinal rails 60a, 60b running in the X-direction of the lower track layout 28, and a parallel set of additional cross-rails 62a-62f perpendicularly interconnecting the first and second longitudinal rails 60a, 60b at regularly spaced intervals therealong in the Y-direction of the lower track layout 28. As mentioned above, a respective spot of the lower track layout 28 is denoted by the square area between the two longitudinal rails 60a, 60b and each adjacent pair of cross-rails 62a-62f. The cross-rail on the same side of each spot (on the right side of each spot in the illustrated example) carries a visually detectable location marker 64 thereon at a mid-point of the cross-rail's topside. The visually detectable location marker 64 may be applied as a separate sticker or label, or etched into the rail of the track itself. Each robotic storage/retrieval vehicle 14 carries a scanner 66 on a side of the robotic storage/retrieval vehicle 14 that matches the side of the spots on the track layout on which the visually detectable location markers 64 are positioned. The scanner 66 comprises an image capture device with a downwardly angled field of view oriented to capture imagery of the marked cross-rails as the robotic storage/retrieval vehicle 14 travels the lower track layout 28. The field of view is aimed so that the frame size thereof at the marked topsides of the rails exceeds the size of the visually detectable location markers 64. The scanner 66 and the visually detectable location markers 64 are positioned relative to one another such that when the robotic storage/retrieval vehicle 14 is properly centered between the two longitudinal rails 60a, 60b and two cross-rails bounding a given spot of the lower track layout 28, the respective visually detectable location marker 64 on one of the cross-rails 62 will occupy a predetermined subregion of the scanner's 66 field of view (e.g. a central area thereof). As the robotic storage/retrieval vehicle 14 arrives at a targeted destination spot of the lower track layout 28, the scanner 66 captures images from its current field of view and a software module executed by a local computer processor 512 of the robotic vehicle 14 compares the position of the visually detectable location marker 64 within the larger viewing frame of the scanner 66 to check for agreement between the visually detectable location marker 64 position in the viewing frame and expected viewing frame sub-region in which the visually detectable location marker 64 is expected. So where the sub-region is a central area of the viewing frame, the software is checking whether the marker is properly centered in the viewing frame. The relative agreement or disagreement thus reflects the relative alignment between the robotic storage/retrieval vehicle 14 and the targeted spot on the lower track layout 28.

As described in Applicant's aforementioned prior PCT application, the robotic storage/retrieval vehicle 14 features a set of X-direction wheels 68 on two opposing sides of the robotic storage/retrieval vehicle 14, and a set of Y-direction wheels 70 on the other two opposing sides of the robotic storage/retrieval vehicle 14. The X-direction wheels 68 are raiseable and lowerable relative to a frame or chassis of the robotic storage/retrieval vehicle 14 into an out of engagement with the X-direction rails 60a, 60b of the lower track layout 28, just as the Y-direction wheels 70 are raiseable and lowerable relative to a frame of the robotic storage/retrieval vehicle 14 into an out of engagement with the Y-direction rails 62 of the lower track layout 28. Raising of the X-direction wheels 68 out of contact with the X-direction rails 60a, 60b is performed when the robotic storage/retrieval vehicle 14 is to travel in the Y direction by driven rotation of the Y-direction wheels 70 on the Y-direction rails 62, while raising of the Y-direction wheels 70 out of contact with the Y-direction rails 62 is performed when the robotic storage/retrieval vehicle 14 is to travel in the X direction by driven rotation of the X-direction wheels 68 on the X-direction rails 60a, 60b.

FIG. 8 shows the example where the robotic storage/retrieval vehicle 14 is riding in the X-direction of the lower track layout 28 toward a targeted destination spot thereon, and is scanning the visually detectable location markers 64 on the Y-direction rails as it does so. Each visually detectable location marker 64 may embody a scannable code containing a unique ID of the respective spot it designates within the two-dimensional grid map of the lower track layout 28, whereby this unique ID together with detected alignment of the visually detectable location marker 64 of the targeted destination spot can be used to both confirm arrival of the robotic storage/retrieval vehicle 14 at the correct targeted destination spot, and achieve proper centering of the robotic storage/retrieval vehicle 14 on this spot. Such alignment ensures that 1) the robotic storage/retrieval vehicle 14 does not interfere with travel of other vehicles 14 travelling in the other direction through neighbouring spots in the lower track layout 28; and 2) the robotic storage/retrieval vehicle 14 is properly aligned with the vertical shaft 13 above it if the targeted destination spot is a launching spot $S_{LCH}$ from which the robotic storage/retrieval vehicle 14 is intended to travel upwardly through the shaft 13 above it.

The engagement of wheels on opposing sides of the robotic storage/retrieval vehicle 14 with the corresponding rails of the lower track layout 28 automatically ensures alignment of the robotic storage/retrieval vehicle 14 on the targeted spot of the lower track layout 28 in the track direction perpendicular to these rails. So in the illustrated example of FIG. 8, the X-direction wheels 68 are engaged with the X-direction rails 60a, 60b, thus automatically aligning the robotic storage/retrieval vehicle 14 with the targeted spot in the Y-direction. During arrival of the robotic storage/retrieval vehicle 14 at the targeted spot in the X-direction, the scanner 66 captures imagery from its viewing frame and the software executed by the local processor 512 on the robotic storage/retrieval vehicle 14 checks the position of the visually detectable location marker 64 image within the viewing frame, and uses any deviation between the actual and expected visually detectable location marker 64 position in the viewing frame as feedback signals to dynamically adjust the drive signals to the motors of the X-direction wheels 68 so as to drive the robotic storage/retrieval vehicle 14 into properly centered alignment on the targeted spot. The same alignment procedure is used to provide feedback-governed control over the Y-direction wheels 70 when travelling into a targeted spot in the Y-direction. Since the robotic storage/retrieval vehicles 14 never change orientation on the track layout, the particular selection of which set of rails the markers are placed on (either X-direction or Y direction rails) is of no consequence, provided that the scanner 66 is placed on the appropriately cooperative side of each vehicle 14.

FIGS. 9A and 9B illustrate performance of the alignment procedure in the Y-direction, where the vehicle has just finished travelling along a Y-direction rail 62. The outer rectangular box drawn over the rail 62 represents an outer boundary $B_{FOV}$ of the scanner's 66 field of view (FOV), the center point of which is marked at C. The FOV subregion $S_{FOV}$ in which the visually detectable location marker 64 is expected to reside in the vehicle's 14 properly aligned position on the targeted spot of the gridded track is visible in FIG. 9A, which represents a misaligned state of the vehicle 14 on the targeted spot in the grid, where the visually detectable location marker 64 is clearly offset to one side of the subregion. In FIG. 9B, the visually detectable location marker 64 can be seen to be accurately centered in the FOV, thus perfectly occupying the central subregion $S_{FOV}$ at which is expected, and thus representing a properly aligned position of the vehicle 14 on the targeted spot of the gridded track. The only difference in images captured for X-direction alignment check purposes would be that instead of the visually detectable location marker 64 being offset from center in the left-right direction of FIG. 9A in a misaligned scenario, it would be offset from center in the up-down direction of the figure.

The wheel drive motors of each vehicle 14 are encoded, and the undirectional travel commands received from the master control system 502 are expressed only in terms of the direction of travel and the number of grid spots to travel in that direction. The local processor 512 translates this travel command into an appropriate drive signal for the wheel drive motors 524, based on a stored proportionality factor representing the predetermined relationship between the conveyance wheel diameter and the uniform width shared by all of the square grid spots. The encoded motors give the processor feedback that the appropriate number of wheel rotations equivalent to the commanded travel length have been performed. So when the processor 512 receives feedback confirmation from the encoded wheel motors that the prescribed rotation has been completed, the processor 512 triggers an image capture by the scanner 66, and then performs a visual analysis on the captured image to identify whether there is an offset between the expected and actual position of the visually detectable location marker 64 within the scanners FOV, calculated as a pixel offset value $V_{PO}$.

If the calculated offset is either zero, or within a permissible threshold, then the processor 512 has confirmed proper alignment of the vehicle 14 on the targeted spot of the gridded track. If the offset is nonzero, or exceeds a permissible threshold, then the vehicle 14 is known to be misaligned. In response, the processor 512 initiates a corrective wheel rotation action by transmitting a drive signal to the wheel drive motors 524 that is proportional to the calculated amount of pixel offset $V_{PO}$ in the image, and in appropriate direction determined by the direction of offset in the image. After performance of this corrective drive action by the wheel drive motors 524, an updated image is captured, and is subjected to the same offset determination process to assess whether proper alignment has been achieved, or whether further corrective action is needed to correct an overshoot or undershoot in the last corrective attempt. Once proper alignment is achieved, the vehicle processor 512 sends a "position accomplished" confirmation signal to the master control system 502, which includes the unique identifier encoded in the visually detectable location marker 64 and read by the scanner 66 as feedback to the master control system 502 to confirm that the targeted destination spot specific by the commanded vehicle task has been reached. This confirmation of aligned arrival at the targeted destination of the commanded linear travel segment, the master control system 502 can update the dynamic location record of the vehicle 14 with the unique identifier of the spot at which the vehicle 14 has now arrived. The gridded lower tracks 36 of the working stations 18 use the same visually detectable location marker 64 arrangement thereon for the same arrival confirmation, alignment check/correction, and location update purposes.

The above alignment check/correction process is generally summarized in FIG. 9C, where at step 3001, the computerized control system 500 commands unidirectional travel of the vehicle 14 along the gridded track layout of the grid structure 17, or along the gridded lower track 36 of a workstation 18, by a select whole number of grid squares or spots. At step 3002, in response to receipt of such command, the vehicle 14 drives itself the commanded number of spots in the commanded direction according to the known proportionality between the vehicle's conveyance wheel diameter and the standardized width of the grid and spots track layout. At step 3003, the local processor 512 of the vehicle 14 triggers capture of a digital image by the scanner 66, and at step 3004 analyzes the captured image to check for proper alignment of the uniquely coded visually detectable location marker 64 on the rail by measuring, in the same X or Y direction as the vehicle's commanded unidirectional travel, any pixel offset between the coded visually detectable location marker 64 and its anticipated position in the image. If the visually detectable location marker 64 is properly aligned in the image (i.e. if there is no offset, at least not beyond any prescribed threshold limit), then at Step 3005 the vehicle's processor 512 wirelessly transmits a confirmation signal to the master control system 502, which contains the unique identifier read from uniquely coded visually detectable location marker 64 scanned by the vehicle 14, so that the master control system 502 uses this to confirm the vehicle's arrival at the targeted destination spot prescribed by the travel command. If the visually detectable location marker 64 is found not to be properly aligned in the image, then at step 3006, the vehicle 14 attempts self-correction of its alignment by sending a drive signal to the wheel drive motors 524 that is proportional to the measured pixel offset value $V_{PO}$ from the image analysis, and repeats step 3004 again until alignment is confirmed.

In addition to such adjustment of the vehicle position as it arrives at the targeted spot on the track layout, earlier dynamic adjustment of the vehicle's travel may take place upstream of such arrival by scanning the other visually detectable location markers 64 past which the vehicle 14 is travelling on its way to the targeted spot beneath the targeted shaft (i.e. a shaft 13 for which the vehicle 14 is destined). The original travel instructions assigned and transmitted to the storage/retrieval vehicle 14 by the computerized control system 500 are based on actual physical distance to the targeted shaft 13 based on the known grid dimensions of the gridded three-dimensional structure 17. Where the vehicle 14 is travelling through more than one pass-through spot to reach the targeted grid spot below the targeted shaft 13, the scanner 66 can perform a scan as it moves through each pass-through spot use the results to dynamically correct the travel instructions on the fly to account for differences between the originally assigned travel distance and the true-remaining travel distance from the vehicle's current location to the targeted spot, thus co-ordinating more precisely aligned arrival of the storage/retrieval vehicle at the targeted spot to avoid or reduce the need for fine-tuning of the alignment during final arrival at the targeted spot.

While the illustrated embodiment employs static visually detectable location markers 64 located in the gridded three-dimensional structure 17 at fixed positions relative to the targetable spots on the lower track layout 28, and moving scanners 66 carried on the travelling storage/retrieval vehicles 14, this arrangement may be reversed by having statically positioned scanners in the three-dimensional grid structure 17 and detectable markers on the robotic storage/retrieval vehicles 14, though having the scanning and associated image processing carried out on the robotic storage/retrieval vehicle 14 whose wheels are being controlled is likely preferable. While the forgoing description of the scanner/marker alignment confirmation tool is made with reference to the lower track layout 28 to ensure that a vehicle 14 is properly aligned at a targeted launching spot of the lower track layout 28 before the robotic storage/retrieval vehicle 14 is lifted up into the shaft 13 above such launching spot $S_{LCH}$, the same tool may also be employed on the upper track layout 10 to ensure alignment of a vehicle 14 at a targeted drop-down spot overtop of a respective shaft 13 before lowering of the robotic storage/retrieval vehicle 14 down into said shaft 13.

FIGS. 10 through 15 illustrate one of the robotic storage/retrieval vehicles 14 at a launching spot $S_{LCH}$ of the lower track layout 28 of the three-dimensional grid structure 17 just outside one of the working stations 18 in neighboring relation to the exit spot $S_X$ thereof. A majority of the three-dimensional grid structure 17 is omitted for illustrative purpose, leaving only the four rails of the lower track layout that delimit this particular launching spot $S_{LCH}$ (of which one X-direction rail is labelled 60, and one Y-direction rail is labelled 62), the four support legs 30 supporting the rails at the intersection points therebetween at the corners of the launching spot $S_{LCH}$, and two of the four upright frame members 12 that stand upright from the four corners of the launching spot $S_{LCH}$ to define the four corners of the respective vertical up-shaft 13 above the launching spot $S_{LCH}$. The other two upright frame members are omitted to provide improved visibility of the robotic storage/retrieval vehicle 14 to demonstrate interaction thereof with a novel lifting mechanism 72 for raising the storage/retrieval vehicle 14 up into the overlying up-shaft 13.

The lifting mechanism 72 is seated atop the same ground surface as the support legs 30 of the lower track layout 28 within the rectangular footprint of the launching spot $S_{LCH}$. Shown in isolation from the lower track layout 28 in FIGS. 16 through 19, the lifting mechanism 72 features a base frame having four vertically upright corner legs 74 interconnected by horizontal cross-braces 76, and an upper panel 78 mounted atop the base frame at the top ends of the corner legs 74. A lifting platform 80 resides above the upper panel 78 of the base frame, and is movably carried thereon in a raiseable/lowerable manner by a suitable actuator, which in the illustrated example is an electric linear actuator 81 whose electric motor 82 is mounted to the underside of the base frame's upper panel 78 with the output rod 84 of the actuator 81 reaching upwardly through a central opening in the upper panel 78 to connect to the underside of the lifting platform 80. Accordingly, extension of the linear actuator 81 raises the lifting platform 80 upwardly from the upper panel 78, and retraction of the linear actuator 81 lowers the lifting platform 80 back down into contact or close adjacency to the upper panel 78 of the base frame. A set of four linear guide rods 86 are affixed to the underside of the lifting platform 80 near the corners thereof, and pass down through a set of bushings or bearings in the upper panel 78 of the base frame for sliding movement upwardly and downwardly through the upper panel 78 during extension and retraction of the linear actuator 81. The rod guides 86 thus help stabilize the lifting platform 80 to maintain a horizontally level orientation thereof.

The base frame is of a lesser height than the lower track layout 28 so that the upper panel 78 of the base frame resides at an elevation below the topsides of the rails of the lower track layout 28, and for example slightly below the undersides of these rails so that when the lifting platform 80 is in the lowered position adjacent the upper panel 78 of the base frame, it does not protrude above the rails of the lower track layout 28. In the followed position of the lifting platform 80, the robotic storage/retrieval vehicles 14 can thus travel freely over the launching spot $S_{LCH}$ in either track direction. Mounting brackets 88 reach outward from the upper panel 78 of the base frame of the lifting mechanism 72 at two or more sides thereof and are fastened to the rails of the lower track layout 28, for example at the undersides thereof, thus fixing the position of the lifting platform 80 in a properly squared relation to the lower track layout 28 and in properly centered position within the square area of the launching spot $S_{LCH}$.

The lifting mechanism 72 is communicable with the computerized control system 500 via wired or wireless connection thereto, for example as shown in FIG. 23 where the lifting mechanism 72 is wired to the local computer 506 of the workstation 18. When a robotic storage/retrieval vehicle 14 travelling along the lower track layout 28 reaches a targeted launching spot $S_{LCH}$ under an up-shaft 13 through which the robotic storage/retrieval vehicle 14 is destined to travel, or more typically when a robotic storage/retrieval vehicle 14 just having exited the workstation 18 rides onto this launching spot $S_{LCH}$ just outside the working station 18 exit spot $S_X$, the vehicle 14 is accurately aligned with the up-shaft 13 using the above described visually detectable location markers 64 and cooperating scanners 66, and the wireless transceiver 514 of the robotic storage/retrieval vehicle 14 signals the computerized control system 500 of the confirmed arrival of the robotic storage/retrieval vehicle 14 at the targeted launching spot $S_{LCH}$.

Figure 19A:
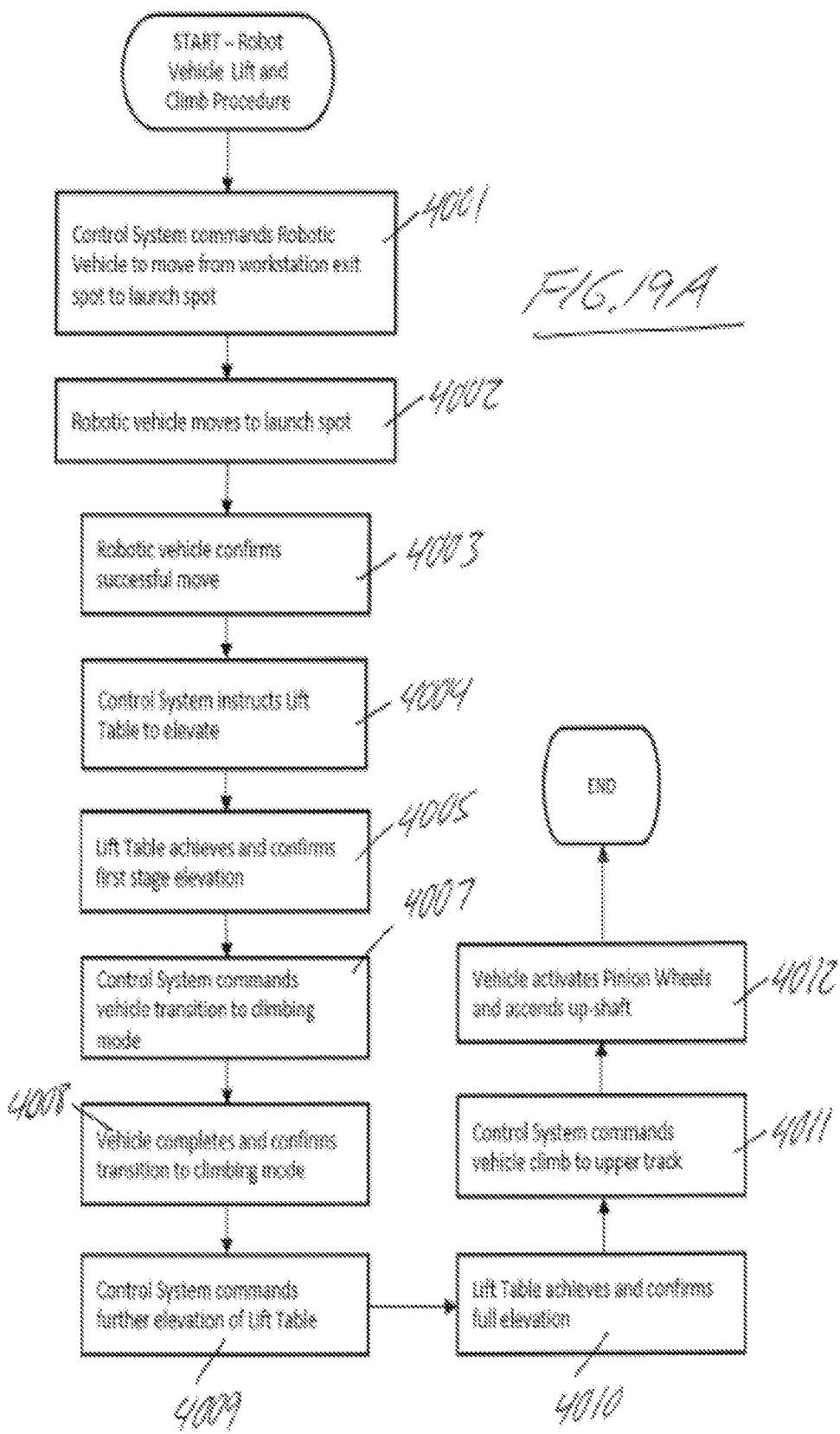
FIG. 19A illustrates a control logic routine cooperatively executed between the storage/retrieval vehicle, lifting mechanism and computerized control system initiate and complete launch and travel of the storage/retrieval upwardly through the shaft.

This process is shown in FIG. 19A, where, at Step 4001, the master control system 502 commands the vehicle 14 to move to the launching spot $S_{LCH}$ from the neighbouring exit spot $S_X$ of a working station 18, in response to which the vehicle 14 self drives the commanded one-spot unidirectional distance onto the launching spot $S_{LCH}$ in Step 4002. At step 4003, the vehicle 14 performs the alignment checking/correction procedure and positional confirmation reporting process documented in FIG. 9C. In response to this confirmation, the master control system 502 instructs the workstation control system 504 to send an activation signal to the lifting mechanism 72 at Step 4004, in response to which the actuator 80 thereof is activated in the extension direction to raise the lifting platform 80 up into contact with an underside of the robotic storage/retrieval vehicle's frame or chassis just above the rails of the lower track layout 28, thereby lifting the conveyance wheels of the vehicle 14 up off the lower track layout 28. At Step 4005, raising of the lifting mechanism 72 to this wheel-lifting height is completed, and confirmed by transmission of a first-stage lift-confirmation signal from the lifting mechanism 72 to the local computer 506 of the workstation control system, which in turn reports this first-stage lift-confirmation onward to the master control system 504. In other embodiments, the lifting mechanism 72 may be controlled directly by, and report confirmations directly back to, the master control system 502.

With the weight of the robotic storage/retrieval vehicle 14 now borne by the lifting mechanism 72 rather than by riding of the robotic storage/retrieval vehicle's conveyance wheels on the rails of the lower track layout 28, the master control system 502 now sends a mode-transition command to the storage/retrieval vehicle 14 at Step 4007, in response to which the local processor 512 thereof initiates a transition of the storage/retrieval vehicle 14 from track-riding mode to the shaft traversing mode. As part of this transition, the vehicle's local processor 512 drives the wheel-shifting motor(s) or actuator(s) 528 in the appropriate direction to draw the conveyance wheels of the robotic storage/retrieval vehicle 14 inwardly in a horizontally inboard direction to reduce the overall robotic storage/retrieval vehicle 14 footprint to a reduced size capable of entering the shaft so that the pinion wheels can engage with the rack teeth 90 on the upright frame members 12 at the corners of the up-shaft 13, thereby enabling climbing of the storage/retrieval vehicle 14 therethrough. The transition may further involve raising of the vehicle's height adjustable wheel set via activation of the wheel lifting/lowering motor(s) or actuator(s) 526, if these height adjustable wheels were previously in the lowered track-riding position. This way, all eight wheel units will be high enough to engage with the rack teeth 90 when the vehicle 14 is fully raised by the lifting mechanism 72 is completed. Only one lower set of rack teeth 90 is shown the bottom segment 32 of one of the two illustrated upright frame members 12 in FIGS. 10 through 15, but it will be appreciated that such rack teeth 90 are provided on all eight inwardly facing sides of the four upright frame members 12 of the up-shaft 13, and span a substantially full height of the shaft 13 to near the upper track layout 10. Moreover, pinion wheels are toothed for corresponding engagement with rack teeth 90, however, for illustrative simplicity, the figures are shown in simplified form without teeth on the pinion wheels.

After such retraction of the wheels, and raising of the height-adjustable wheels if necessary, the vehicle 14 sends a confirmation to the master control system 502 at Step 4008 that the transition of the vehicle 14 from track-riding mode to shaft-traversing mode has been successfully completed. In response, at Step 4009, the master control system 502 instructs the workstation controller 506 to command further extension of the lifting mechanism actuator to lift the robotic storage/retrieval vehicle 14 into a raised position in which the teeth (not shown) of the robotic storage/retrieval vehicle's pinion wheels are brought into engagement or immediate adjacency with lowermost rack teeth 90 on the upright frame members 12 of the three-dimensional grid structure 17. On completion of this further extension at Step 4010, the lifting mechanism 72 sends a full-stage extension confirmation signal to the local workstation computer 506, which is reported onward to the master control system 502 as confirmation that the vehicle 14 is now in fully raised position to ascend the up-shaft. In response, at Step 4011, the master control system 502 commands the vehicle to climb through the up-shaft to the upper track layout 10, in response to which, at Step 4012, the local processor 512 of the vehicle 14 activates the wheel drive motors 524 to drive the vehicle's pinion wheels and thereby initiate climbing of the robotic storage/retrieval vehicle 14 upwardly through the up-shaft of the three-dimensional grid structure 17.

The lifting mechanism 72, being powered by a mains power supply, thus reduces the overall energy load consumed by the on-board power supplies of the storage/retrieval vehicle 14 in its travel from the lower track layout 28 up the upper track layout 10, as the storage/retrieval vehicle's on-board power supply is not used to lift the robot up to an engageable position with the rack teeth 90. To maintain the robotic storage/retrieval vehicle 14 in alignment with the up-shaft 13 during lifting, the lifting platform 80 and underside of the vehicle chassis may have mateable male and female features laid out in matching pattern to one another to automatically align with one another when the vehicle 14 is properly centered on the launching spot $S_{LCH}$ of the track, whereby raising of the lifting platform 80 mates the male/female features thereon with the matching female/male features on the underside of the vehicle chassis. The mated features prevent the vehicle chassis from sliding around on the lifting platform 80 as it is raised. In on example, four male nipples protrude upwardly from the topside of the lifting platform 80 near the outer corners thereof to mate with four mating recesses in the underside of the vehicle chassis.

Figure 20:
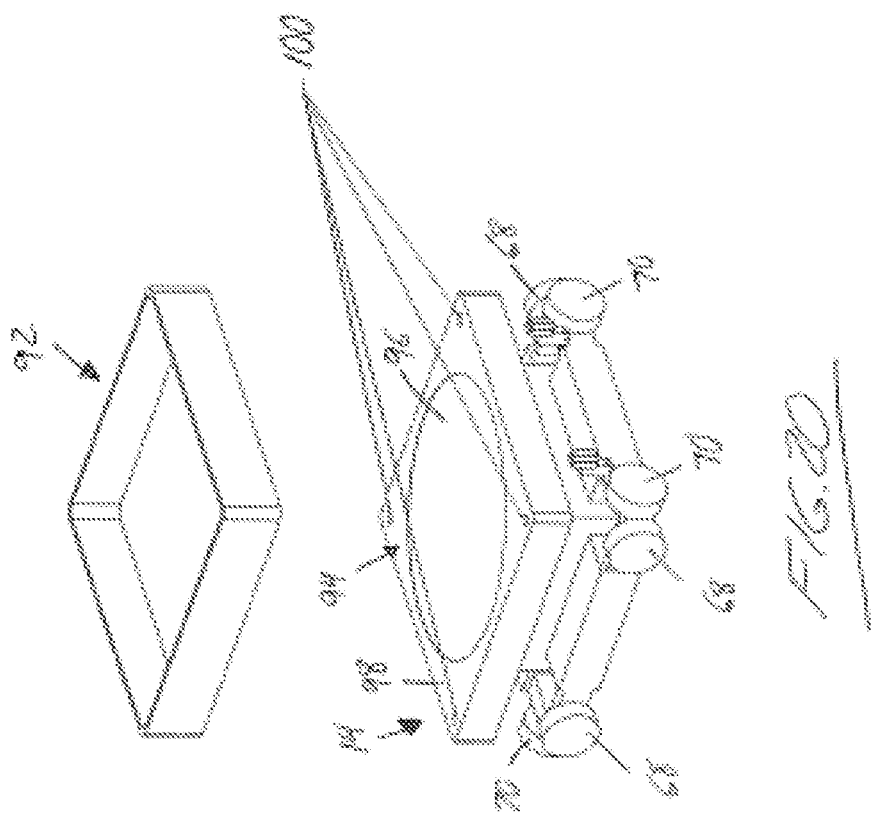
FIGS. 20 and 21 illustrate one of the robotic storage/retrieval vehicles and a compatible storage unit transportable thereon.

FIG. 20 shows one of the robotic storage/retrieval vehicles 14 and a storage unit 92 receivable on the robotic storage/retrieval vehicle 14 for transport thereby within the three-dimensional grid structure 17 and the working stations 18. In the illustrated example, the storage unit 92 to and from which smaller individual items can be inserted and removed is an open-top tray, though as mentioned elsewhere herein above, an openable/closeable box, bin or tote may alternatively be used. In other embodiments, the storage unit 92 may be the packaging of an individual item, as opposed to a container for storing multiple items therein. In other embodiments, where the grid dimensions and working stations 18 are of larger scale, a storage unit 92 may be a pallet on which one or items are received, whether one relatively large individual item, or a plurality of items. In the example of multiple palleted items, the items may be distributed among multiple containers (e.g. boxes, trays, bins, or totes) placed or stacked on the pallet, with one or more items stored in each such container.

As disclosed in Applicant's aforementioned prior PCT application, the robotic storage/retrieval vehicle 14 features an upper support platform 94 on which the storage unit 92 is receivable for carrying by the robotic storage/retrieval vehicle 14, and which may feature a rotatable turret 96 surrounded by a stationary outer deck surface 98. As disclosed in Applicant's aforementioned prior PCT application, the turret may once again have an extendable/retractable arm (not shown), which together with the rotatable function of the turret 96 allows pulling of storage units 92 onto the support platform 94 and pushing of storage units 92 off the support platform 94 at all four sides of the robotic storage/retrieval vehicle 14 so that each vehicle 14 can access a storage unit 92 on any side of any shaft 13 in the three-dimensional grid structure 17. That is, each robotic storage/ retrieval vehicle 14 is operable in four different working positions inside any of the shafts 13 to enable access to any of the storage locations on any of the shaft's four different sides. In the presently illustrated embodiment, the turret 96 and deck surface 98 are shown in simplified form without detail for illustrative simplicity. While the use of a rotatable turret 96 with a single extendable/retractable arm is one example of a robotic storage/retrieval vehicle 14 operable in four different working positions to access any side of any shaft 13, including fully-surrounded shafts 13 of the three-dimensional storage grid 17 that have storage locations on all four sides thereof, it will be appreciated that other vehicles 14 may be able to likewise accomplish four different working positions enabling interaction on all sides thereof, for example having a plurality of extendable arms respectively extendable from the four different sides of the vehicle 14.

Figure 21:
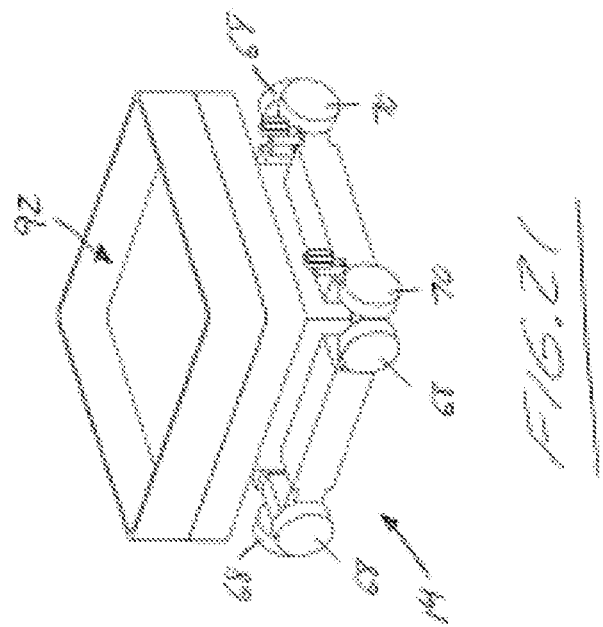

The turret 96 and surrounding deck surface 98 collectively define a square landing area atop which the storage unit 92 is seated when carried on the robotic storage/retrieval vehicle 14. This landing area is equal or similar in size and shape to the underside of each storage unit 92 in the three-dimensional grid structure 17, as shown by FIG. 21 where the seated position of the storage unit 92 occupying an entirety of the landing area. For the purpose of ensuring that the storage unit 92 is fully received and properly aligned on the landing area of the robotic storage/retrieval vehicle 14, the upper support platform 94 has a set of load status sensors 100 situated in close proximity to the outer perimeter thereof at spaced apart positions along said perimeter. In the illustrated example, the load status sensors 100 are optical sensors recessed into the upper surface of the landing area, and provided in a quantity of four, each positioned proximate a respective one of the four outer corners of the landing area. As part of a loading routine pulling a storage unit 92 onto the robotic storage/retrieval vehicle 14 from a storage location in the three-dimensional grid 17 using retraction of the extendable/retractable arm, the local processor 512 on the vehicle 14 then checks the status of the four load status sensors 100 for detected presence of the underside of the storage unit 92 above the load status sensors 100. A positive detection signal from all four load status sensors 100 thus confirms the presence of the storage unit 92 at all four corners of the landing area, thereby confirming that the storage unit 92 is fully received on the landing area and is in properly squared alignment therewith.

One embodiment uses reflective optical sensors for load status detection, where light energy transmitted by an optical beam emitter of the load status sensor 100 is reflected off the underside of the storage unit 92 back to an optical receiver of the load status sensor 100 when the storage unit 92 is present thereover, thus successfully determining said presence. Time of flight calculation (i.e. difference in time between emission of an optical pulse and detection of the reflected optical pulse) may be used to differentiate between a reflection off the underside of a storage bin seated on the landing area of the robotic storage/retrieval vehicle 14 vs. a reflection off another surface further away. It will be appreciated that sensor types other than optical sensors may be employed, for example including limit switches mechanically actuated by contact with the underside of the storage unit 92, or magnetic sensors actuated by presence of cooperating magnetic elements emitting detectable magnetic fields at the underside of the storage unit 92. However, optical sensors may be preferable to avoid moving parts or need for magnetic integration or other specialized configuration of the storage units 92.

As disclosed above, the three-dimensional grid structure 17 used to store inventory items in an order fulfillment center can also be used to buffer fully or partially completed orders within the same three-dimensional inventory storage grid structure 17. FIG. 22 illustrates a separate three-dimensional sortation/buffering grid that can supplement an inventory storage grid of the type shown in FIG. 2. For example, palletized incoming supply inventory can be depalletized and induced into the inventory storage grid of FIG. 2, from which orders are then picked and packaged into shipping containers, which are then induced into the sortation/buffering grid structure 200 of FIG. 22. the sortation/buffering grid structure 200 features the same three-dimensional framework as the three-dimensional inventory storage grid 17, thus having matching upper 10 and lower track layouts 28, and the array of upright frame members 12 therebetween for delimiting storage columns 11 and upright shafts 13 between the two track layouts to enable a fleet of the robotic storage/retrieval vehicles 14 to horizontally traverse each track layout, and vertically traverse the shafts 13 between the two track layouts 10, 28 to access the shelved storage locations therebetween. However, the storage locations in the sortation/buffering grid 200 contain previously packed shipment containers containing the orders picked from the three-dimensional inventory storage grid 17. The robotic fleet is once again wirelessly controlled via a central computerized control system 500, for example the same computerized control system 500 shared by the three-dimensional inventory storage grid 17.

In the illustrated example of FIG. 22, the upper track layout of the sortation/buffering grid 200 is served by a plurality of intake stations 202 co-operably installed therewith for the purpose of loading incoming shipping containers 204 onto robotic storage/retrieval vehicles 14 on the upper track layout. Each intake station may comprise an intake conveyor 206 on which a series of incoming shipping containers 204 can be queued for induction into the sortation/buffering grid 200, with an outlet end of each intake conveyor 206 elevated slightly above the upper track layout of the sortation/buffering grid 200 at the outer perimeter thereof by an elevated distance equal to or slightly exceeding the heights of the robotic storage/retrieval vehicles 14. This way, the outlet of each intake conveyor 206 resides at or above an upper horizontal reference plane occupied by the landing areas of the robotic storage/retrieval vehicles 14 when riding on the upper track layout. The intake conveyor 206 can thus slide or drop an incoming shipping container 204 onto the landing area of one of the robotic storage/retrieval vehicles 14 situated at a pick-up spot aligned with the outlet end of the intake conveyor 206 at the outer perimeter of the upper track layout.

One or more intake stations 202 may be provided at any one or more perimeter sides of the upper track layout, though as illustrated, the intake stations 202 may all reside at a common side of the upper track layout that's nearest to an on-site three-dimensional inventory storage grid 17 from which the packed shipping containers are arriving, or nearest to one or more intermediate packing stations at which order items amalgamated at the three-dimensional inventory storage grid 17 working stations 18 are subsequently packaged before being forwarding on to the sortation/buffering grid 200. However, it will be appreciated that the two grids need not necessary be located in a shared facility.

The lower track layout of the sortation/buffering grid 200 is served by a plurality of output stations 208 co-operably installed therewith for the purpose of unloading outgoing shipping containers 210 off of robotic storage/retrieval vehicles 14 on the lower track layout. Each output station 208 may comprise an output conveyor 212 on which a series of outgoing shipping containers 210 can be queued for transfer to a further downstream location of the facility, for example a final packing area or loading bay at which the containers will be loaded onto a shipping vehicle when available. An inlet end of each output conveyor 212 is situated at or slightly below a lower horizontal plane in which the landing areas of the robotic storage/retrieval vehicles 14 reside when riding on the lower track layout. This way, a robotic storage/retrieval vehicle 14 at a drop-off spot situated at the outer perimeter of the lower track layout in alignment with the inlet end of the output conveyor 210 can slide or drop a shipping container from said robotic storage/retrieval vehicle 14 onto the inlet end of the output conveyor 210. One or more output stations 208 may be provided at any one or more perimeter sides of the upper track layout. The illustrated example features output stations on at least two opposing sides of the lower track layout, for example to respectively feed a pair of loading bays or packing areas optionally situated on opposing sides of the sortation/buffering grid 200.

Each incoming shipping container may be picked up from one of the intake stations 202 by a robotic storage/retrieval vehicle 14 assigned to this pickup task by the computerized control system 500, and then carried to an available (i.e. currently unoccupied) storage location in the sortation/buffering grid 200 via the respective shaft 13 from which this storage location is accessible, and left at this storage location for later retrieval. Alternatively, instead of commanding the assigned robotic storage/retrieval vehicle 14 to store the incoming shipping container, the computerized control system 500 may command the robotic storage/retrieval vehicle 14 to deliver the shipping container directly to one of the output stations 208 in view of a need or availability at the loading bay or packing area for that shipping container on an urgent basis.

In selecting between these storage and direct output options for the picked-up shipping container, the computerized control system 500 may consult an order priority ranking of an order associated with that shipping container, relative to other orders whose constituent containers have already been inputted to the sortation/buffering grid 200. Additionally or alternatively, if the picked-up shipment container is only a partial component of a larger overall order, then the determination of whether to store the shipping container or deliver it straight to an output station 208 is based at least partly on whether the other shipment containers fulfilling the remainder of the larger overall order are also present, or imminently expected, at the sortation/buffering grid 200. If the entire order is present or imminently present, and there are not any other orders of higher priority ranking, then the currently picked-up container may be put directly through to the appropriate output station 208 to which the order is assigned by the computerized control system 500. The other constituent containers of that same order are retrieved from respective storage locations in the sortation/buffering grid 200, if already present therein, and delivered to that same assigned output station 208, or are assigned for imminent pickup and straight delivery to that output station if said other constituent containers are currently at, or imminently expected at, the intake stations 202.

One particular example of a useful application for the combination of the two three dimensional grids is aisle-based or similar location-based kitting operations, for example where different retail items destined for a retailer are picked in groups from the three-dimensional inventory storage grid 17 according to a particular aisle section or other identifiable sub-region of the retailer's store layout for which the particular items are destined. The different groups are packed into different shipping containers, and then fed individually into the sortation/buffering grid 200 for temporary storage (i.e. buffering) as each such picked group of items is picked and packaged. Exiting the three-dimensional inventory storage grid 17, the connected working stations 18 thereof, or subsequent packing station(s) located further downstream from the three-dimensional inventory storage grid 17 at different times, the shipping containers arrive at the sortation/buffering grid 200 at staggered points in time, with one or more initially received containers potentially arriving much earlier than a subsequently received remainder of said containers, and so the earlier received packages are temporarily stored (i.e. buffered) in the sortation/buffering grid 200, at least until such time as the remainder of containers are received by or imminently approaching the sortation/buffering grid 200. At such time, the previously-buffered initially-received shipping containers are retrieved from their respective storage locations in the sortation/buffering grid 200 and delivered to a common output station 208 by one or more of the robotic storage/retrieval vehicles 14 for amalgamation (e.g. palletization) into the completed order ready for shipment to the retailer.

This however, is only one non-limiting example of the usefulness of the sortation/buffering grid 200, the use of which is not specifically limited to use with an inventory storage solution specifically using the three-dimensional grid structure 17 employed in the present invention and Applicant's aforementioned prior PCT application. Also, aisle-based kitting for retailers is only one example, and non-retail customers similarly having an aisle-based or similarly mapped organizational layout with different identifiable sub-regions may likewise benefit from kitted delivery. This may include manufacturers with organized storage for incoming raw materials or pre-fabricated componentry from outside suppliers, where kitted shipment containers are destined for such on-site manufacturer storage, from which the raw materials or pre-fabricated componentry are distributed to one or more manufacturing stations in the facility. The kitting approach may also be used where the manufacturing stations themselves are the different identifiable sub-regions for which the kitted materials or componentry are destined according to the supply needs of such stations, whether these stations are different stages within one product line, or full or partial assembly stations for two different product lines.

In another example, such manufacturing facilities could have the inventory storage grid 17 of FIG. 2 on site for kitting of raw materials and/or componentry, either with or without the downstream sortation/buffering grid 200, to feed kit-populated storage units to the manufacturing stations at the same facility.

As outlined above, the computerized control systems referenced herein may comprise one or more computer processors, non-transitory computer readable memory coupled thereto and on which are stored statements and instructions executable by said one or more processors to perform the various associated tasks described herein, including generation and transmission of command and communication signals to the fleet of robotic storage/retrieval vehicles 14 to control the navigation thereof through the gridded three-dimensional storage structure 17, and through the working stations 18 connected thereto, and control the deposit and retrieval of the storage units to and from the storage locations within the gridded three-dimensional storage structure 17 by the robotic storage/retrieval vehicles 14, and the generation and assignment of priority rankings to the storage units being retrieved based on order data accessed by said one or more processors from one or more databases of the computerized control system.

Since various modifications can be made in my invention as herein above described, and many apparently widely different embodiments of same made, it is intended that all matter contained in the accompanying specification shall be interpreted as illustrative only and not in a limiting sense.

What is claimed is:

1. A storage system comprising:
   one or more storage/retrieval vehicles;
   a gridded three-dimensional structure comprising:
      a gridded track layout that occupies a two-dimensional area and on which the one or more storage/retrieval vehicles are conveyable in two directions;
      a plurality of storage columns residing above or below the gridded track layout and distributed within the two-dimensional area of said gridded track layout, each of the storage columns comprising a plurality of storage locations arranged one over another and sized to accommodate placement and storage of storage units;
      a plurality of upright shafts residing above or below the gridded track layout in spaced distribution within the two-dimensional area of said gridded track layout, each of the storage columns neighboured by a respective one of the upright shafts through which the storage locations of said each of the storage columns are accessible by the one or more storage/retrieval vehicles to place or remove the storage units to or from said storage locations of said each of the storage columns;
      a set of detectable markers and a set of sensors operable to detect said detectable markers, wherein a first of either said detectable markers or said sensors are supported within the gridded three-dimensional structure at or near spots in the gridded track layout that overlie or underlie the upright shafts, and a second of either said detectable markers or said sensors are carried on said one or more storage/retrieval vehicles; and
   wherein, during arrival of any one of said one or more storage/retrieval vehicles at a respective spot overlying or underlying a targeted shaft for which said one of the one or more storage/retrieval vehicles is destined, detection of a respective detectable marker by one of the sensors is used to check and selectively adjust an alignment of said one or more storage/retrieval vehicles with the targeted shaft before attempting transition of said one or more storage/retrieval vehicles from said gridded track layout into the targeted shaft.

2. The storage system of claim 1, wherein the detectable markers are statically supported within the gridded three-dimensional structure at or near said spots in the gridded track layout, and the sensors are carried on the one or more storage/retrieval vehicles.

3. The storage system of claim 2, further configured to, during travel of the one or more storage/retrieval vehicles towards the respective spot underlying or overlying the targeted shaft, scan additional detectable markers located within the gridded three-dimensional structure at or near respective other spots past which the one or more storage/retrieval vehicles is passing during said travel, and use results of said scans to dynamically adjust travel instructions under which the one or more storage/retrieval vehicles is operating to precisely target the respective spot underlying or overlying the targeted shaft.

4. The storage system of claim 1, wherein each of the sensors comprises an image capture device having a field of view that exceeds a size of the detectable markers and is aimed to encompass a predetermined position at which the detectable markers are expected to reside under proper alignment of the one or more storage/retrieval vehicles with the targeted shaft, and wherein the storage system is configured to check for an agreement between a position of said one of the detectable markers within the field of view and a predetermined sub-region of the field of view in which said one of the detectable markers is expected, whereby said agreement indicates proper alignment of the one or more storage/retrieval vehicles relative to the targeted shaft.

5. A method for controlling positioning of one or more storage/retrieval vehicles in a gridded three-dimensional structure in which said one or more storage/retrieval vehicles are conveyable in two dimensions on a gridded track layout and in a third dimension through upright shafts whose upright axes intersect said gridded track layout, said method comprising:
   (a) having a first of either a set of detectable markers or a set of sensors supported on the gridded three-dimensional structure at or near spots of the gridded track layout that overlie or underlie the upright shafts, and having a second of either said set of detectable markers or said set of sensors carried on said one or more storage/retrieval vehicles, wherein said sensors are operable to detect said detectable markers;
   (b) during arrival of the one or more storage/retrieval vehicles at a respective spot overlying or underlying a targeted shaft for which said any one of the one or more storage/retrieval vehicles is destined, using one of the sensors to detect one of the detectable markers; and
   (c) using detection of the one of the detectable markers by said one of the sensors to check, and selectively adjusting alignment of said one or more storage/retrieval vehicles with the targeted shaft before attempting transition of said one or more storage/retrieval vehicles from said gridded track layout into the targeted shaft.

6. The method of claim 5, wherein the method further includes a step of statically supporting the detectable markers within the gridded three-dimensional structure at or near the spots of the gridded track layout, and carrying the sensors on the one or more storage/retrieval vehicles.

7. The method of claim 5, further comprising, during travel of the one or more storage/retrieval vehicles towards the respective spot underlying or overlying the targeted shaft, scanning additional detectable markers located within the gridded three-dimensional structure at or near other spots past which the one or more storage/retrieval vehicles is passing during said travel, and using results of said scans to dynamically adjust travel instructions under which the one or more storage/retrieval vehicles is operating to precisely target the respective spot underlying or overlying the targeted shaft.

8. The method of claim 5, wherein step (b) comprises using said one of the sensors to capture digital images from a field of view containing said one of the detectable markers, and step (c) comprises checking for agreement between a position of said one of the detectable markers within the field of view and a predetermined sub-region of the field of view in which said one of the detectable markers is expected, whereby said agreement indicates proper alignment of the one or more storage/retrieval vehicles relative to the targeted shaft.

\* \* \* \* \*